United States Patent
Hirai et al.

(10) Patent No.: US 9,399,736 B2
(45) Date of Patent: Jul. 26, 2016

(54) OPTICALLY ANISOTROPIC SUBSTANCE AND LIQUID CRYSTAL DISPLAY

(71) Applicants: JNC CORPORATION, Tokyo (JP); JNC PETROCHEMICAL CORPORATION, Tokyo (JP)

(72) Inventors: Yoshiharu Hirai, Chiba (JP); Nagahisa Miyagawa, Chiba (JP); Daisuke Ootsuki, Chiba (JP); Mayumi Tanabe, Chiba (JP); Kazumi Nara, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 25 days.

(21) Appl. No.: 14/542,957

(22) Filed: Nov. 17, 2014

(65) Prior Publication Data

US 2015/0146156 A1 May 28, 2015

(30) Foreign Application Priority Data

Nov. 26, 2013 (JP) ................. 2013-243744

(51) Int. Cl.
- *C09K 19/20* (2006.01)
- *C09K 19/30* (2006.01)
- *C09K 19/32* (2006.01)
- *C09K 19/54* (2006.01)

(Continued)

(52) U.S. Cl.
CPC .............. *C09K 19/56* (2013.01); *C09K 19/32* (2013.01); *G02B 5/3016* (2013.01); *C09K 2019/0448* (2013.01); *C09K 2019/2078* (2013.01); *C09K 2019/548* (2013.01); *G02F 1/13363* (2013.01); *G02F 2413/02* (2013.01); *G02F 2413/06* (2013.01); *G02F 2413/11* (2013.01); *G02F 2413/13* (2013.01); *G02F 2413/14* (2013.01)

(58) Field of Classification Search
CPC ............... C09K 19/32; C09K 19/56; C09K 2019/0448; C09K 2019/2078; C09K 2019/548; G02F 1/13363; G02F 1/133634; G02F 2413/13; G02F 2413/14; G02B 5/3016; G02B 5/3083

See application file for complete search history.

(56) References Cited

U.S. PATENT DOCUMENTS

| | | | | |
|---|---|---|---|---|
| 2005/0062917 A1* | 3/2005 | Kashima | .............. | G02B 5/3016 349/120 |
| 2005/0224754 A1* | 10/2005 | Hirai | .................. | C09K 19/2007 252/299.01 |

FOREIGN PATENT DOCUMENTS

JP 2005-113131 4/2005

*Primary Examiner* — Shean C Wu
(74) *Attorney, Agent, or Firm* — Greenblum & Bernstein, P.L.C.

(57) ABSTRACT

To provide an optically anisotropic substance having a negative uniaxial phase difference film and a positive uniaxial phase difference film, and excellent heat resistance and sputtering resistance. The positive uniaxial phase difference film is formed in combination with a bifunctional polymerizable liquid crystal compound, the negative uniaxial phase difference film is formed in combination of the bifunctional polymerizable liquid crystal compound with an optically active compound having a polymerizable binaphthol moiety, and additional thermosetting treatment (postcure) is applied after the negative uniaxial phase difference film is photocured, and when glass transition temperature after the negative uniaxial phase difference film is cured is 85° C. or higher and 115° C. or lower, additional thermosetting treatment temperature is adjusted to 220° C. or higher and 250° C. or lower, and when the glass transition temperature is higher than 115° C., the additional thermosetting treatment temperature is adjusted to 200° C. or higher and 250° C. or lower.

8 Claims, 2 Drawing Sheets

(51) Int. Cl.
*G02F 1/13363* (2006.01)
*G02F 1/1337* (2006.01)
*G02B 5/30* (2006.01)
*C09K 19/56* (2006.01)
*C09K 19/04* (2006.01)

OPTICALLY ANISOTROPIC SUBSTANCE AND LIQUID CRYSTAL DISPLAY

TECHNICAL FIELD

The present invention relates to an optically anisotropic substance and a liquid crystal display, and particularly, to a liquid crystal display that has an optically anisotropic substance stacked inside a liquid crystal cell, and has a vertically aligned mode as an alignment mode in a liquid crystal layer.

BACKGROUND ART

A phase difference film has been recently widely used for a liquid crystal display as a phase difference control function layer. In a vertically aligned mode liquid crystal display that has been widely applied to a liquid crystal television, in order to reduce viewing angle dependence, a phase difference film (negative C plate) having a negative birefringence anisotropy in which an optical axis is perpendicular to a substrate, and a phase difference film (positive A plate) having a positive birefringence anisotropy in which the optical axis is horizontal to the substrate are simultaneously used.

In the liquid crystal display in which a dark display (dark state) is obtained in a state in which liquid crystal molecules having positive birefringence are aligned perpendicularly to the substrate, no birefringence by alignment of the liquid crystal molecules is caused relative to a normal direction of a display device. Therefore, very high contrast is obtained in the normal direction in the above display devices. However, when the alignment is deviated from the normal direction of the display device, birefringence is caused, and transmittance of the black display (dark state) increases. More specifically, contrast decreases relative to a viewing angle in an oblique direction in the above liquid crystal display devices. The negative C plate can compensate the birefringence to be caused when the liquid crystal alignment is deviated from the normal direction in such a display device. As a result, the negative C plate serves as an optical compensation plate suitable for improving viewing angle characteristics in a vertically aligned (VA), twisted nematic (TN), optically compensated birefringence (OCB) or hybrid aligned nematic (HAN) liquid crystal display.

In addition thereto, many phase difference films such as a viewing angle compensation film in which a discotic liquid crystal is used have been placed on the market. The phase difference films are stacked with any other phase difference plate and a polarizing plate at a specific angle in optical axes with each other, and the resulting stacked material is pasted to an outside of a liquid crystal cell, and thus used. On the occasion, a pressure sensitive adhesive used for lamination is different in a refractive index from the phase difference plate and the polarizing plate, and therefore reflection of outside light is caused in a stacked interface. The outside light reflection reduces the contrast of a display to significantly deteriorate image quality.

Such a problem can be solved by utilizing a liquid crystal material in place of the phase difference film as described above to form a phase difference control function layer in the cell. More specifically, the phase difference control function layer can be arranged using a liquid crystalline polymer that has a glass transition point and can freeze liquid crystal structure thereof at a glass transition temperature or lower, or a polymerizable liquid crystal compound that has a reactive group such as an unsaturated bond in molecular structure thereof and can similarly freeze liquid crystal structure thereof by crosslinking of the unsaturated bond in a liquid crystal layer state. The present inventors have proposed a material described in Patent literature No. 1 as a polymerizable liquid crystal composition that can form the negative C plate.

The polymerizable liquid crystal composition described in Patent literature No. 1 utilizes an optically active compound having a binaphthol moiety and a polymerizable liquid crystal compound having a fluorene skeleton. The polymerizable liquid crystal compositions can be applied in various uses by controlling a kind or an amount of addition of the optically active compound to change a helical pitch of an optically anisotropic substance having twist alignment. The optically anisotropic substance having twist alignment reflects light corresponding to a length of the helical pitch and a direction of rotation of a helix. When the length of the helical pitch is in the range of 380 nanometers to 780 nanometers, visible light is reflected. When the length of the helical pitch is longer than 780 nanometers, near infrared light is reflected, and when the length of the helical pitch is shorter than 380 nanometers, ultraviolet light is reflected. Lamination or pasting of optically anisotropic substances having different directions of rotation allows total reflection. The optically anisotropic substance having such characteristics is referred to as the negative C plate (negative C-plate).

CITATION LIST

Patent Literature

Patent literature No. 1: JP 2005-113131 A.

SUMMARY OF INVENTION

Technical Problem

An optically anisotropic substance having characteristics of a negative C plate as described above is desired to cause no change in a phase difference, a reflection wavelength and appearance in various use environments. However, when the composition described in Patent literature No. 1 is used, optical characteristics have been deteriorated in several cases in an environment in which a device is exposed to a hot environment or brought into contact with a high polar solvent. Moreover, in a process for preparing a liquid crystal cell, the optically anisotropic substance has had a problem of causing cracks therein in a step for installing as a transparent conductive film an electrode by sputtering of ITO, for example.

An object of the invention is to provide an optically anisotropic substance that uses a negative uniaxial phase difference film and a positive uniaxial phase difference film and is excellent in heat resistance and resistance to sputtering. Moreover, another object of the invention is to provide a vertically aligned mode liquid crystal display that includes the optically anisotropic substance.

Solution to Problem

The resent inventors have considered that the problems described above are caused by a low crosslinked density of a negative uniaxial phase difference film (negative C plate layer) that is formed on a positive uniaxial phase difference film having an optical axis within a plane of a layer and has the optical axis in a normal direction of a layer plane. More specifically, when a stress derived from an outside environment (high temperature, chemical or the like) is applied, optical characteristics are thought to be deteriorated by disturbance of alignment of liquid crystal molecule, or cracks are thought to be caused by thermal shrinkage.

The present inventors have found that the problems described above are solved by forming the positive uniaxial phase difference film in combination with a bifunctional polymerizable liquid crystal compound, forming the negative uniaxial phase difference film in combination of the bifunctional polymerizable liquid crystal compound with an optically active compound having a polymerizable binaphthol moiety, and further applying additional thermosetting treatment (postcure) after the negative uniaxial phase difference film is photocured, and when a glass transition temperature after the negative uniaxial phase difference film is cured is 85° C. or higher and 115° C. or lower, by adjusting an additional thermosetting treatment temperature to 220° C. or higher and 250° C. or lower, and when the glass transition temperature is higher than 115° C., by adjusting the additional thermosetting treatment temperature to 200° C. or higher and 250° C. or lower, and thus have completed the invention.

The invention is as described below.

Item 1. An optically anisotropic substance in which an alignment film, a positive uniaxial phase difference film and a negative uniaxial phase difference film are formed on a substrate in the above order, wherein the positive uniaxial phase difference film is formed of polymerizable liquid crystal composition (A) containing one kind or two or more kinds of achiral polymerizable liquid crystal compounds having two or more polymerizable groups, the negative uniaxial phase difference film is formed of polymerizable liquid crystal composition (B) containing one kind or two or more kinds of achiral polymerizable liquid crystal compounds having two or more polymerizable groups, and one kind or two or more kinds of optically active compounds having a polymerizable binaphthol moiety, and the optically anisotropic substance is formed according to an additional thermosetting treatment step after the negative uniaxial phase difference film is formed by photocuring, and when a glass transition temperature after the negative uniaxial phase difference film is photocured is 85° C. or higher and 115° C. or lower, an additional thermosetting treatment temperature is adjusted to 220° C. or higher and 250° C. or lower, and when the glass transition temperature is higher than 115° C., the additional thermosetting treatment temperature is adjusted to 200° C. or higher and 250° C. or lower.

Item 2. The optically anisotropic substance according to item 1, wherein polymerizable liquid crystal composition (A) contains one kind or two or more kinds of compounds selected from the group of achiral polymerizable liquid crystal compounds represented by formula (1) and formula (2):

$W^{11}$ is independently hydrogen, fluorine, chlorine, methyl or ethyl, and at least one of hydrogen in the methyl and the ethyl may be replaced by halogen;

$A^1$ is independently 1,4-cyclohexylene, 1,4-phenylene, or 1,4-phenylene in which at least one of hydrogen is replaced by halogen, nitro, cyano, alkyl having 1 to 7 carbons or alkoxy having 1 to 7 carbons; and $Y^1$ is independently a single bond or alkylene having 1 to 20 carbons, at least one of —CH$_2$— may be replaced by —O—, —S—, —COO—, —OCO— or —OCOO—, excluding a case where —O— is adjacent, at least one of —CH$_2$CH$_2$— may be replaced by —CH=CH— or —C≡C—, and in the groups, at least one of hydrogen may be replaced by fluorine or chlorine; and in formula (2), $X^2$ is independently hydrogen, methyl, fluorine or trifluoromethyl;

$W^{21}$ is independently halogen, nitro, cyano, phenyl, benzyl, alkyl having 1 to 7 carbons, alkoxy having 1 to 7 carbons, alkoxycarbonyl (—COOR$^a$; R$^a$ is straight-chain alkyl having 1 to 7 carbons) or alkylcarbonyl (—COR$^b$; R$^b$ is straight-chain alkyl having 1 to 16 carbons), and in the alkyl and the alkoxy, at least one of hydrogen may be replaced by fluorine;

$W^{22}$ is independently hydrogen, halogen, nitro, cyano, alkyl having 1 to 7 carbons or alkoxy having 1 to 7 carbons, and in the alkyl and the alkoxy, at least one of hydrogen may be replaced by fluorine;

s is an integer from 0 to 4;

$n^{21}$ is independently an integer from 2 to 12;

$n^{22}$ is an integer from 1 to 3;

$Z^{21}$ is independently a single bond, —O—, —CO—, —CH=CH—, —COO—, —OCO—, —OCO—CH=CH—COO— or —OCOO—; and $Z^{22}$ is independently a single bond, —CH$_2$CH$_2$— or —CH=CH—.

Item 3. The optically anisotropic substance according to item 2, wherein polymerizable liquid crystal composition (B) contains one kind or two or more kinds of compounds selected from the group of achiral polymerizable liquid crystal compounds represented by formula (1) and formula (2), Formula 1

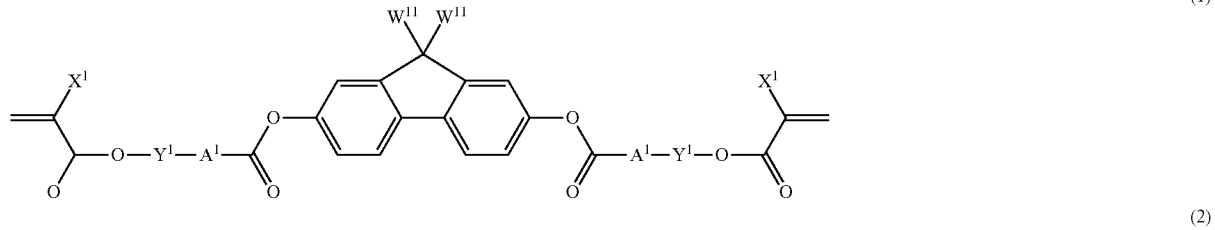

(1)

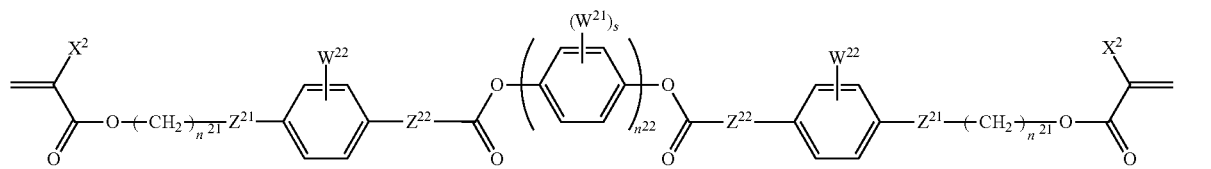

(2)

wherein, in formula (1), $X^1$ is independently hydrogen, methyl, fluorine or trifluoromethyl;

and one kind or two or more kinds of optically active compounds having a polymerizable binaphthol moiety as represented by formula (3):

Formula 2

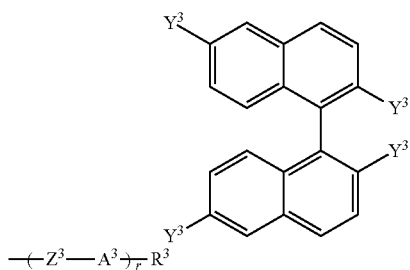
(3)

Formula 3

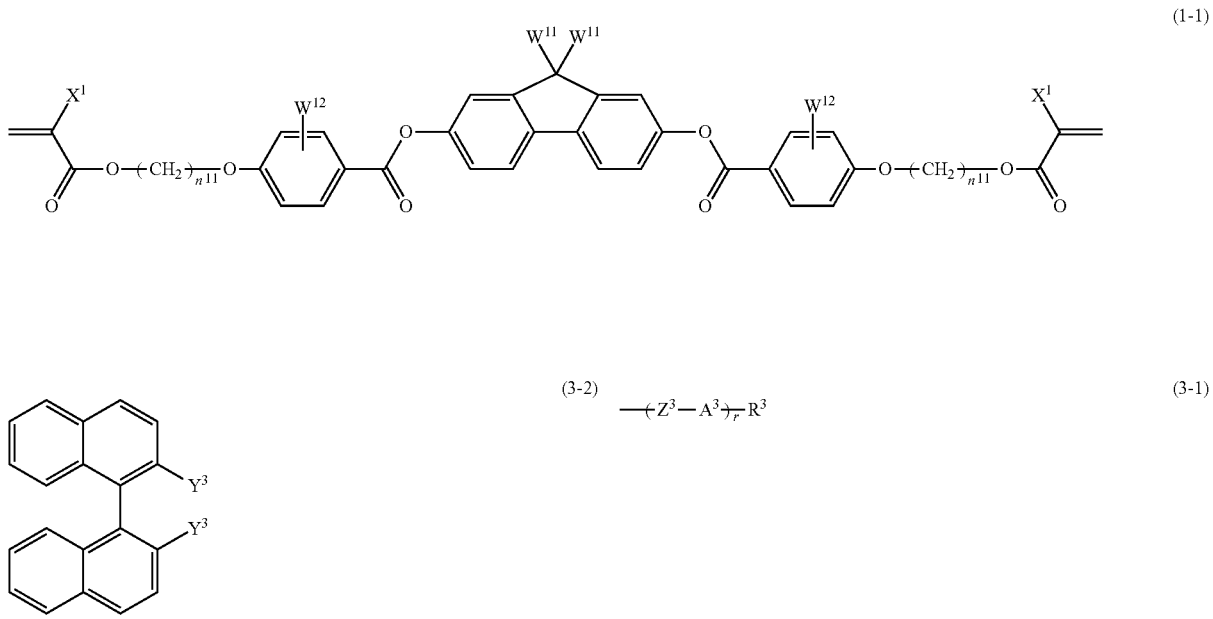

wherein, in formula (3), $Y^3$ is independently hydrogen, halogen or a group represented by formula (3-1), however, at least two in $Y^3$ are a group represented by formula (3-1); and in formula (3-1), $R^3$ is independently halogen, cyano, alkenyl having 2 to 20 carbons or alkyl having 1 to 20 carbons, at least one of —$CH_2$— in the group may be replaced by —O—, excluding a case where —O— is adjacent, at least one of hydrogen in the group may be replaced by halogen, and in one or two of $Y^3$, one of hydrogen in $R^3$ is replaced by acryloyloxy, methacryloyloxy or trifluoromethylacryloyloxy;

$A^3$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen;

$Z^3$ is independently a single bond, —O—, —COO—, —OCO—, —$OCF_2$— or —$(CH_2)_p$—, and one of —$CH_2$— of —$(CH_2)_p$— may be replaced by —O—;

p is independently an integer from 1 to 20; and r is independently an integer from 1 to 3.

Item 4. The optically anisotropic substance according to item 3, wherein polymerizable liquid crystal compound (1) contained in polymerizable liquid crystal composition (A) or polymerizable liquid crystal composition (B) includes at least one compound selected from the group of compounds represented by formula (1-1), and optically active compound (3) contained in polymerizable liquid crystal composition (B) includes at least one compound selected from the group of compounds represented by formula (3-2):

wherein, in formula (1-1), $X^1$ is independently hydrogen, methyl, fluorine or trifluoromethyl;

$W^{11}$ is independently hydrogen or methyl;

$W^{12}$ is independently hydrogen, halogen, nitro, cyano, alkyl having 1 to 7 carbons or alkoxy having 1 to 7 carbons; and $n^{11}$ is independently an integer from 2 to 12; and in formula (3-2), $Y^3$ is independently a group represented by formula (3-1);

in formula (3-1), $R^3$ is independently alkenyl having 2 to 20 carbons or alkyl having 1 to 20 carbons, at least one of —$CH_2$— in the group may be replaced by —O—, excluding a case where —O— is adjacent, at least one of hydrogen in the group may be replaced by halogen, and in one or two of $Y^3$, one of hydrogen in $R^3$ is replaced by acryloyloxy, methacryloyloxy or trifluoromethylacryloyloxy;

$A^3$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen;

$Z^3$ is independently a single bond, —O—, —COO—, —OCO—, —OCF$_2$— or —(CH$_2$)$_p$—, and one of —CH$_2$— of —(CH$_2$)$_p$— may be replaced by —O—;

p is independently an integer from 1 to 20; and r is independently an integer from 1 to 3.

Item 5. The optically anisotropic substance according to item 4, wherein, in formula (1-1), $X^1$ is independently hydrogen or methyl; and $W^{12}$ is independently hydrogen, halogen, alkyl having 1 to 7 carbons or alkoxy having 1 to 7 carbons; and in formula (2), $X^2$ is independently hydrogen or methyl;

$W^{21}$ is independently halogen, phenyl, benzyl, alkyl having 1 to 7 carbons, alkoxy having 1 to 7 carbons, alkoxycarbonyl (—COOR$^a$; R$^a$ is straight-chain alkyl having 1 to 7 carbons) or alkylcarbonyl (—COR$^b$; R$^b$ is straight-chain alkyl having 1 to 16 carbons), and in the alkyl and the alkoxy, at least one of hydrogen may be replaced by fluorine;

in formula (3-2), $Y^3$ is independently a group represented by formula (3-1);

in formula (3-1), $R^3$ is independently alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and in one or two of $Y^3$, one of hydrogen in $R^3$ is replaced by acryloyloxy, methacryloyloxy or trifluoromethylacryloyloxy; and $Z^3$ is independently a single bond, —O—, —COO—, —OCO— or —(CH$_2$)$_p$—, and one of —CH$_2$— of —(CH$_2$)$_p$— may be replaced by —O—.

Item 6. The optically anisotropic substance according to any one of items 1 to 5, wherein polymerizable liquid crystal composition (A) and/or polymerizable liquid crystal composition (B) further contain at least one compound selected from the group of compounds represented by formula (4-1) and formula (4-2):

—CH$_2$CH$_2$— may be replaced by —CH═CH— or —C≡C—, and in the groups, at least one of hydrogen may be replaced by fluorine or chlorine;

$W^{41}$ is independently hydrogen, fluorine, chlorine, methyl or ethyl, and at least one of hydrogen in the methyl and the ethyl may be replaced by halogen; and $W^{42}$ is independently hydrogen, halogen, nitro, cyano, alkyl having 1 to 7 carbons or alkoxy having 1 to 7 carbons; and in formula (4-2), $W^{41}$ and $W^{42}$ are defined in a manner identical with the definitions described above;

$Y^{42}$ is defined in a manner identical with the definitions of $Y^{41}$; and $X^{42}$ is defined in a manner identical with the definitions of $X^{41}$.

Item 7. A liquid crystal display, including the optically anisotropic substance according to any one of items 1 to 6, wherein an alignment mode in a liquid crystal layer includes a vertically aligned mode.

Item 8. The liquid crystal display according to item 7, wherein the vertically aligned mode in the liquid crystal layer includes a VA mode, a multidomain vertical alignment (MVA) mode, a patterned VA (PVA) mode or a polymer-sustained alignment (PSA) mode.

Advantageous Effects of Invention

An optically anisotropic substance of the invention is excellent in heat resistance, and particularly, resistance to sputtering, and useful for improving reliability of a liquid crystal display in which an alignment mode in a liquid crystal layer includes a vertically aligned mode.

Formula 4

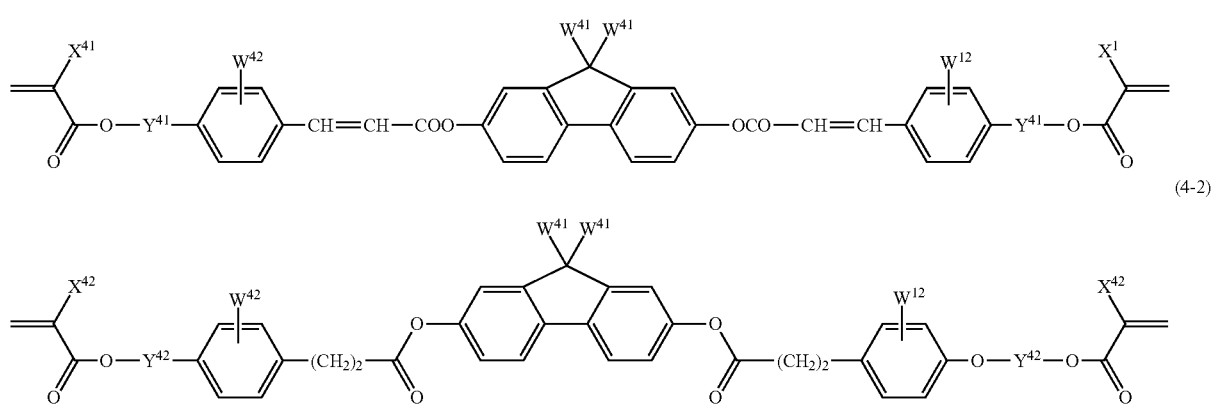

Figure 2:
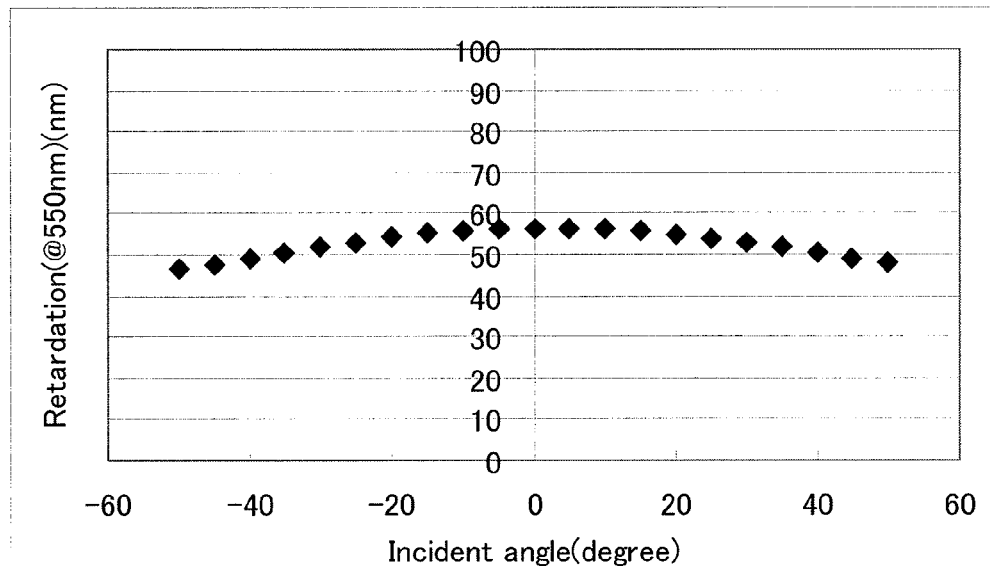

wherein, in formula (4-1), $X^{41}$ is independently hydrogen, methyl or trifluoromethyl;

$Y^{41}$ is independently alkylene having 1 to 20 carbons, at least one of —CH$_2$— may be replaced by —O—, —S—, —COO—, —OCO— or —OCOO—, at least one of FIG. 2 shows results of measurement of retardation of a positive uniaxial phase difference film (positive A plate) obtained in Example 1.

Figure 3:
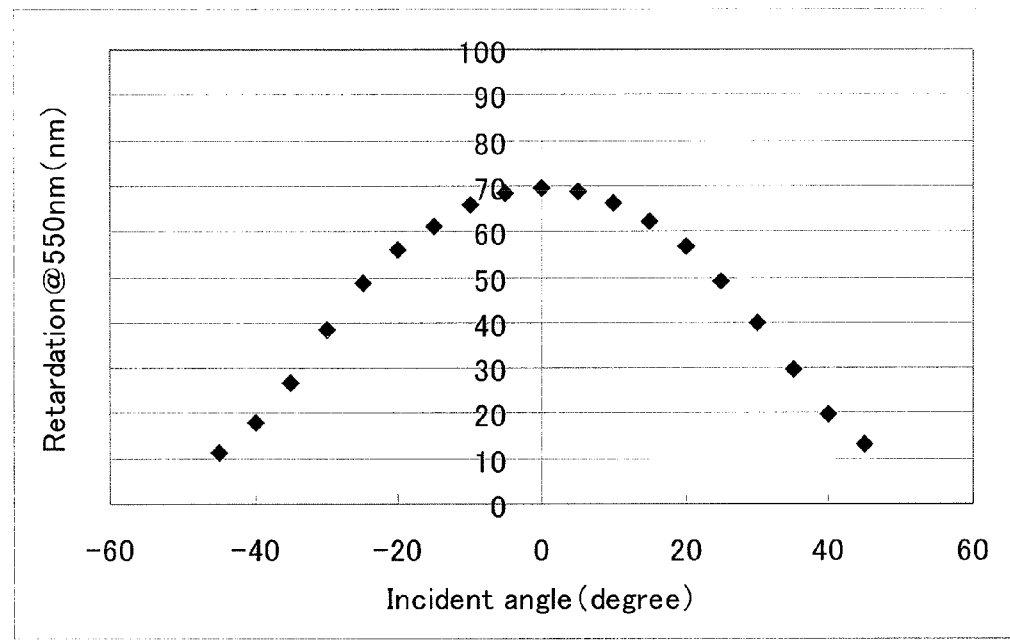

FIG. 3 shows results of measurement of retardation of a phase difference film in which a positive uniaxial phase difference film and a negative uniaxial phase difference film are stacked as obtained in Example 1.

DESCRIPTION OF EMBODIMENTS

Usage of terms herein is as described below. "Liquid crystal compound" is a generic term for a compound having a liquid crystal phase, and a compound having no liquid crystal phase but being useful as a component of a liquid crystal composition. The liquid crystal phase includes a nematic phase, a smectic phase and a cholesteric phase, and in many cases, means the nematic phase. Polymerizability means capability of a monomer polymerizing by means of light, heat, a catalyst or the like to give a polymer. "Compound represented by formula (1)" may be occasionally represented as "compound (1)." A compound represented by any other formula may be also occasionally referred to according to a similar simplification method. Meaning of a term "liquid crystallinity" is not limited only to having the liquid crystal phase. Characteristics with which a compound can be used as the component of the liquid crystal composition when the compound is mixed with any other liquid crystal compound even if the compound per se has no liquid crystal phase are also included in the meaning of the liquid crystallinity.

In a substituent whose position of connection with ring-constituting carbon is unclear, the connecting position semantically is free within the range in which the position chemically has no problems. An optically active compound having a polymerizable group according to the invention may be occasionally referred to as a polymerizable optically active compound, an optically active compound or simply a compound. A polymerizable liquid crystal composition may be also occasionally referred to as a liquid crystal composition or simply a composition in a similar manner. A case where a compound has one polymerizable group may be occasionally referred to as monofunctionality. Moreover, a case where a compound has a plurality of polymerizable groups may be occasionally referred to as polyfunctionality, or using a name corresponding to the number of the polymerizable groups.

As a chemical formula, when a content described below is described, a straight line from A to B means a bond in which hydrogen in B is replaced by group A, and a position thereof is arbitrary. X represents the number of groups A to be replaced. A case where X is 0 represents absence of A or no replacement.

Formula 5

Alignment in the liquid crystal compound is classified into "homogeneous (parallel)," "homeotropic (vertical)," "tilt (tilted)," "twist (twisted)" or the like based on magnitude of a tilt angle or the like. The tilt angle refers to an angle between an alignment state of the liquid crystal compound and a support substrate. "Homogeneous" means a state in which the alignment state is parallel to the substrate and aligned in one direction. Examples of the tilt angle in homogeneous alignment include approximately 0 degrees to approximately 5 degrees. "Homeotropic" refers to a state in which the alignment state is perpendicular to the substrate. Examples of the tilt angle in homeotropic alignment include approximately 85 degrees to approximately 90 degrees. "Tilt" refers to a state in which the alignment state further rises perpendicularly from parallel as the alignment state is further separated from the substrate. Examples of the tilt angle in tilt alignment include approximately 5 degrees to approximately 85 degrees. "Twist" refers to a state in which the alignment state is parallel to the substrate, but is twisted stepwise centering on a helical axis. Examples of the tilt angle in twist alignment include approximately 0 degrees to approximately 5 degrees.

In a positive uniaxial phase difference film in the invention, the liquid crystal compound is subjected to horizontal alignment and has an optical axis within a plane of a layer. The positive uniaxial phase difference film having the optical axis within the plane of the layer refers to an optical retardation plate using a uniaxial birefringence material layer in which an extraordinary axis thereof is parallel to the plane of the layer. Such a positive uniaxial phase difference film can be constituted by allowing a polymerizable liquid crystal compound to arrange in parallel to a substrate plane and in an identical direction (homogeneous alignment).

In a negative uniaxial phase difference film, the liquid crystal compound is subjected to the twist alignment, and has the optical axis in a normal direction of a layer plane. In the negative uniaxial phase difference film having the optical axis in the normal direction of the layer plane refers to an optical retardation plate using a uniaxial birefringence material layer in which the extraordinary axis thereof is perpendicular to the plane of the layer. Such a negative uniaxial phase difference film can be constituted by mixing an achiral polymerizable liquid crystal compound and the optically active compound and to arrange the resulting mixture such that the helical axis is adjusted in the normal direction of the layer plane.

The positive uniaxial phase difference film according to the invention is formed of polymerizable liquid crystal composition (A) containing one kind or two or more kinds of achiral polymerizable liquid crystal compounds having two or more polymerizable groups. The positive uniaxial phase difference film is preferably formed of polymerizable liquid crystal composition (A) containing one kind or two or more kinds of compounds selected from the group of achiral polymerizable liquid crystal compounds represented by formula (1) (preferably, formula (1-1)) and formula (2).

Formula 6

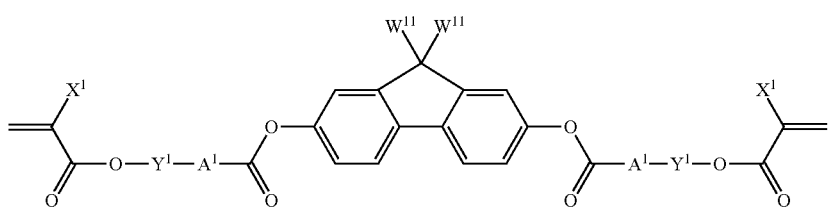

(1)

-continued

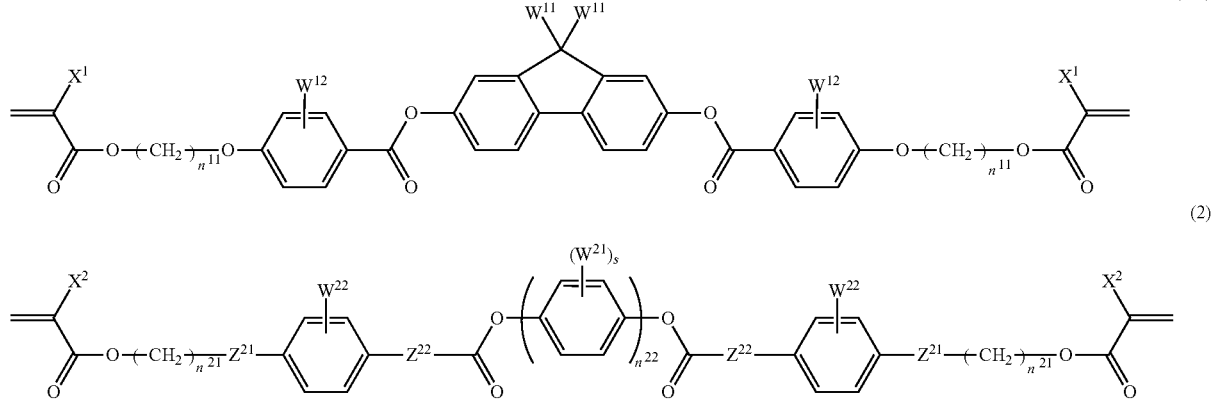

In formula (1), $X^1$ is independently hydrogen, methyl, fluorine or trifluoromethyl.

$W^{11}$ is independently hydrogen, fluorine, chlorine, methyl or ethyl, and at least one of hydrogen in the methyl and the ethyl may be replaced by halogen. In addition, in the invention, halogen means a group 17 element, and specifically, fluorine, chlorine, bromine or iodine, and preferably, fluorine, chlorine or bromine.

$A^1$ is independently 1,4-cyclohexylene, 1,4-phenylene, or 1,4-phenylene in which at least one of hydrogen is replaced by halogen, nitro, cyano, alkyl having 1 to 7 carbons or alkoxy having 1 to 7 carbons.

$Y^1$ is independently a single bond or alkylene having 1 to 20 carbons, at least one of —$CH_2$— may be replaced by —O—, —S—, —COO—, —OCO— or —OCOO—, excluding a case where —O— is adjacent, at least one of —$CH_2CH_2$— may be replaced by —CH=CH— or —C≡C—, and in the groups, at least one of hydrogen may be replaced by fluorine or chlorine.

Formula (1) preferably includes formula (1-1), and $X^1$ and $W^{11}$ are defined in a manner identical with the definitions described above.

In formula (1-1), $X^1$ is preferably hydrogen or methyl.

$W^{11}$ is preferably independently hydrogen or methyl.

$W^{12}$ is independently hydrogen, halogen, nitro, cyano, alkyl having 1 to 7 carbons or alkoxy having 1 to 7 carbons.

Then, $n^{11}$ is independently an integer from 2 to 12, and preferably, an integer from 3 to 6.

In formula (2), $X^2$ is independently hydrogen, methyl, fluorine or trifluoromethyl.

$W^{21}$ is independently halogen, nitro, cyano, phenyl, benzyl, alkyl having 1 to 7 carbons, alkoxy having 1 to 7 carbons, alkoxycarbonyl (—$COOR^a$; $R^a$ is straight-chain alkyl having 1 to 7 carbons) or alkylcarbonyl (—$COR^b$; $R^b$ is straight-chain alkyl having 1 to 16 carbons), and in the alkyl and the alkoxy, at least one of hydrogen may be replaced by fluorine.

$W^{22}$ is independently hydrogen, halogen, nitro, cyano, alkyl having 1 to 7 carbons or alkoxy having 1 to 7 carbons, and in the alkyl and the alkoxy, at least one of hydrogen may be replaced by fluorine.

Then, s is an integer from 0 to 4.

Then, $n^{21}$ is independently an integer from 2 to 12, and preferably, an integer from 3 to 6.

Then, $n^{22}$ is an integer from 1 to 3.

$Z^{21}$ is independently a single bond, —O—, —CO—, —CH=CH—, —COO—, —OCO—, —OCO—CH=CH—COO— or —OCOO—.

$Z^{22}$ is independently a single bond, —$CH_2CH_2$— or —CH=CH—.

The negative uniaxial phase difference film according to the invention is formed of polymerizable liquid crystal composition (B) containing one kind or two or more kinds of achiral polymerizable liquid crystal compounds having two or more polymerizable groups, and one kind or two or more kinds of optically active compounds having a polymerizable binaphthol moiety. The negative uniaxial phase difference film is preferably formed of polymerizable liquid crystal composition (B) containing one kind or two or more kinds of compounds selected from the group of achiral polymerizable liquid crystal compounds having two or more polymerizable groups represented by formula (1) (preferably, formula (1-1)) and formula (2), and one kind or two or more kinds of optically active compounds having a polymerizable binaphthol moiety as represented by formula (3) (preferably, formula (3-2)).

Formula 7

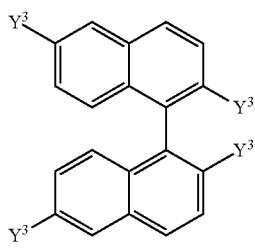

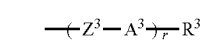

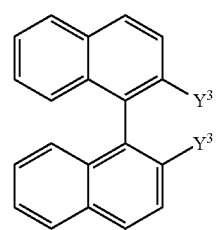

In formula (3), $Y^3$ is independently hydrogen, halogen or a group represented by formula (3-1). However, at least two in $Y^3$ are a group represented by formula (3-1).

In formula (3-1), $R^3$ is independently halogen, cyano, alkenyl having 2 to 20 carbons or alkyl having 1 to 20 carbons, at least one of —$CH_2$— in the group may be replaced by —O—, excluding a case where —O— is adjacent, and at least one of hydrogen in the group may be replaced by halogen. In one or two of $Y^3$, one of hydrogen in $R^3$ is replaced by acryloyloxy, methacryloyloxy or trifluoromethylacryloyloxy.

$Z^3$ is preferably a single bond, —O—, —COO—, —OCO— or —$(CH_2)_p$—, and one of —$CH_2$— of —$(CH_2)_p$— may be replaced by —O—.

Then, p is independently an integer from 1 to 20, preferably, an integer from 1 to 10, and further preferably, an integer from 1 to 3.

Then, r is independently an integer from 1 to 3.

Polymerizable liquid crystal composition (A) and/or polymerizable liquid crystal composition (B) according to the invention may contain at least one compound selected from the group of achiral polymerizable liquid crystal compounds represented by formula (4-1) and formula (4-2).

Formula 8

(4-1)

(4-2)

$A^3$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen.

$Z^3$ is independently a single bond, —O—, —COO—, —OCO—, —$OCF_2$— or —$(CH_2)_p$—, and one of —$CH_2$— of —$(CH_2)_p$— may be replaced by —O—.

Then, p is independently an integer from 1 to 20, preferably, an integer from 1 to 10, and further preferably, an integer from 1 to 3.

Then, r is independently an integer from 1 to 3.

The compound represented by formula (3) preferably includes a compound represented by formula (3-2).

In formula (3-2), $Y^3$ is independently a group represented by formula (3-1).

In formula (3-1), $R^3$ is independently alkenyl having 2 to 20 carbons or alkyl having 1 to 20 carbons, at least one of —$CH_2$— in the group may be replaced by —O—, excluding a case where —O— is adjacent, and at least one of hydrogen in the group may be replaced by halogen. In one or two of $Y^3$, one of hydrogen in $R^3$ is replaced by acryloyloxy, methacryloyloxy or trifluoromethylacryloyloxy.

$A^3$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen.

$Z^3$ is independently a single bond, —O—, —COO—, —OCO—, —$OCF_2$— or —$(CH_2)_p$—, and one of —$CH_2$— of —$(CH_2)_p$— may be replaced by —O—.

In formula (4-1), $X^{41}$ is independently hydrogen, methyl or trifluoromethyl.

$Y^{41}$ is independently alkylene having 1 to 20 carbons, at least one of —$CH_2$— may be replaced by —O—, —S—, —COO—, —OCO— or —OCOO—, at least one of —$CH_2CH_2$— may be replaced by —CH=CH— or —C≡C—, and in the groups, at least one of hydrogen may be replaced by fluorine or chlorine.

$W^{41}$ is independently hydrogen, fluorine, chlorine, methyl or ethyl, and at least one of hydrogen in the methyl and the ethyl may be replaced by halogen.

$W^{42}$ is independently hydrogen, halogen, nitro, cyano, alkyl having 1 to 7 carbons or alkoxy having 1 to 7 carbons.

In formula (4-2), $W^{41}$ and $W^{42}$ are defined in a manner identical with the definitions described above.

$Y^{42}$ is defined in a manner identical with the definitions of $Y^{41}$. Moreover, $X^{42}$ is defined in a manner identical with the definitions of $X^{41}$.

Polymerizable liquid crystal composition (A) and polymerizable liquid crystal composition (B) according to the invention may further contain a nonionic surfactant. Examples of the nonionic surfactant includes a vinyl-based, fluorine-based, silicone-based or hydrocarbon-based surfactant. The nonionic surfactant is effective in improving smoothness of an applied film.

Polymerizable liquid crystal composition (A) has the nematic phase at room temperature, and is subjected to horizontal alignment on an alignment film of polyimide or the like subjected to photo-alignment treatment or rubbing alignment treatment. In order to facilitate adjustment of the tilt angle of the liquid crystal molecules on an air interface side of the liquid crystal molecules to alignment (homogeneous alignment) in parallel to the substrate plane, addition of the nonionic surfactant to polymerizable liquid crystal composition (A) is preferred. Addition of the nonionic surfactant facilitates the homogeneous arrangement.

Polymerizable liquid crystal composition (B) has the nematic phase at room temperature, and is subjected to the twist alignment on the alignment film of polyimide or the like subjected to the photo-alignment treatment or rubbing alignment treatment. Alignment control force exists (can be utilized also as the alignment film) even on a photocured film in which polymerizable liquid crystal composition (A) is subjected to horizontal alignment, and therefore new formation of the alignment film is unnecessary, but when further positive alignment is desirably obtained, formation of the alignment film is preferred. The twist alignment herein is also referred to as planar arrangement, and the liquid crystal molecules are arranged such that the helical axis of a liquid crystal becomes perpendicular to the substrate plane. The twist alignment thereof is also referred to as Grandjean arrangement. In such alignment, the tilt angle of the liquid crystal molecules on the air interface side is preferably horizontal to the substrate plane, and addition of the nonionic surfactant to polymerizable liquid crystal composition (B) facilitates the planar arrangement.

The compound used for polymerizable liquid crystal composition (A) or polymerizable liquid crystal composition (B) will be described.

Compound (1) and compound (1-1) have a skeleton having structure centering on fluorene and two polymerizable groups. The compound exhibits the liquid crystallinity and a polymer of the polymerizable liquid crystal compound forms three-dimensional structure, and therefore serves as a harder polymer in comparison with a compound having one polymerizable group. Compounds derived from compound (1) and compound (1-1) may be occasionally referred to as compound (1) as a generic term hereinafter.

Compound (2) has a phenylene skeleton and two polymerizable groups. The compound is easily homogenously aligned, although a degree depends on conditions of the support substrate, an additive or the like, when coating is made onto a rubbing-treated substrate with an alignment film polymer having no side chain, or when the nonionic surfactant is added to the liquid crystal composition. Moreover, the compound tends to exhibit the liquid crystal phase in a wide temperature range. A compound derived from compound (2) may be occasionally referred to as compound (2) as a generic term hereinafter in a manner similar to compound (1).

Compound (3) and compound (3-2) include a polymerizable optically active compound having a binaphthol moiety as axial chirality. The compound has comparatively large helical twisting power, and has the polymerizable group, and therefor is crosslinked with any other achiral polymerizable liquid crystal compound to form dense three-dimensional structure, and therefore the resulting optically anisotropic substance becomes rigid. A compound derived from compound (3) may be occasionally referred to as compound (3) as a generic term hereinafter in a manner similar to compound (1).

Compound (4-1) or (4-2) has two polymerizable groups centering on fluorene, but has a binding site different from a binding site in compound (1). A polymer of the polymerizable compound forms the three-dimensional structure, and therefore serves as a harder polymer in comparison with the compound having one polymerizable group. The compound may or may not exhibit the liquid crystallinity. The compound has a central skeleton common with the skeleton of compound (1), and therefore is easily compatibilized to easily adjust a melting point of the polymerizable liquid crystal composition. Moreover, compound (4-1) has a cinnamate moiety, and therefore can increase Δn, and compound (4-2) has an ethyl ester moiety, and therefore can decrease the melting point. As a generic term of compounds of compound (4-1) or (4-2) or derived therefrom, the compounds may be occasionally referred to as compound (4) hereinafter.

Polymerizable liquid crystal composition (A) or polymerizable liquid crystal composition (B) may contain at least one compound selected from the group of achiral polymerizable liquid crystal compounds represented by formula (5).

Formula 9

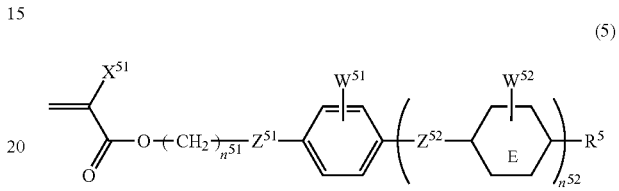

(5)

In formula (5), $X^{51}$ is hydrogen, methyl or trifluoromethyl.

$R^5$ is cyano, trifluoromethoxy, alkyl having 1 to 20 carbons (preferably, straight-chain alkyl having 1 to 10 carbons), alkyl ester having 1 to 20 carbons (—COOR$^c$, —OCOR$^c$ or —CH=CH—COOR$^c$; R$^c$ is straight-chain alkyl having 1 to 20 carbons (preferably, 1 to 10 carbons)), or alkoxy having 1 to 20 carbons (preferably, straight chain alkoxy having 1 to 10 carbons), and in the alkyl and the alkoxy, at least one of hydrogen may be replaced by fluorine.

Ring E represents a benzene ring or a cyclohexane ring.

$W^{51}$ and $W^{52}$ are independently hydrogen, halogen, nitro, cyano, alkyl having 1 to 7 carbons or alkoxy having 1 to 7 carbons, and in the alkyl and the alkoxy, at least one of hydrogen may be replaced by fluorine.

$Z^{51}$ is a single bond, —O—, —COO—, —OCO— or —OCOO—.

$Z^{52}$ is independently a single bond, —COO—, —OCO—, —CH=CH—COO—, —OCO—CH=CH—, —CH$_2$CH$_2$—OCO—, —OCO—CH$_2$CH$_2$— or —C≡C—.

Then, $n^{51}$ is an integer from 2 to 12, and preferably, an integer from 3 to 6.

Then, $n^{52}$ is an integer from 1 to 2.

Compound (5) has a phenylene skeleton and one polymerizable group. The compound has properties of increasing a tilt angle or decreasing a melting point of other liquid crystal molecules. A compound derived from compound (5) may be occasionally referred to as compound (5) as a generic term hereinafter in a manner similar to compound (1) as described above.

Polymerizable liquid crystal composition (A) may contain any other polymerizable compound (hereinafter, also referred to as "any other polymerizable compound") different from compound (1), compound (2), compound (4) and the nonionic surfactant.

Polymerizable liquid crystal composition (B) may contain any other polymerizable compound different from compound (1), compound (2), compound (3), compound (4) and the nonionic surfactant.

In the polymerizable liquid crystal composition according to the invention, from a viewpoint of adjusting the melting point, monofunctional polymerizable liquid crystal compound (5) may be added in the range in which advantageous effects of the invention are not adversely affected. Moreover, a silane coupling agent may be contained in order to improve adhesion between a coating film and the support substrate. The composition may contain an additive suitable for a polymerization reaction, such as a photopolymerization initiator, a photosensitizer and a chain transfer agent. The composition may contain an additive such as an ultraviolet light absorber, an antioxidant, a radical scavenger and a light stabilizer in order to improve polymer characteristics. The composition may contain an organic solvent. The organic solvent is useful for forming a coating film having uniform thickness.

A ratio of each component in the composition according to the invention will be described.

A preferred ratio of achiral polymerizable liquid crystal compound (1) in polymerizable liquid crystal composition (A) for forming the positive uniaxial phase difference film is approximately 1 to approximately 100% by weight based on the total weight of compound (1) and compound (2). A further preferred ratio is approximately 5 to approximately 70% by weight based thereon. A still further preferred ratio is approximately 10 to approximately 50% by weight based thereon.

A preferred ratio of achiral polymerizable liquid crystal compound (2) in polymerizable liquid crystal composition (A) is approximately 0 to approximately 99% by weight based on the total weight of compound (1) and compound (2). A further preferred ratio is approximately 0 to approximately 95% by weight based thereon. A still further preferred ratio is approximately 0 to approximately 90% by weight based thereon.

A preferred ratio of optically active compound (3) (preferably, (3-2)) having the polymerizable binaphthol moiety in polymerizable liquid crystal composition (B) for forming the negative uniaxial phase difference film is approximately 0.1 to approximately 25% by weight based on the total weight of compound (1), compound (2) and compound (3). A further preferred ratio is approximately 0.5 to approximately 20% by weight based thereon. A still further preferred ratio is approximately 1 to approximately 15% by weight based thereon.

A preferred ratio of achiral polymerizable liquid crystal compound (1) in polymerizable liquid crystal composition (B) is approximately 3 to approximately 99.9% by weight based on the total weight of compound (1), compound (2) and compound (3). A further preferred ratio is approximately 10 to approximately 99.5% by weight based thereon. A still further preferred ratio is approximately 15 to approximately 99% by weight based thereon.

A preferred ratio of achiral polymerizable liquid crystal compound (2) in polymerizable liquid crystal composition (B) is approximately 0 to approximately 72% by weight based on the total weight of compound (1), compound (2) and compound (3). A further preferred ratio is approximately 0 to approximately 70% by weight based thereon. A still further preferred ratio is approximately 0 to approximately 65% by weight based thereon.

A preferred ratio of compound (4) is approximately 0 to approximately 2.00 in terms of a weight ratio based on the total weight of the achiral polymerizable liquid crystal compound in polymerizable liquid crystal composition (A) or (B). A further preferred ratio is approximately 0 to approximately 1.50 based thereon. A still further preferred ratio is approximately 0 to approximately 1.00 based thereon.

A preferred ratio at which the photopolymerization initiator added thereto is approximately 0.01 to approximately 0.15 in terms of a weight ratio based on the total weight of compound (1) and compound (2) in polymerizable liquid crystal composition (A). A further preferred ratio is approximately 0.02 to approximately 0.13 based thereon. A still further preferred ratio is approximately 0.03 to approximately 0.10 based thereon.

A preferred ratio at which the photopolymerization initiator is added thereto is approximately 0.01 to approximately 0.15 in terms of a weight ratio based on the total weight of compound (1), compound (2) and compound (3) in polymerizable liquid crystal composition (B). A further preferred ratio is approximately 0.02 to approximately 0.13 based thereon. A still further preferred ratio is approximately 0.03 to approximately 0.10 based thereon.

A preferred ratio when the nonionic surfactant is added is approximately 0.0001 to approximately 0.03 in terms of a weight ratio based on the total weight of compound (1) and compound (2) in polymerizable liquid crystal composition (A).

In polymerizable liquid crystal composition (B), a preferred ratio is approximately 0.0001 to approximately 0.03 in terms of the weight ratio based on the total weight of compound (1), compound (2) and compound (3).

A preferred ratio when the silane coupling agent is added thereto is approximately 0.01 to approximately 0.15 in terms of a weight ratio based on the total weight of compound (1) and compound (2) in polymerizable liquid crystal composition (A). A further preferred weight ratio is approximately 0.03 to approximately 0.10 based thereon.

In polymerizable liquid crystal composition (B), a preferred ratio is approximately 0.01 to approximately 0.15 in terms of a weight ratio based on the total weight of compound (1), compound (2) and compound (3) in polymerizable liquid crystal composition (B). A further preferred weight ratio is approximately 0.03 to approximately 0.10 based thereon.

A preferred ratio when any other polymerizable compound is added thereto is approximately 0.01 to approximately 0.50 in terms of a weight ratio based on the total weight of compound (1) and compound (2) in polymerizable liquid crystal composition (A). A further preferred weight ratio is approximately 0.03 to approximately 0.30 based thereon.

In polymerizable liquid crystal composition (B), a preferred ratio is approximately 0.01 to approximately 0.50 in terms of the weight ratio based on the total weight of compound (1), compound (2) and compound (3). A further preferred weight ratio is approximately 0.03 to approximately 0.30 based thereon.

Upon further simultaneously using any other additive, as usage, the additive only needs a minimum amount for attaining a purpose.

A combination of each component in polymerizable liquid crystal composition (A) of the invention will be described. The combination includes a combination of compound (1) and compound (2), a combination of only compound (1) or a combination of only compound (2).

From a viewpoint of improving uniformity of horizontal alignment, the combination of compound (1) and compound (2) or the combination of only compound (2) is preferred.

A combination of each component in polymerizable liquid crystal composition (B) according to the invention will be described. The combination includes:
a combination of compound (1), compound (2) and compound (3);
a combination of compound (1) and compound (3); or
a combination of compound (2) and compound (3).

From a viewpoint of increasing birefringence of the polymerizable liquid crystal compound and decreasing a thickness of the negative uniaxial phase difference film, the combination of compound (1), compound (2) and compound (3) or the combination of compound (1) and compound (3) is preferred.

When alignment uniformity or application uniformity is adjusted, the nonionic surfactant may be combined therewith. When the adhesion with the support substrate is improved, the silane coupling agent may be combined therewith. Moreover, any other polymerizable compound may be further combined therewith for each combination.

Next, methods for synthesizing the compounds will be described. The compounds used in the invention can be synthesized by combining synthesis methods in organic chemistry as described in Houben Weyl, Methoden der Organischen Chemie (Georg Thieme Verlag, Stuttgart), Organic Reactions (John Wily & Sons Inc.), Organic Syntheses (John Wily & Sons, Inc.), Comprehensive Organic Synthesis (Pergamon Press), New Experimental Chemistry Course (Shin Jikken Kagaku Koza in Japanese) (Maruzen Co., Ltd.) or the like.

Chem., 190, 2255-2268 (1989), WO 97/00600 A, U.S. Pat. No. 5,770,107 B, JP 2004-231638 A, JP 2009-184974 A, or the like.

A method for synthesizing compound (3) having the polymerizable optically active binaphthol moiety is described in U.S. Pat. No. 5,886,242 B or GB 2298202 A.

As for a method for synthesizing compound (4-1), a method described in U.S. Pat. No. 5,770,107 B can be applied as a reference.

As for a method for synthesizing compound (4-2), a method described in JP 2006-307150 A can be applied as a reference.

Monofunctional liquid crystal compound (5) can be synthesized by a method described in Macromolecules, 26, 6132-6134 (1993), Makromol. Chem., 183, 2311-2321 (1982), DE 19504224 A, WO 1997/00600A, U.S. Pat. No. 4,952,334 B, U.S. Pat. No. 4,842,754 B, or the like.

Next, examples of component compounds are shown. Preferred examples of compound (1-1) are shown below.

Formula 10

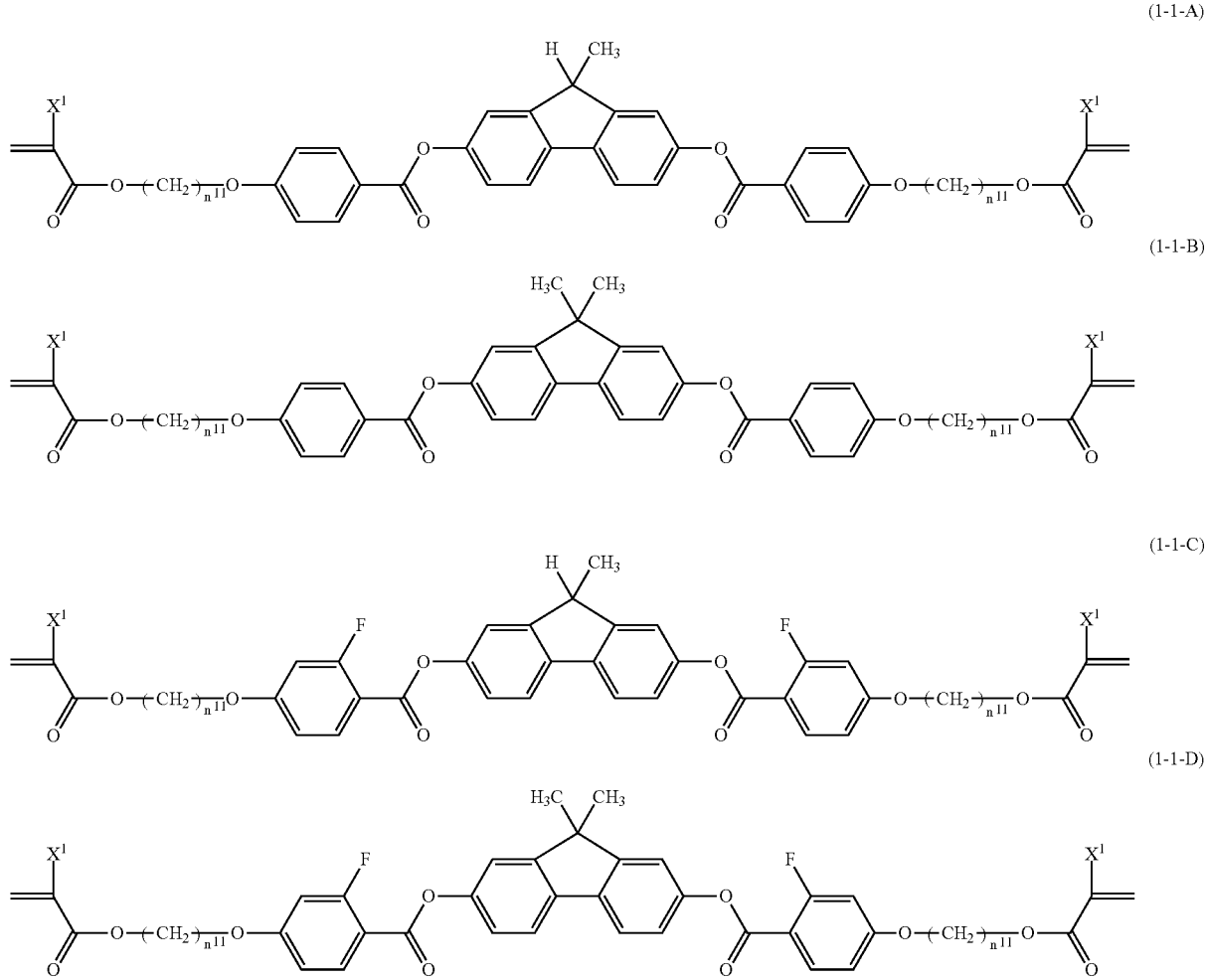

A method for synthesizing compound (1) is described in JP 2003-238491 A or JP 2006-307150 A.

A method for synthesizing compound (2) is described in Makromol. Chem., 190, 3201-3215 (1989), Makromol.

In formulas (1-1-A) to (1-1-D), $X^1$ is independently hydrogen, fluorine, methyl or trifluoromethyl, and $n^{11}$ is independently an integer from 2 to 12, and preferably, an integer from 3 to 6.

Preferred examples of compound (2) are shown below.
Formula 11
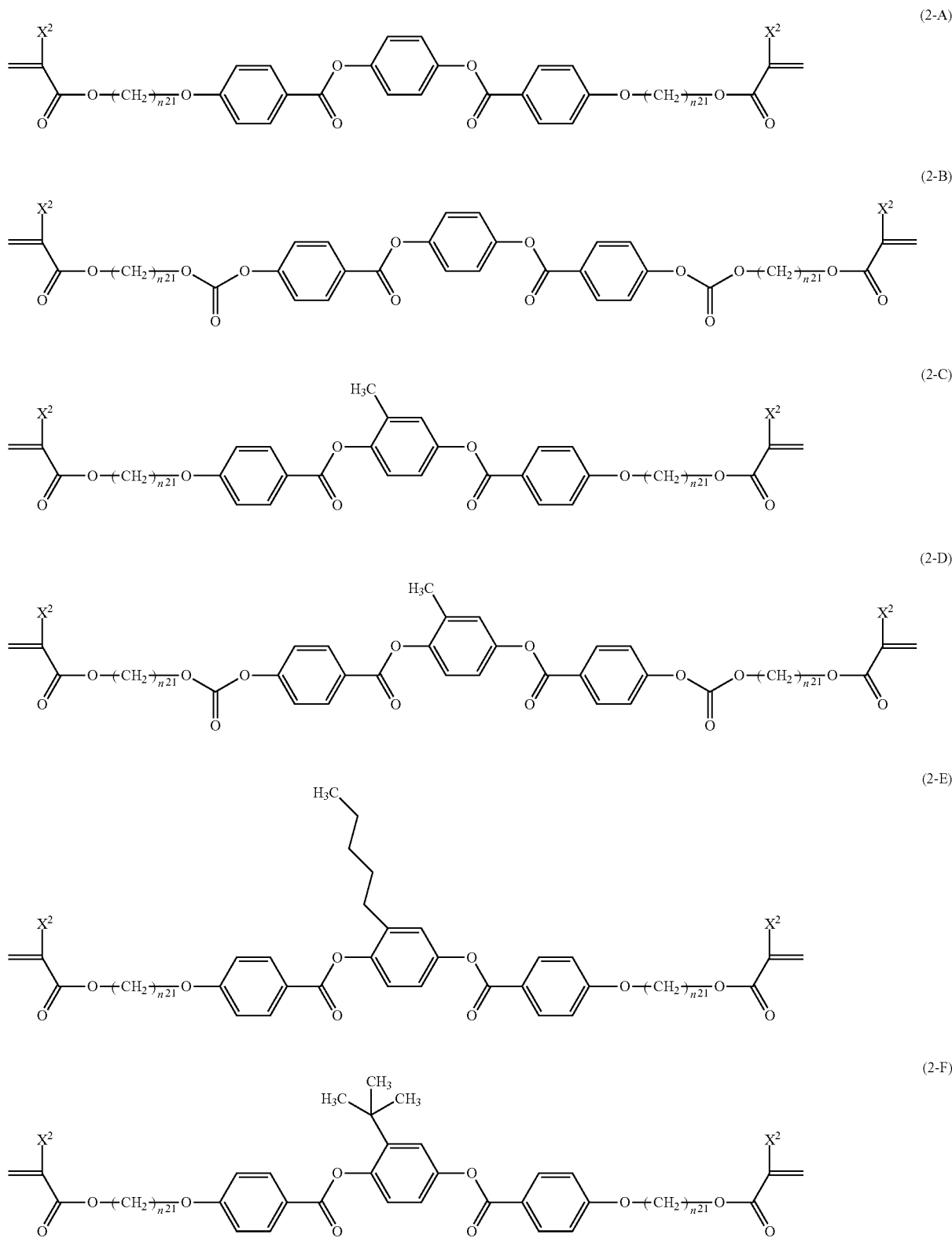

-continued
Formula 12
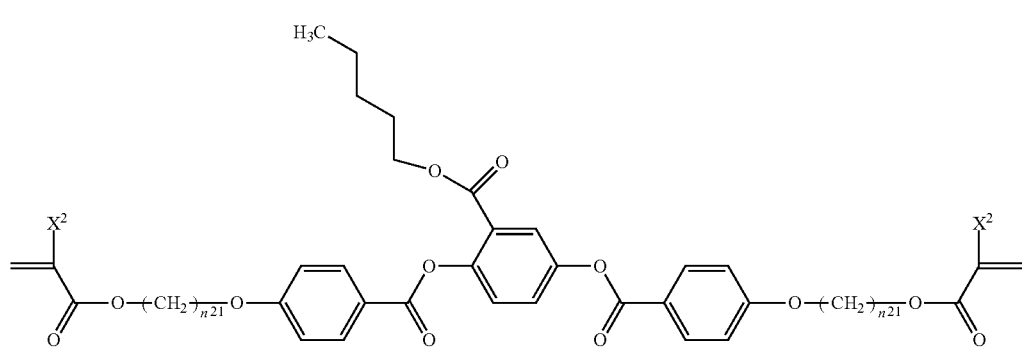
(2-G)
(2-H)
(2-I)
Formula 13
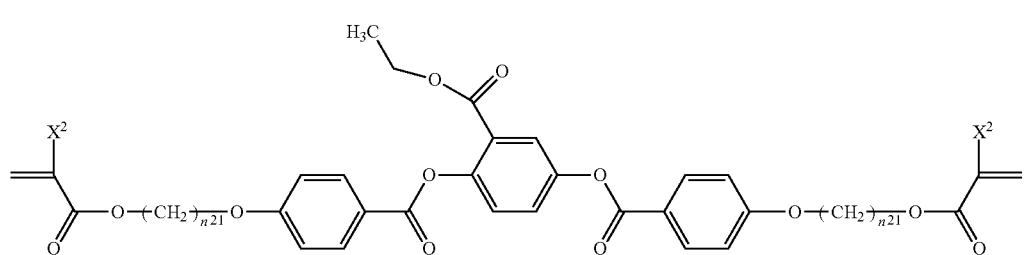
(2-J)
(2-K)
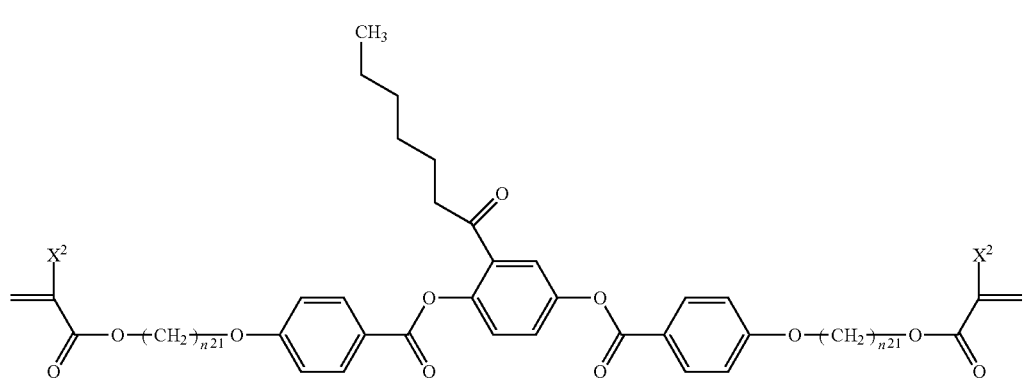

-continued
(2-L)
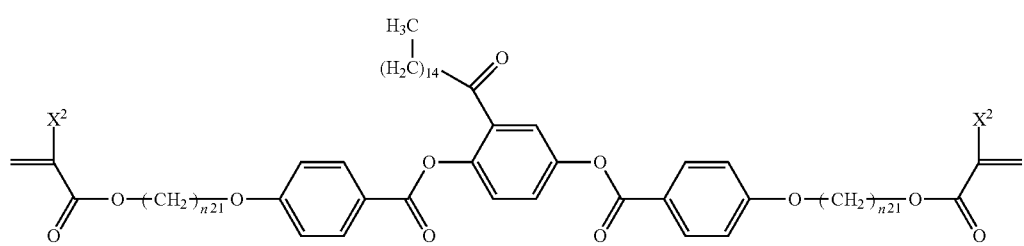
Formula 14
(2-M)
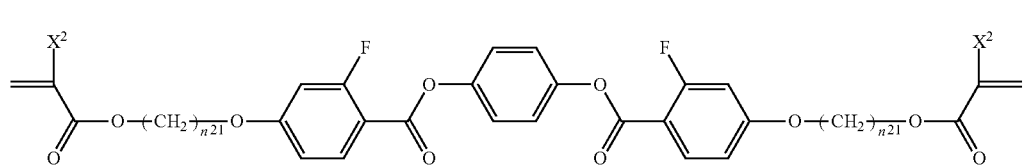
(2-N)
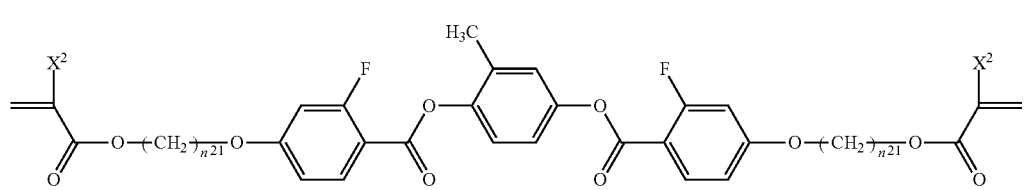
(2-O)
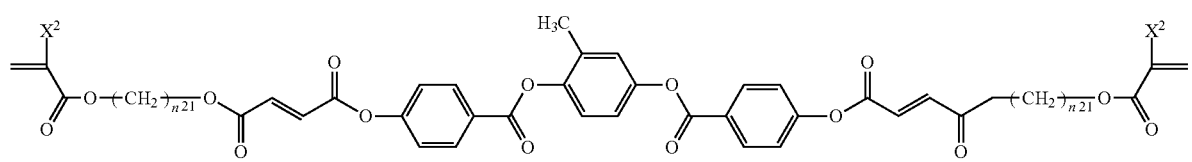
Formula 15
(2-P)
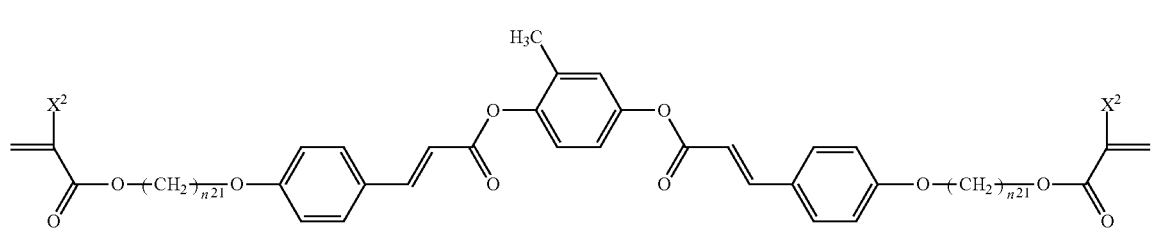
(2-Q)
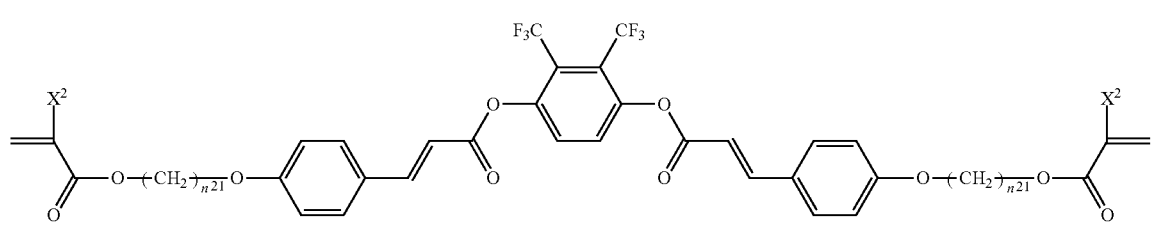
(2-R)
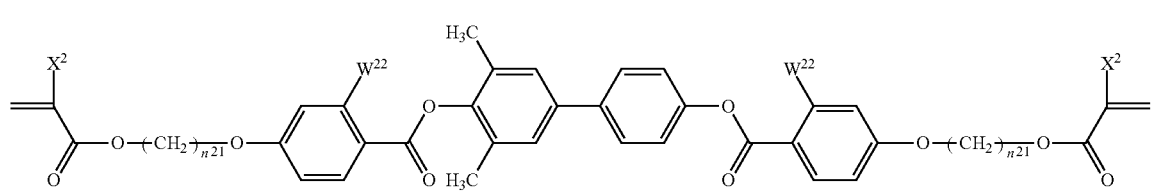

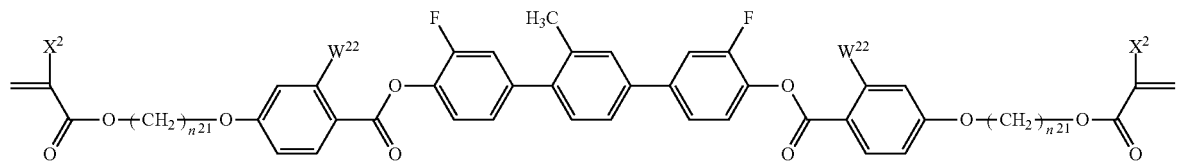
(2-S)
In formulas (2-A) to (2-S), $X^2$ is independently hydrogen, methyl, fluorine or trifluoromethyl, $W^{22}$ is hydrogen or fluorine, and $n^{21}$ is independently an integer from 2 to 12, and preferably, an integer from 3 to 6.
Preferred examples of compound (3-2) are shown below.
Formula 16
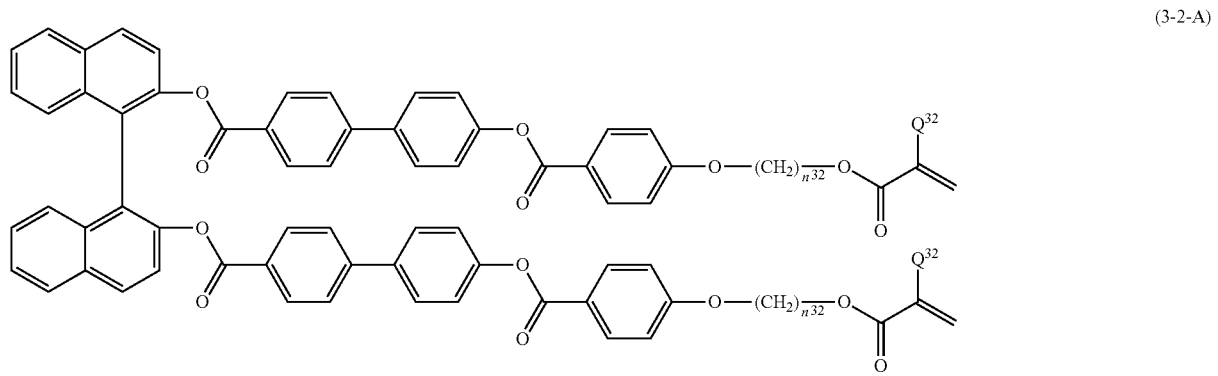
(3-2-A)
(3-2-B)
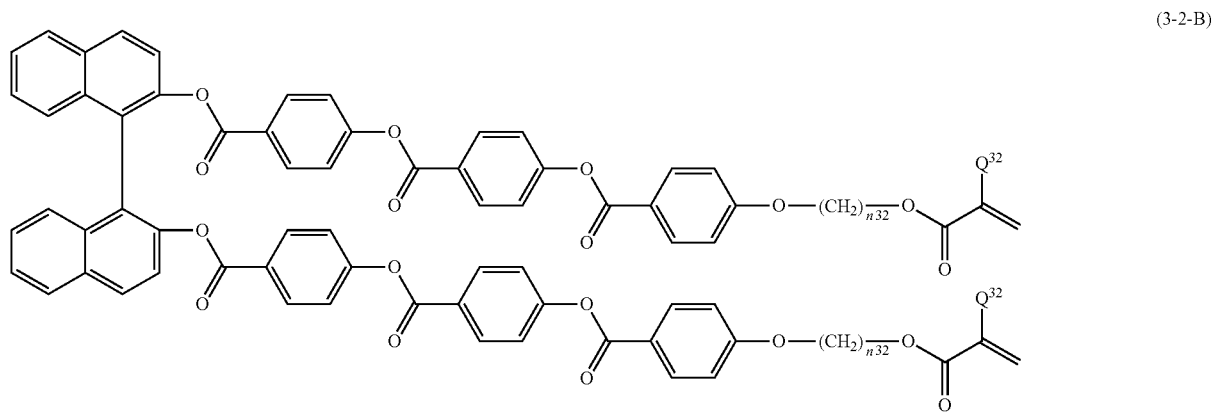
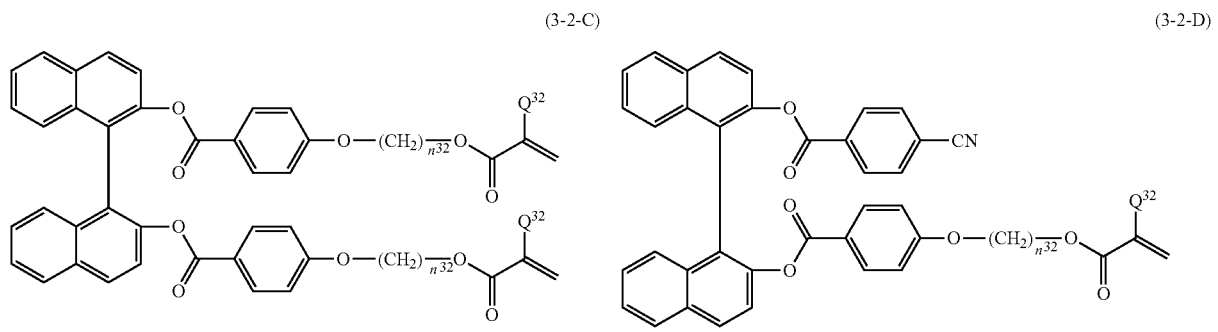
(3-2-C)
(3-2-D)

Formula 17
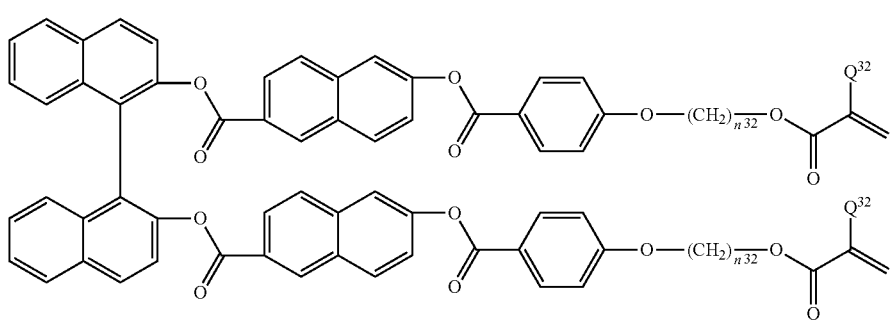
(3-2-E)
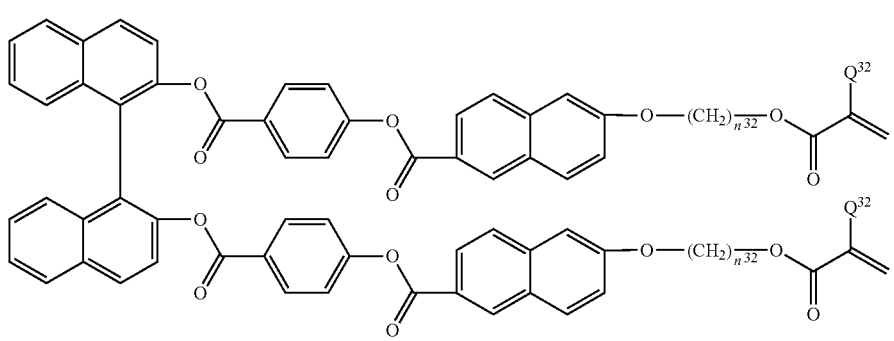
(3-2-F)
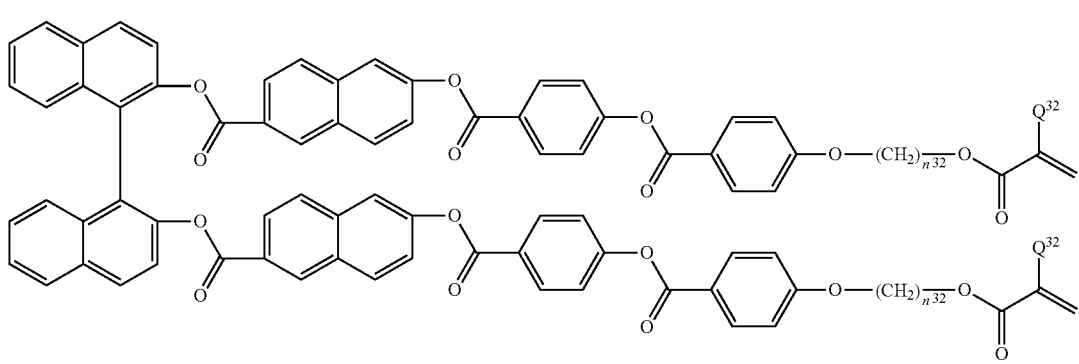
(3-2-G)
Formula 18
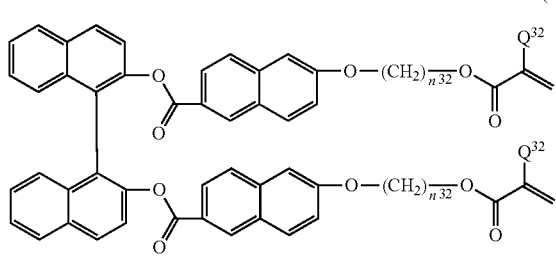
(3-2-H)
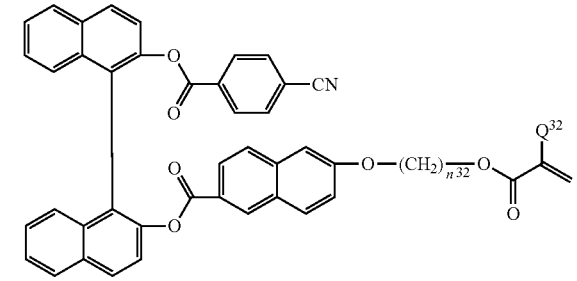
(3-2-I)
$Q^{32}$ is independently hydrogen, methyl or trifluoromethyl, $n^{32}$ is independently an integer from 2 to 12, and preferably, an integer from 3 to 6. As the optically active compounds, both of (R) isomer and (S) isomer may be used.

Preferred examples of compounds (4-1) to (4-2) are shown below.
Formula 19
(4-1-A)
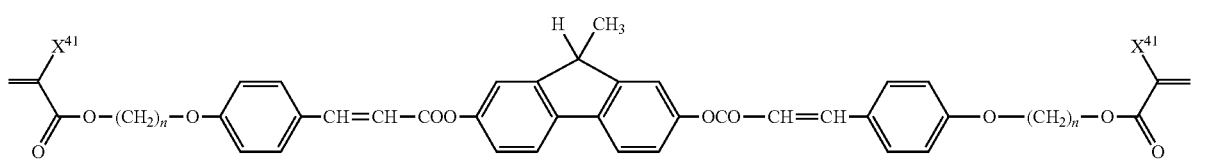
(4-1-B)
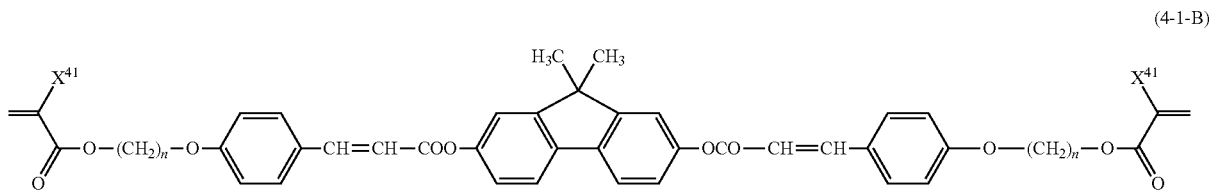
(4-1-C)
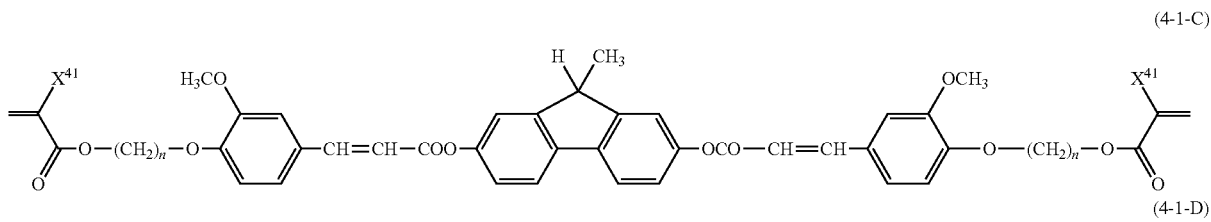
(4-1-D)
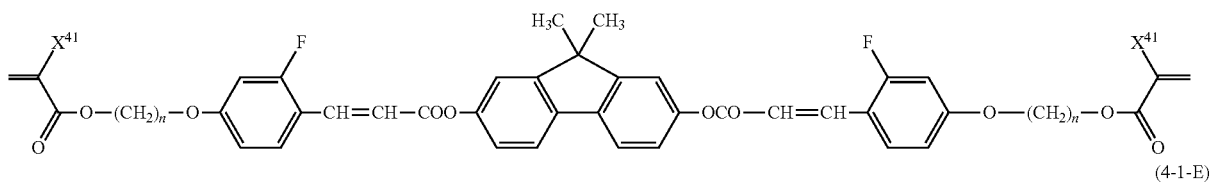
(4-1-E)
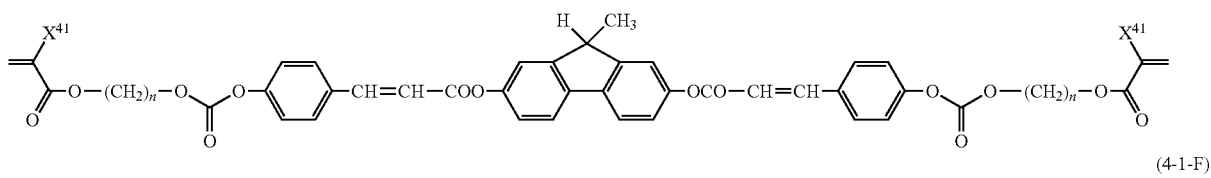
(4-1-F)
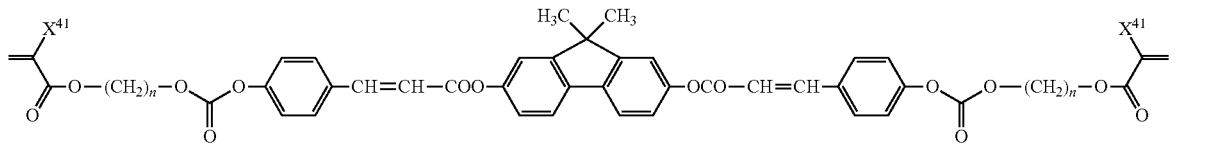
In formulas (4-1-A) to (4-1-F), $X^{41}$ is independently hydrogen, methyl or trifluoromethyl, and n is independently an integer from 2 to 20, and preferably, an integer from 3 to 6.
In formulas (4-1-A) to (4-1-F), a trans isomer is preferred, and both of —CH=CH— further preferably take a trans form.
Formula 20
(4-2-A)
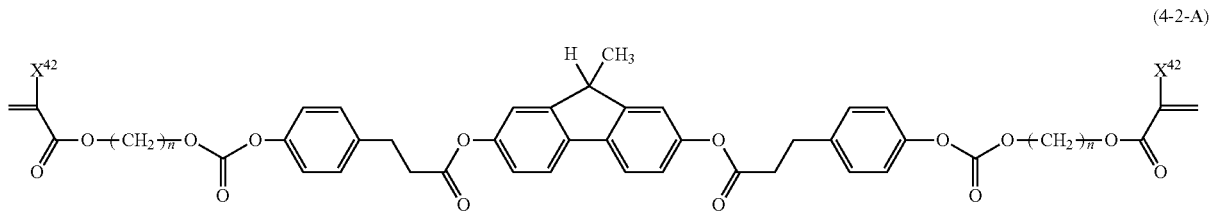

-continued
(4-2-B)
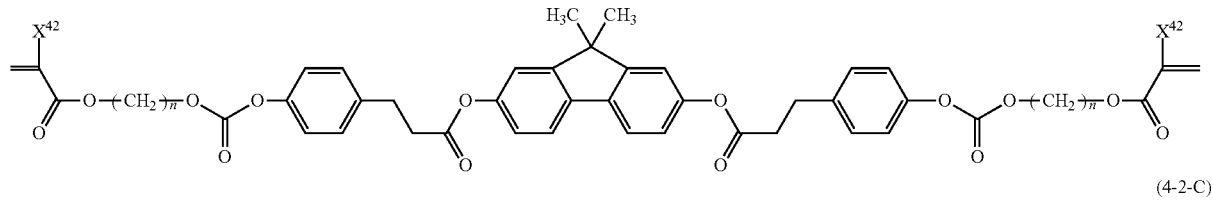
(4-2-C)
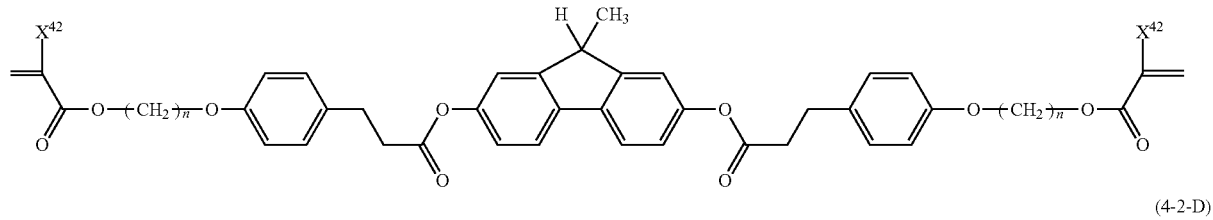
(4-2-D)
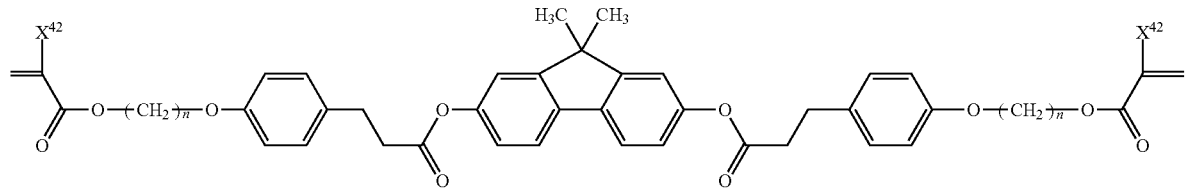
In formulas (4-2-A) to (4-2-D), $X^{42}$ is independently hydrogen, methyl or trifluoromethyl, and n is independently an integer from 2 to 20, and preferably, an integer from 3 to 6.
Preferred examples of monofunctional compound (5) are shown below.
Formula 21
(5-A) (5-B)
(5-C) (5-D)
(5-E) (5-F)
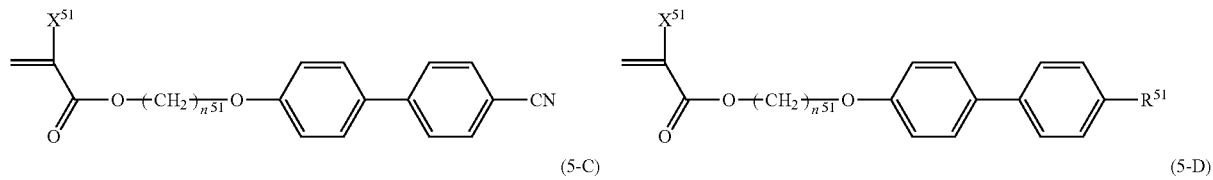
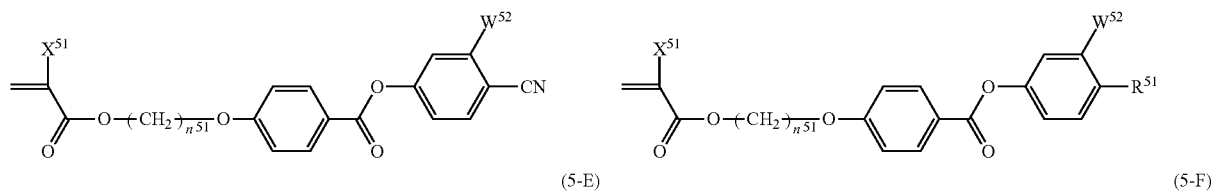
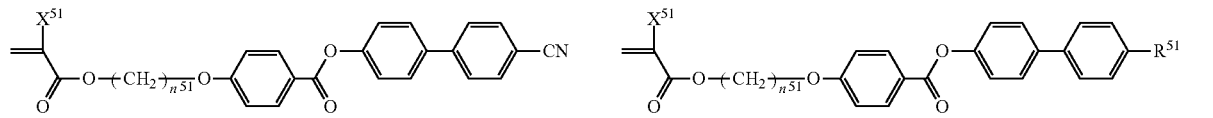
Formula 22
(5-G) (5-H)
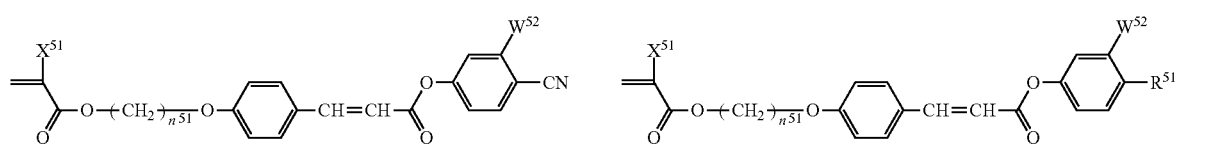

-continued
(5-I)
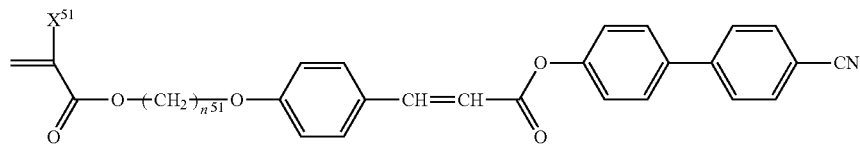
(5-J)
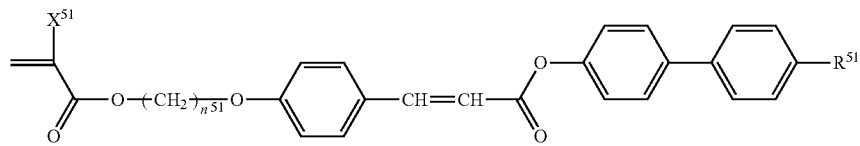
(5-K) (5-L)
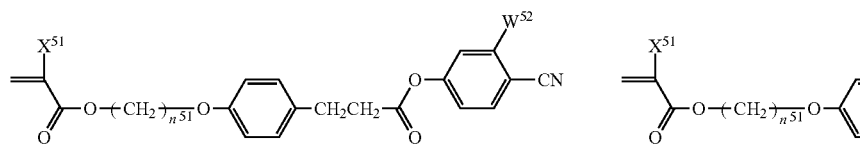
(5-M)
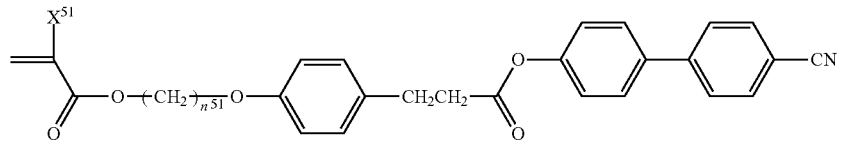
(5-N)
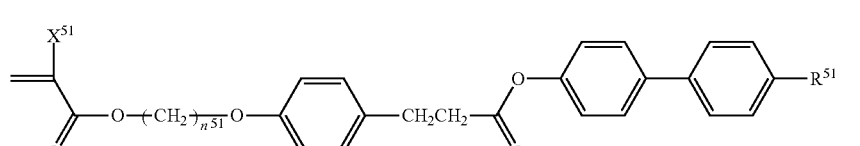
Formula 23
(5-O) (5-P)
(5-Q) (5-R)
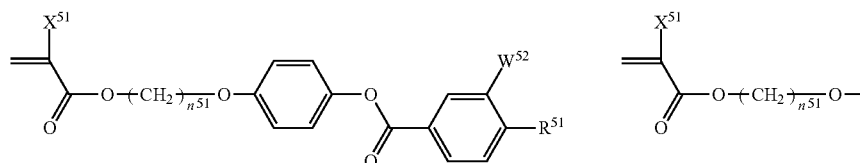
Formula 24
(5-S) (5-T)
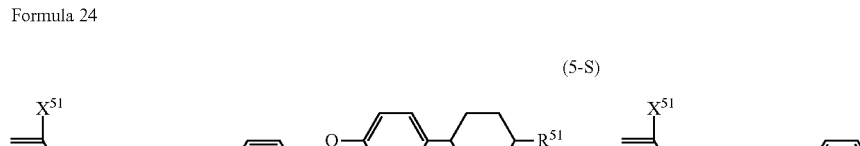
(5-U)
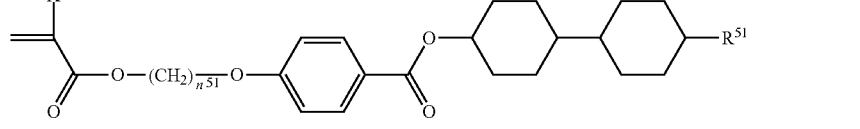

-continued

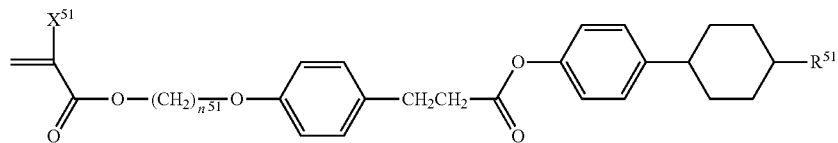

(5-V)

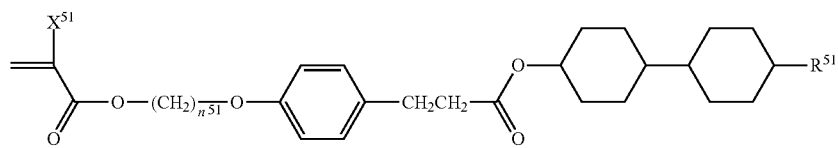

(5-W)

In formulas (5-A) to (5-W),
$X^{51}$ is hydrogen or methyl,
$W^{52}$ is hydrogen or fluorine,
$R^{51}$ is alkyl having 1 to 20 carbons (preferably, straight-chain alkyl having 1 to 10 carbons), alkoxy having 1 to 20 carbons (preferably, straight-chain alkoxy having 1 to 10 carbons), trifluoromethoxy, alkyl ester having 1 to 20 carbons (—COOR$^c$, —OCOR$^c$ or —CH=CH—COOR$^c$; R$^c$ is straight-chain alkyl having 1 to 20 carbons (preferably, 1 to 10 carbons)).

Then, $n^{51}$ is an integer from 2 to 10, and preferably, an integer from 3 to 6.

In formulas (5-G) to (5-J), a trans isomer is further preferred.

Specific examples of compound (1), compound (2), compound (3), compound (4) and compound (5) are shown below.

Formula 25

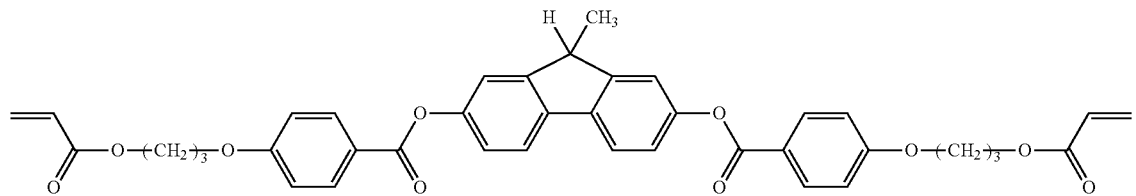

(1-1-A1)

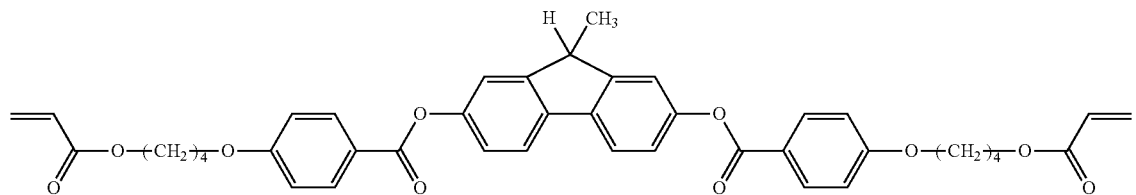

(1-1-A2)

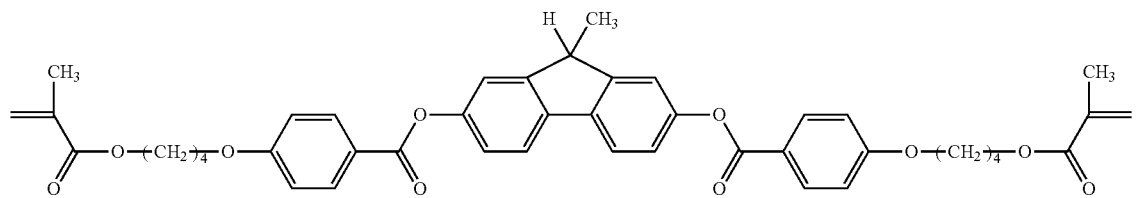

(1-1-A3)

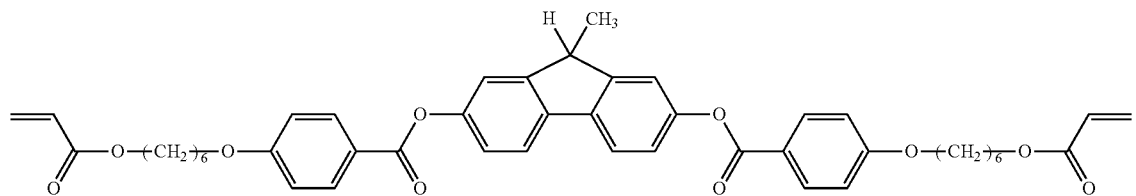

(1-1-A4)

-continued
(1-1-A5)
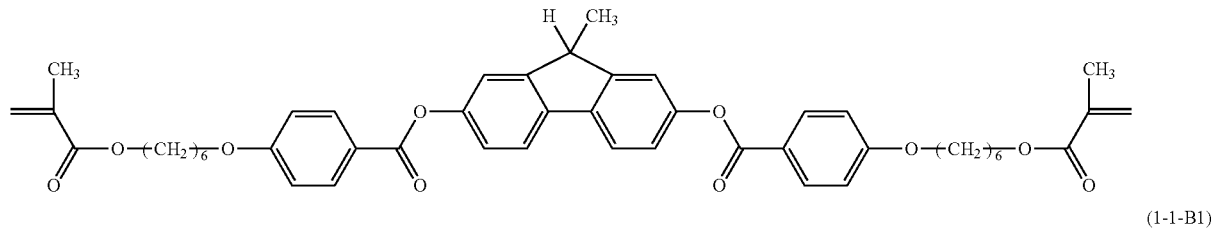
(1-1-B1)
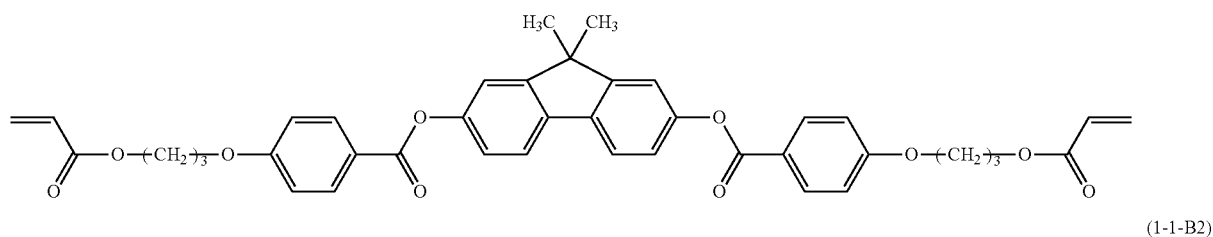
(1-1-B2)
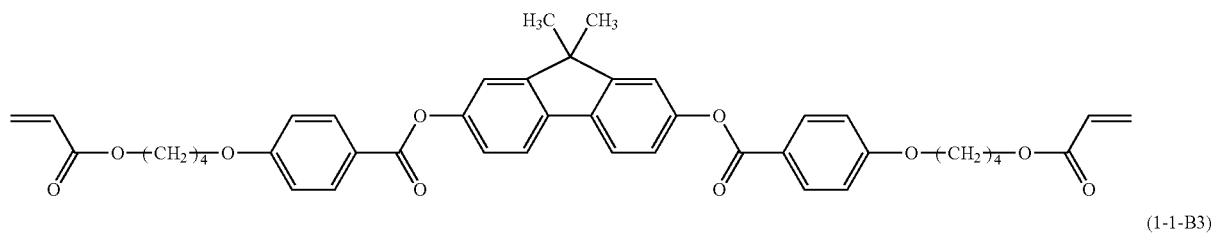
(1-1-B3)
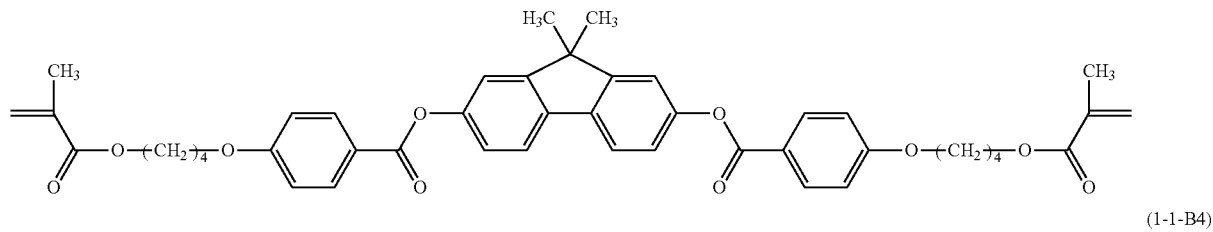
(1-1-B4)
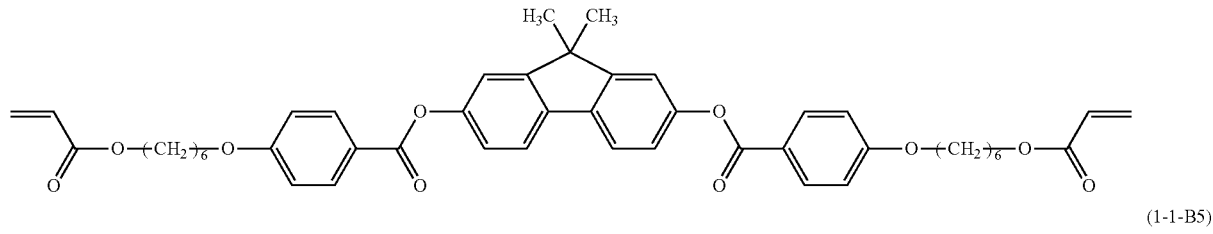
(1-1-B5)
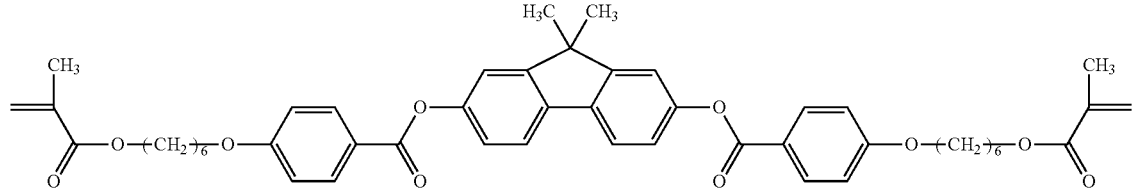
Formula 26
(1-1-C1)
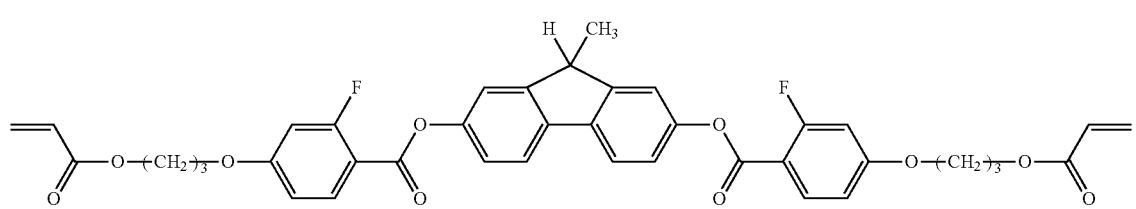

-continued
(1-1-C2)
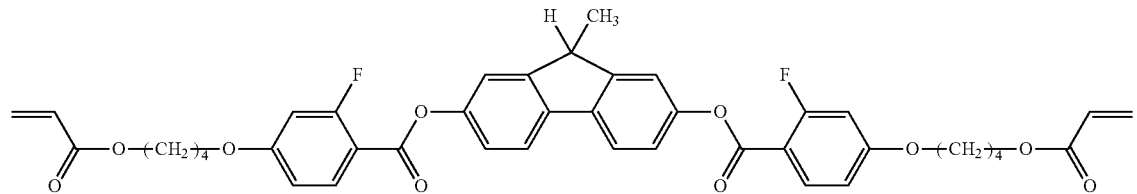
(1-1-C3)
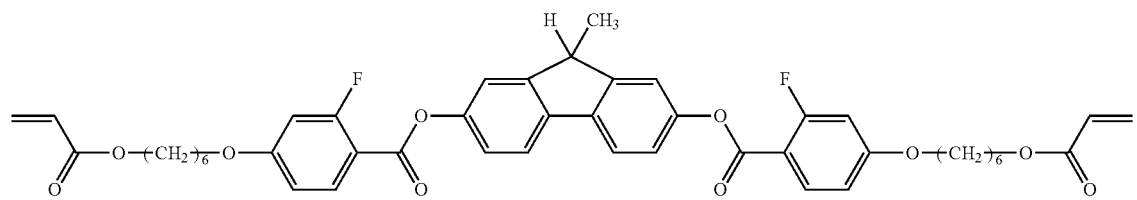
(1-1-C4)
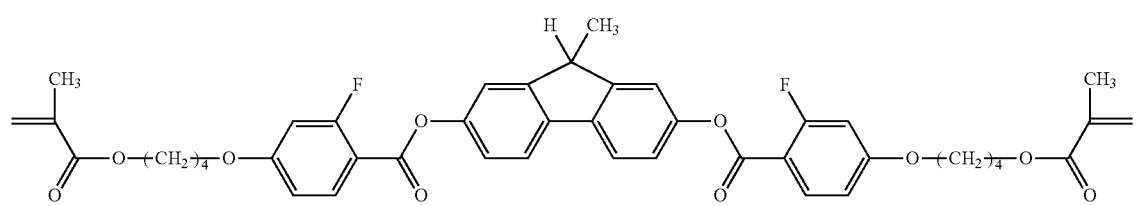
(1-1-C5)
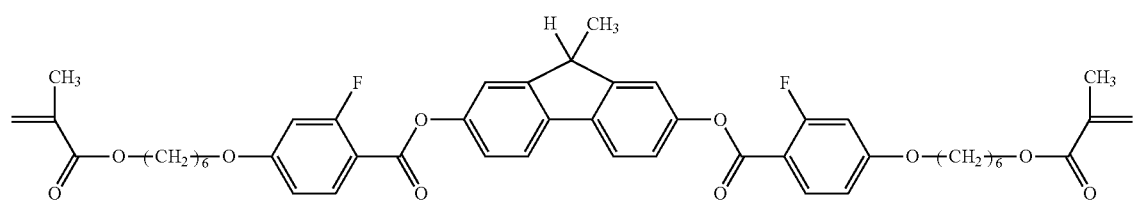
(1-1-D1)
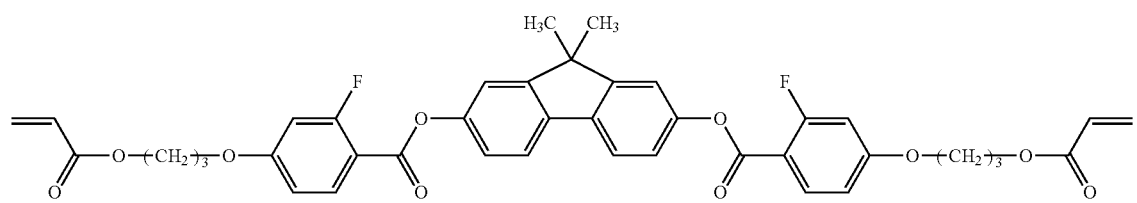
(1-1-D2)
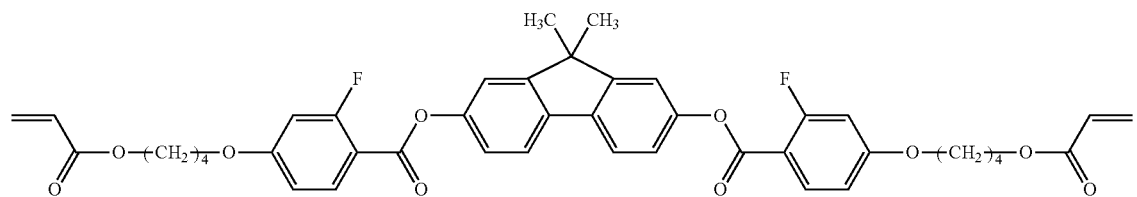
(1-1-D3)
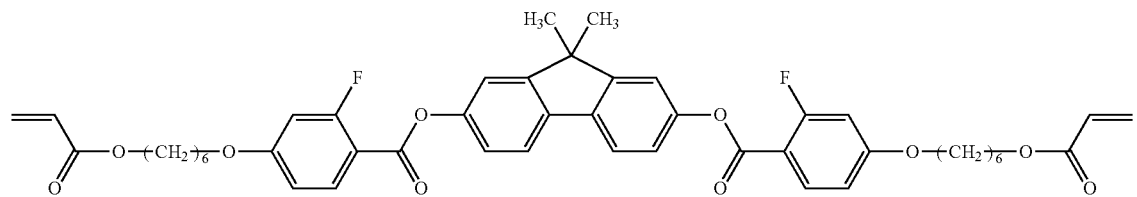

-continued
(1-1-D4)
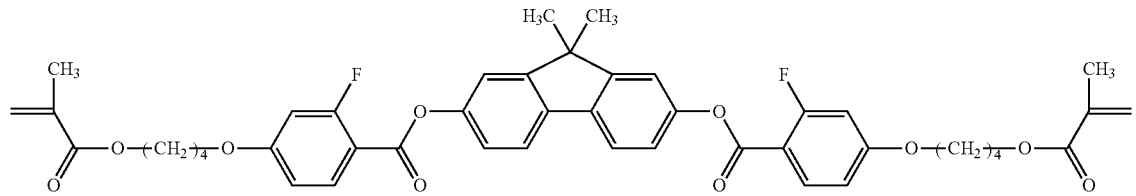
(1-1-D5)
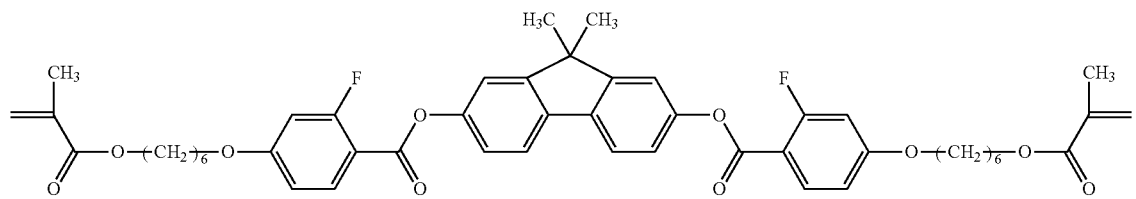
Formula 27
(2-A-1)
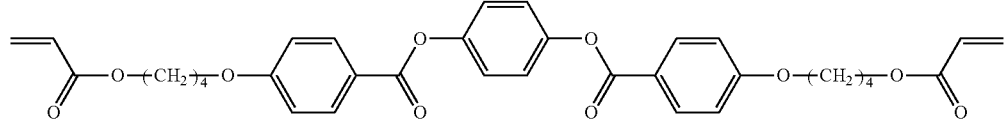
(2-A-2)
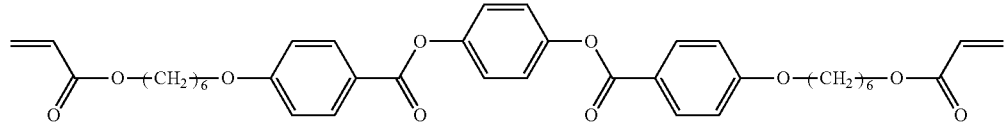
(2-A-3)
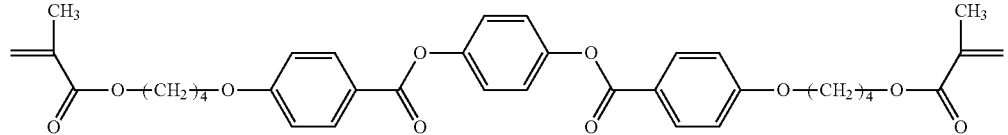
(2-A-4)
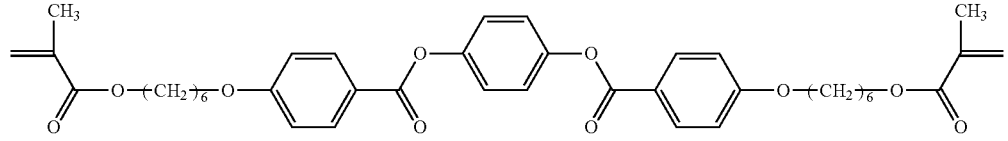
(2-A-5)
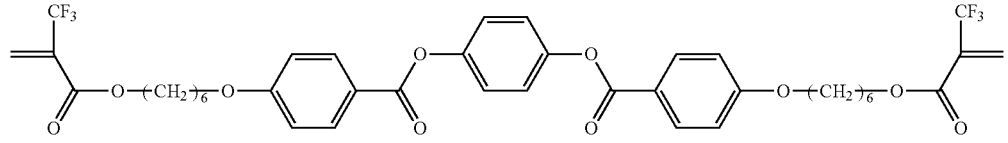
(2-M-1)
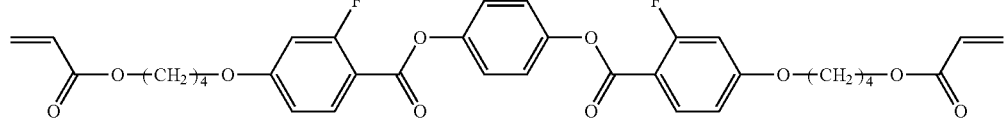
(2-M-2)
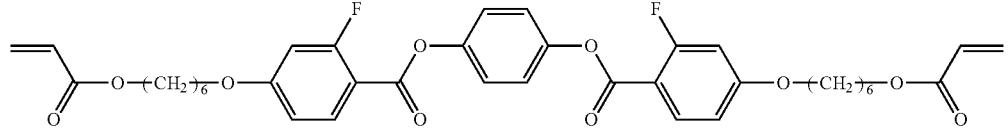

(2-M-3)
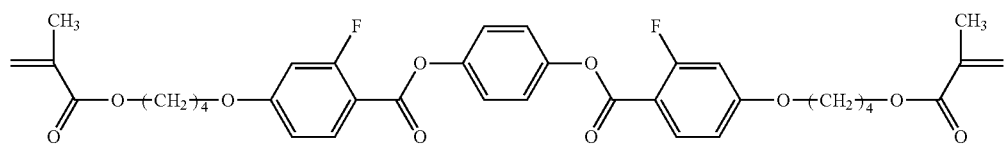
(2-M-4)
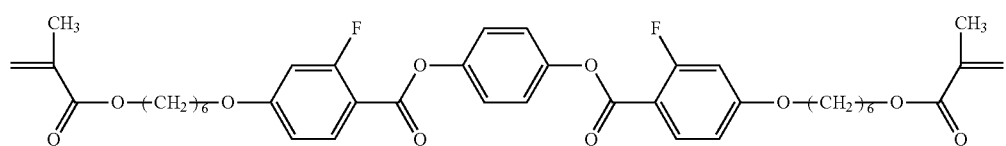
(2-B-1)
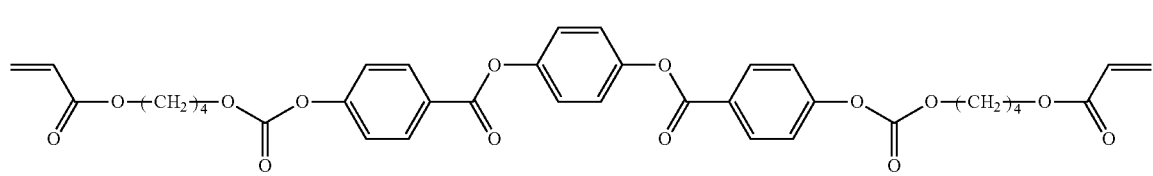
(2-B-2)
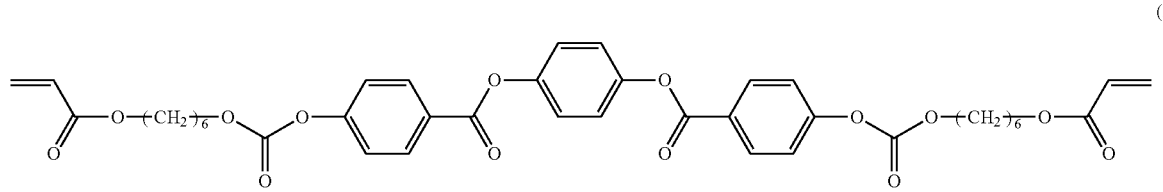
Formula 28
(2-C-1)
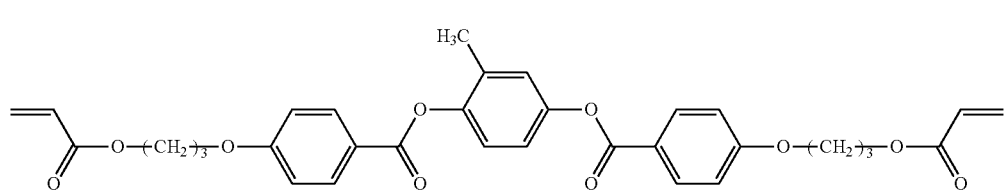
(2-C-2)
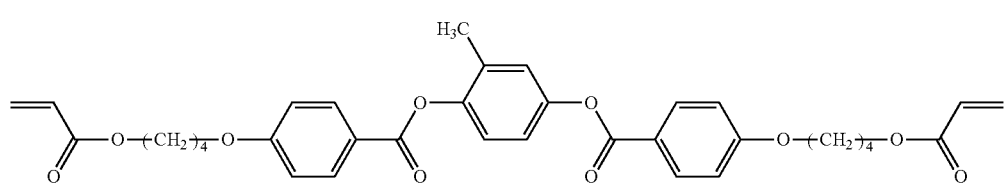
(2-C-3)
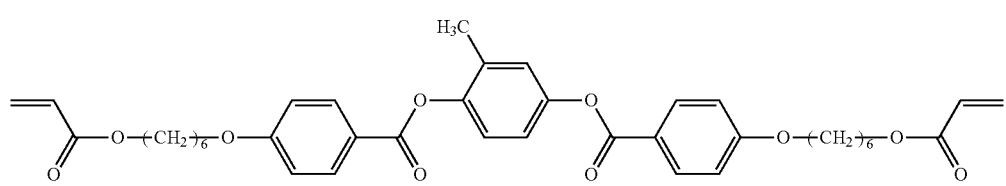
(2-C-4)
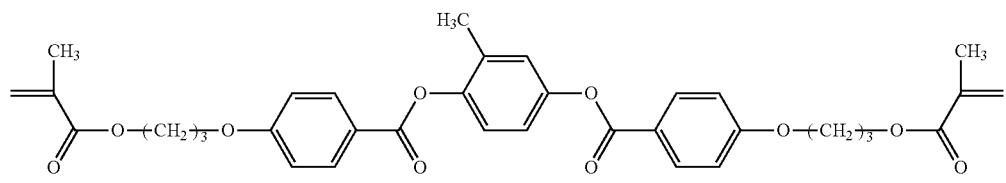
(2-C-5)
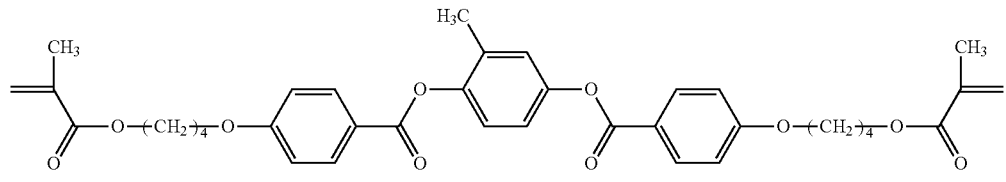

-continued
(2-C-6)
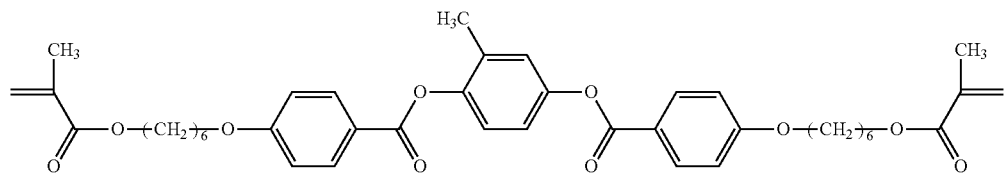
Formula 29
(2-N-1)
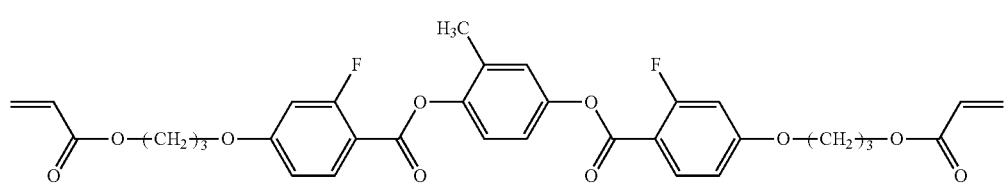
(2-N-2)
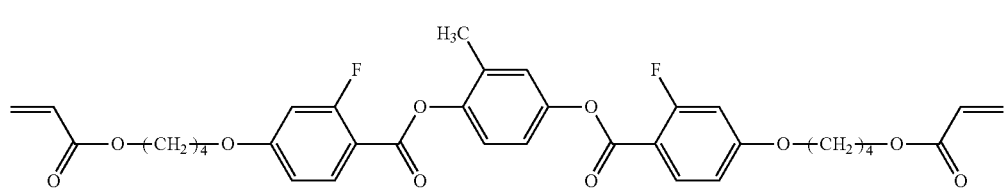
(2-N-3)
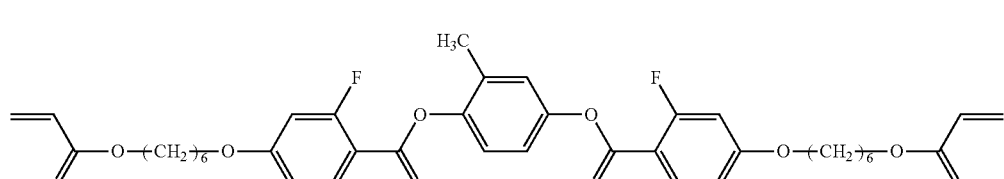
(2-N-4)
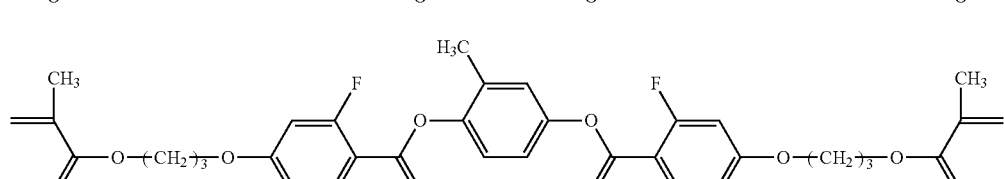
(2-N-5)
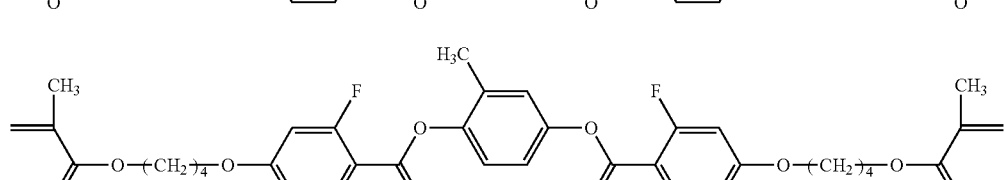
(2-N-6)
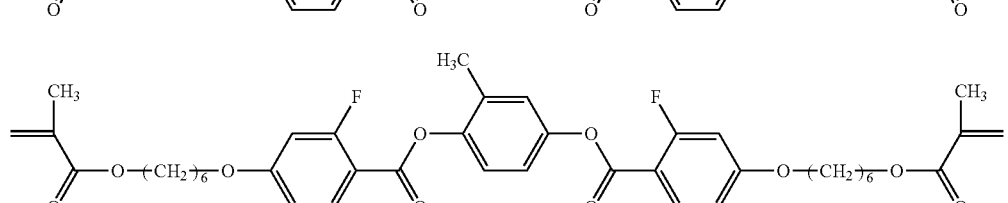
Formula 30
(2-D-1)
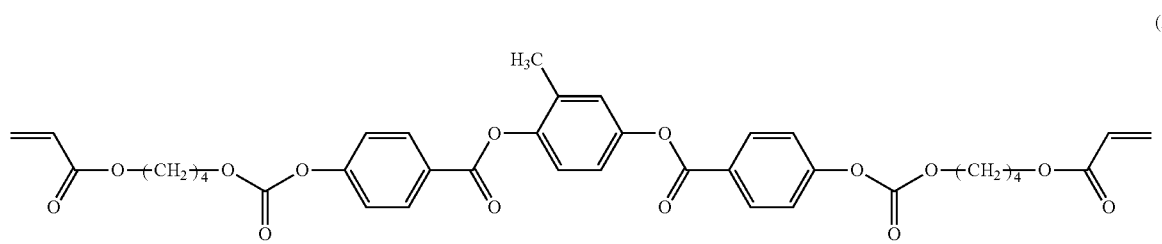

-continued
(2-D-2)
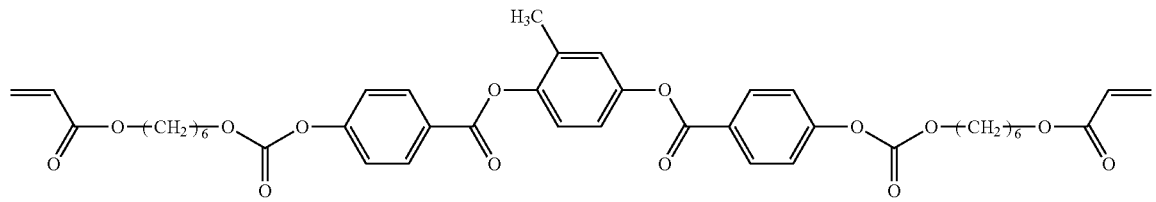
Formula 31
(2-O-1)
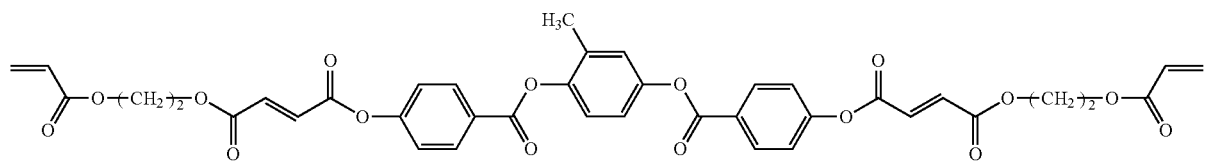
(2-O-2)
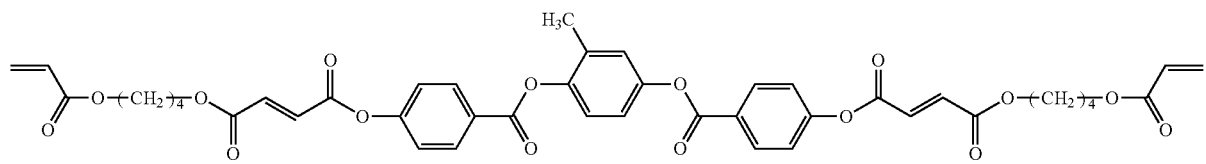
(2-O-3)
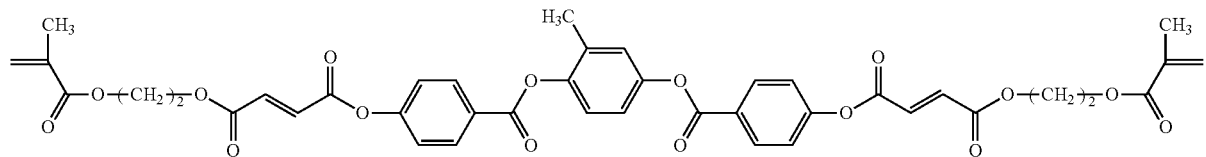
(2-O-4)
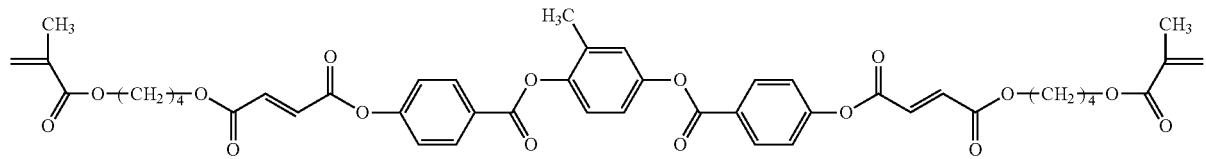
Formula 32
(2-P-1)
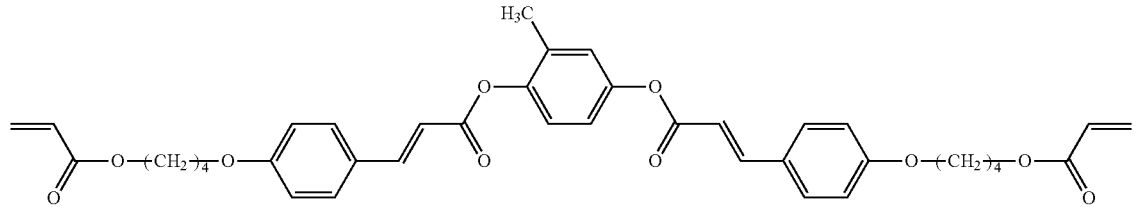
(2-P-2)
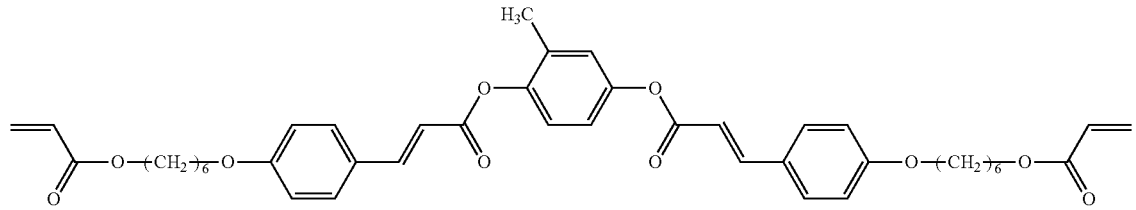

(2-Q-1)
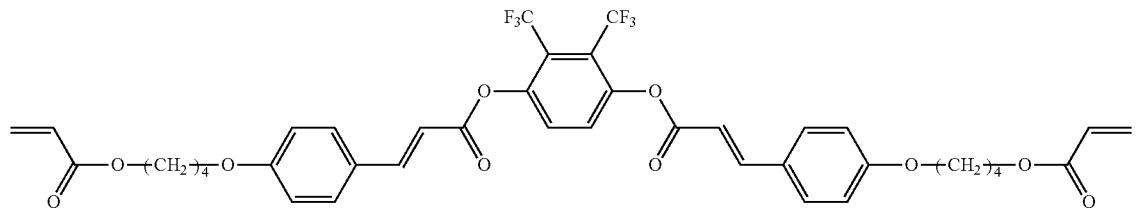
(2-Q-2)
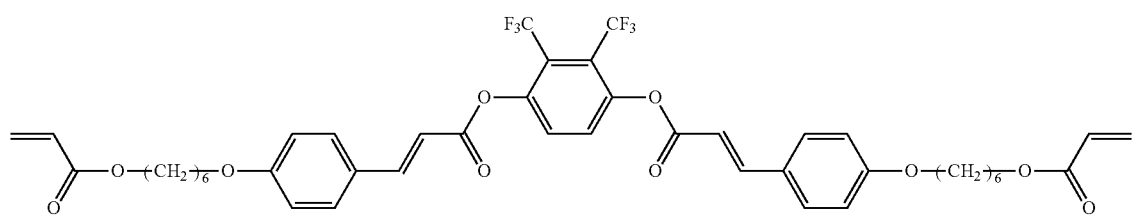
Formula 33
(2-R-1)
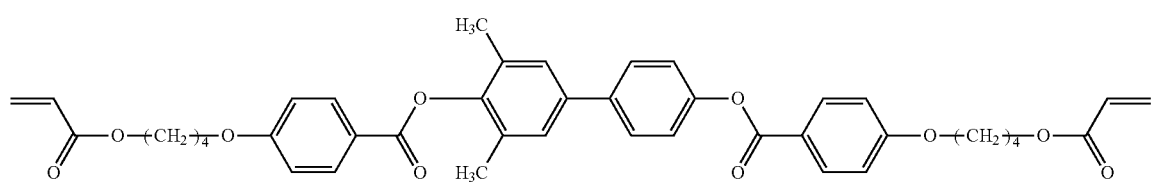
(2-R-2)
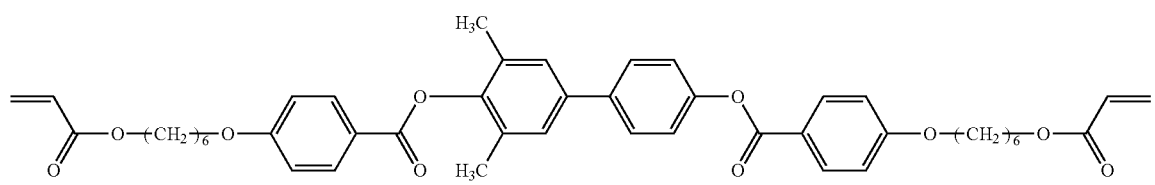
(2-R-3)
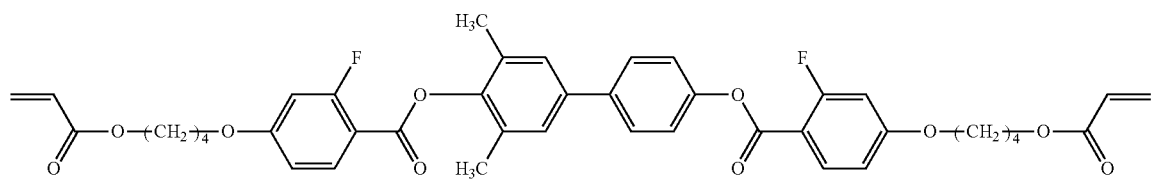
(2-R-4)
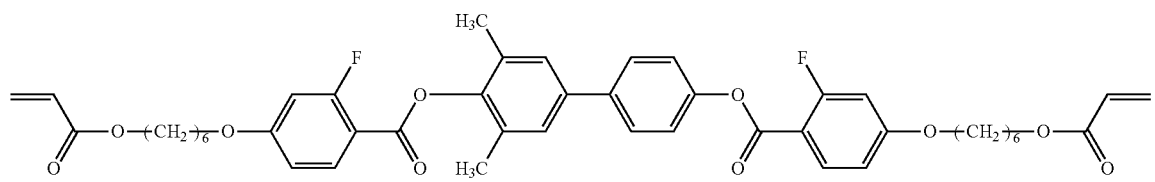
(2-S-1)
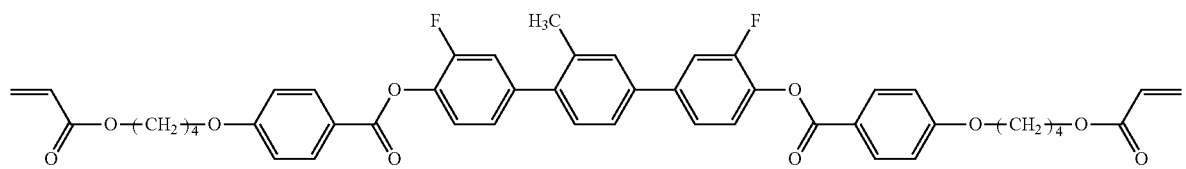

(2-S-2)
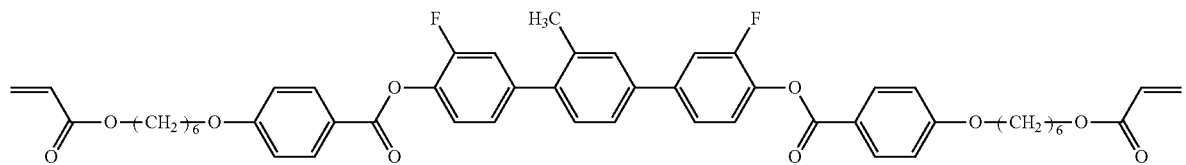
(2-S-3)
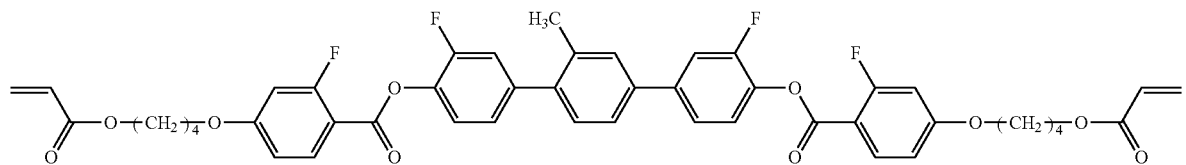
(2-S-4)
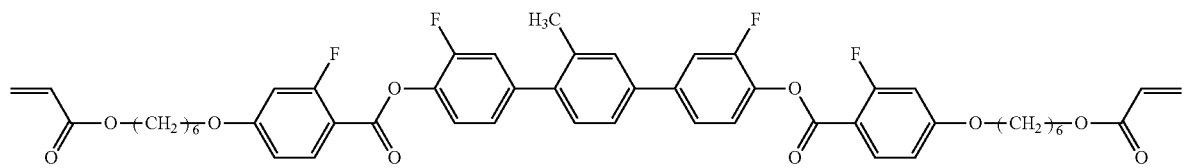
Formula 34
(3-2-A-1)
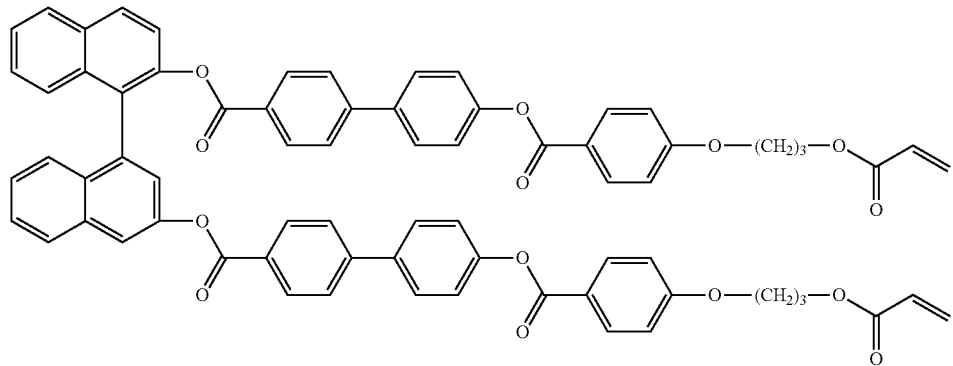
(3-2-A-2)
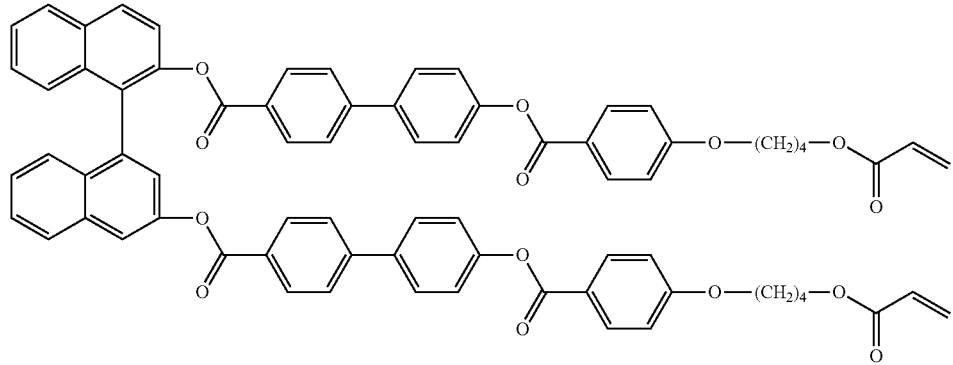

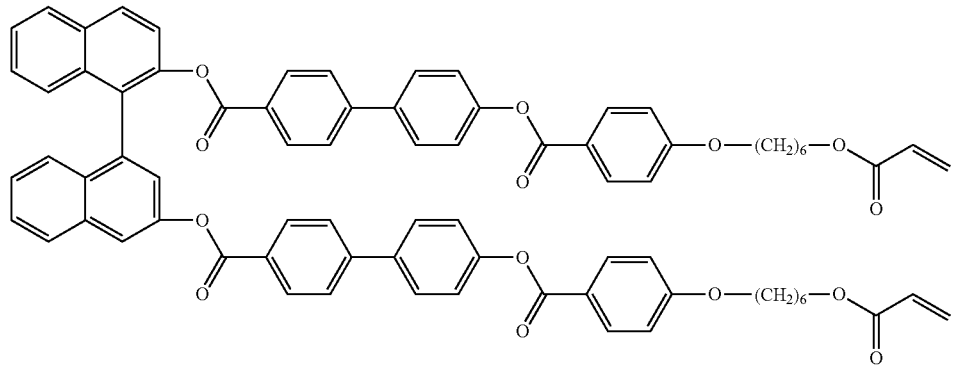
(3-2-A-3)
Formula 35
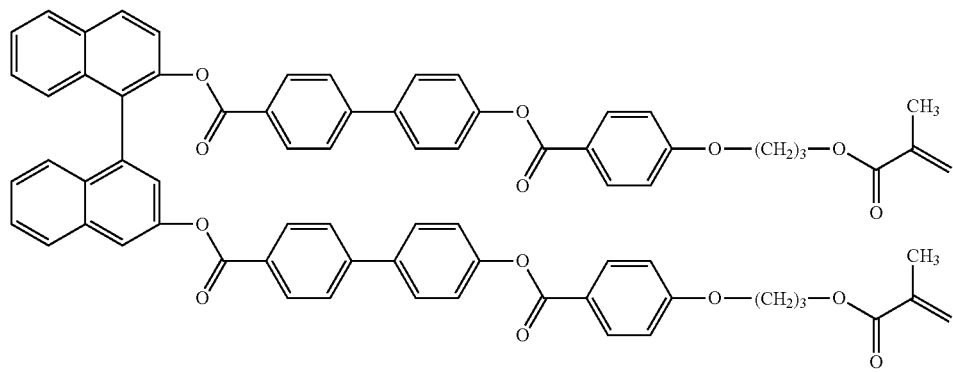
(3-2-A-4)
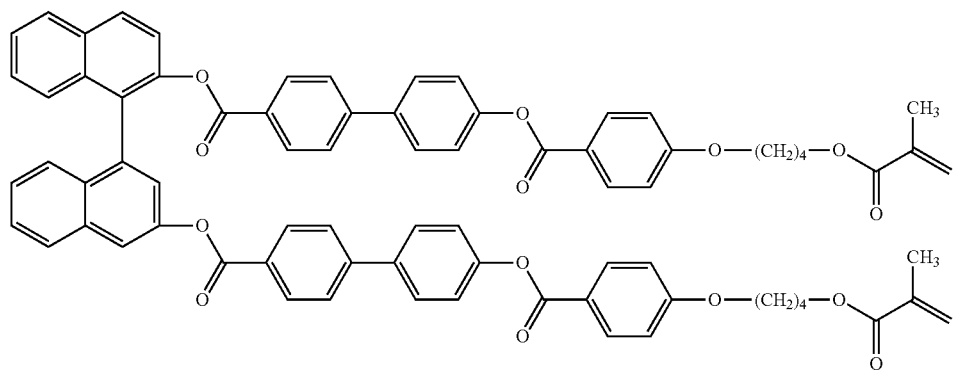
(3-2-A-5)
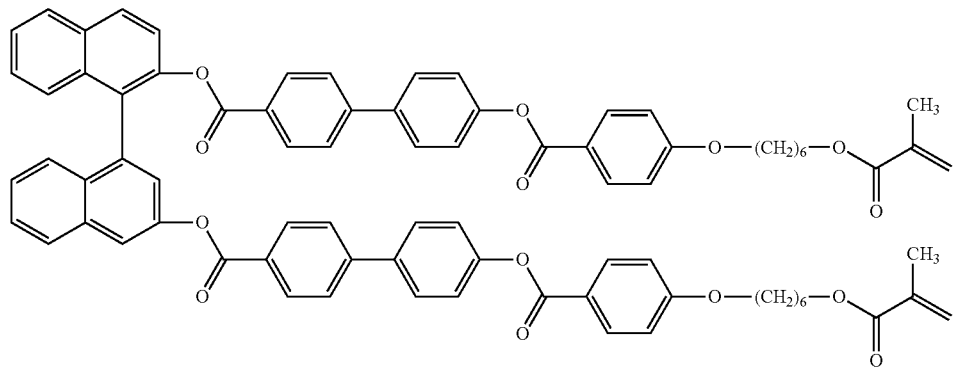
(3-2-A-6)

Formula 36
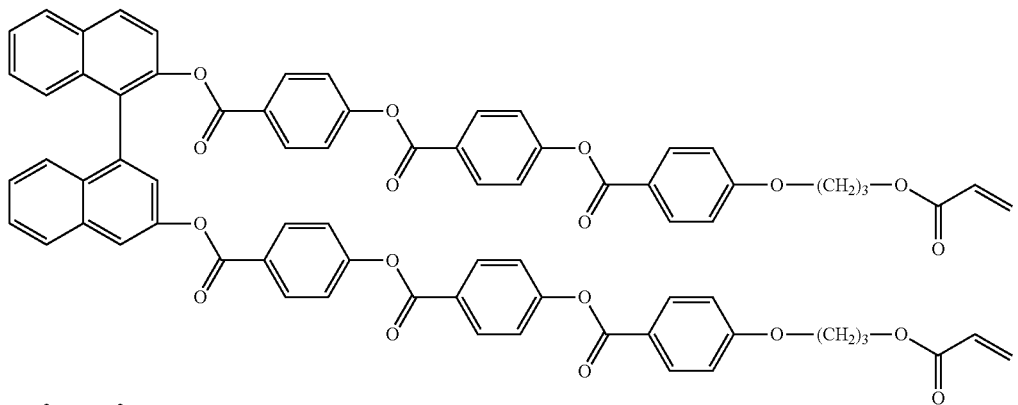
(3-2-B-1)
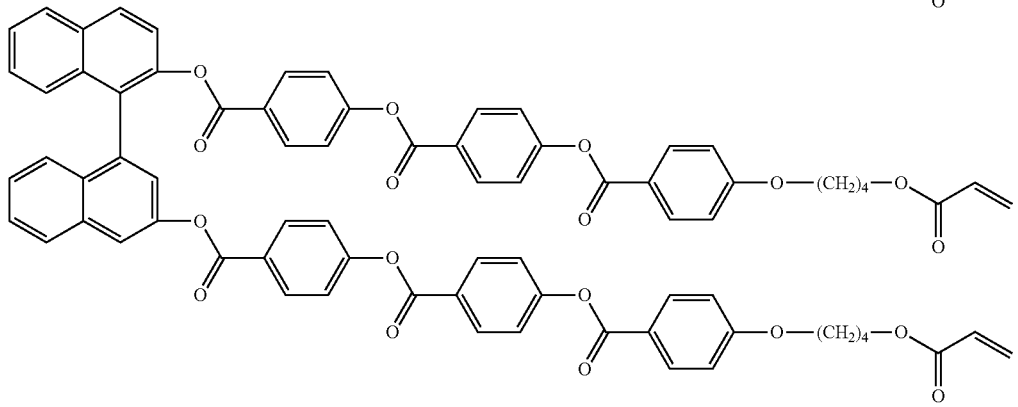
(3-2-B-2)
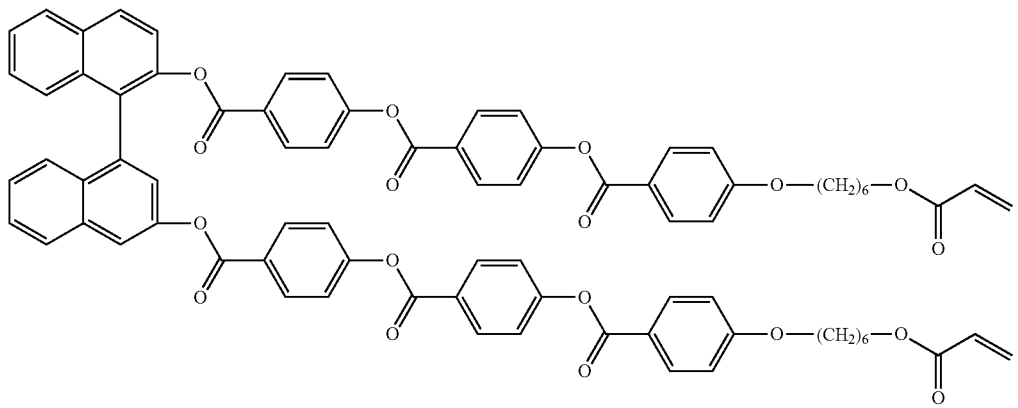
(3-2-B-3)
Formula 37
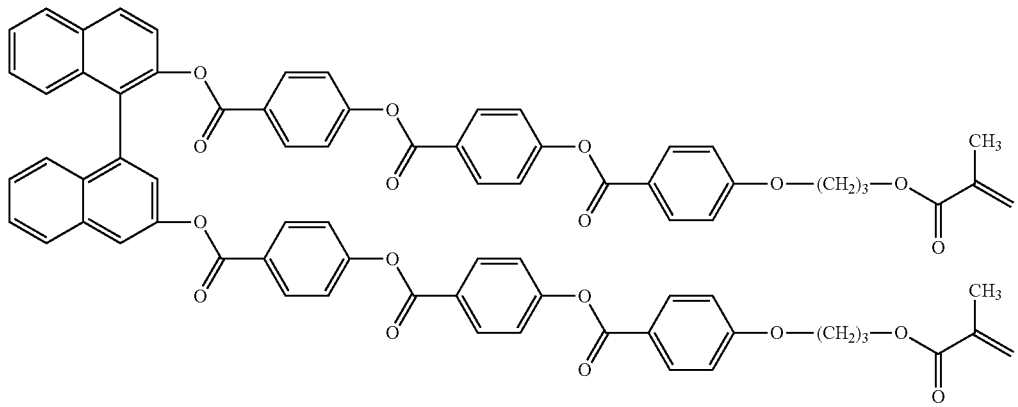
(3-2-B-4)

(3-2-B-5)
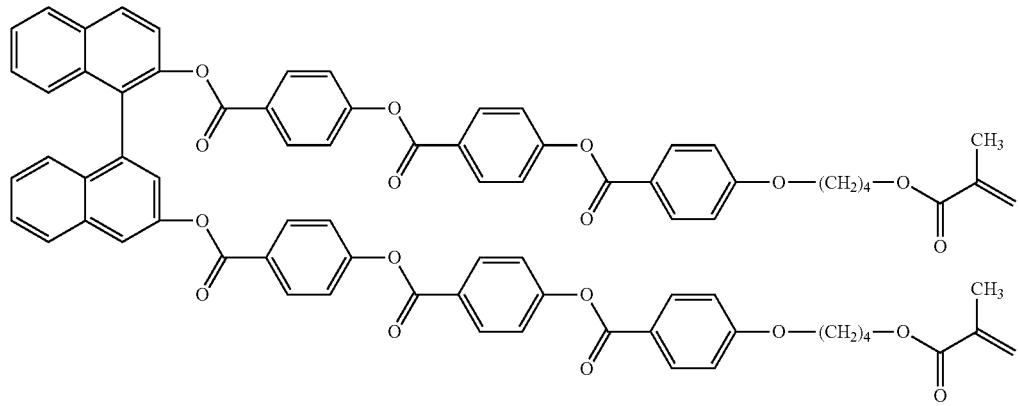
(3-2-B-6)
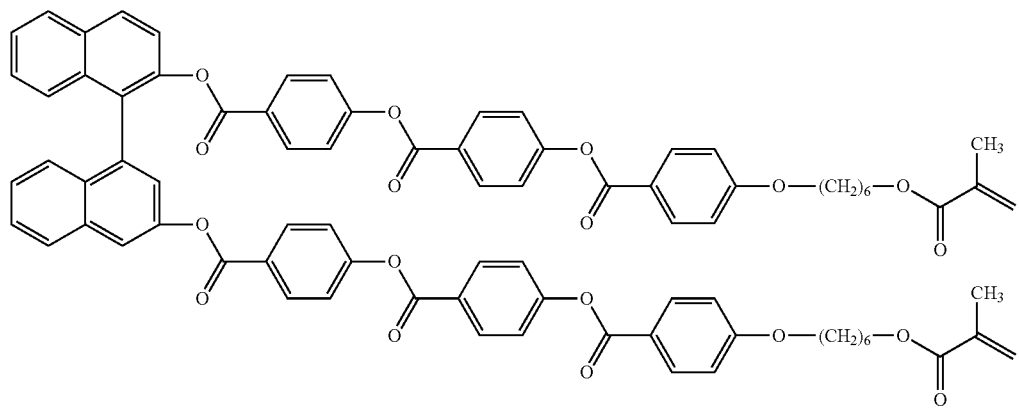
Formula 38
(3-2-C-1)
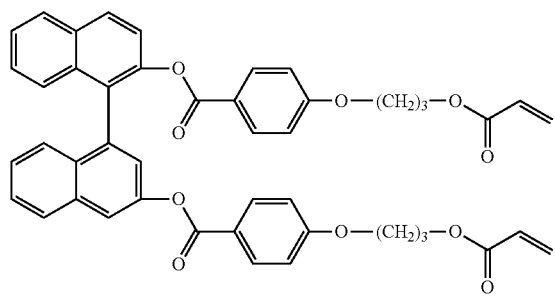
(3-2-C-2)
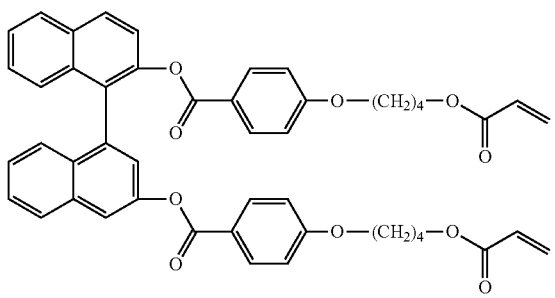
(3-2-C-3)
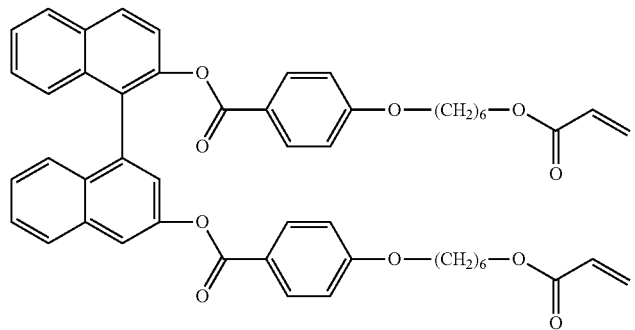

Formula 39
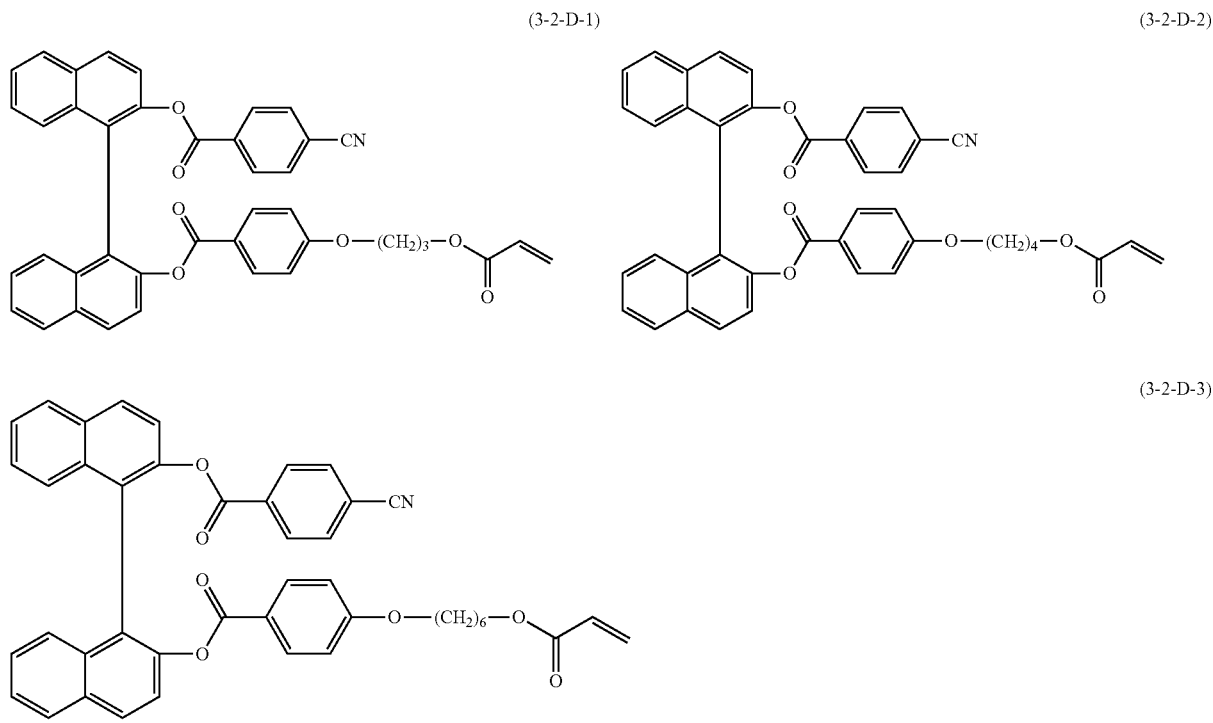
Formula 40
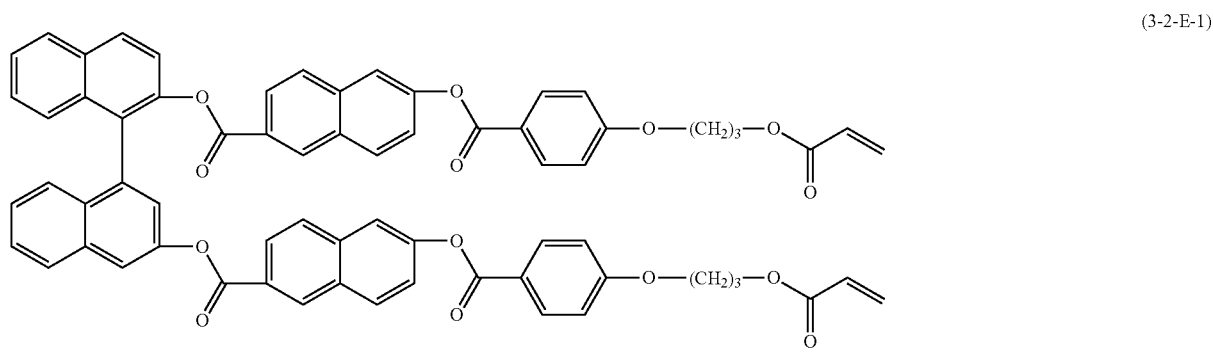
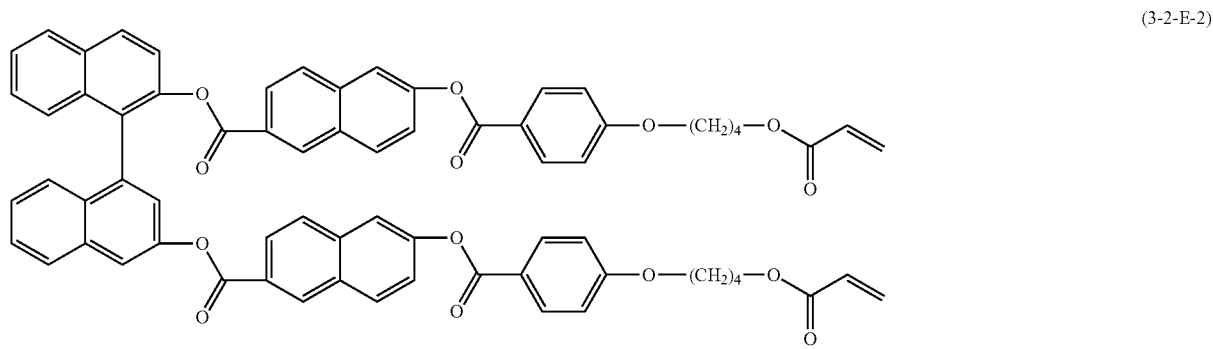

-continued
(3-2-F-1)
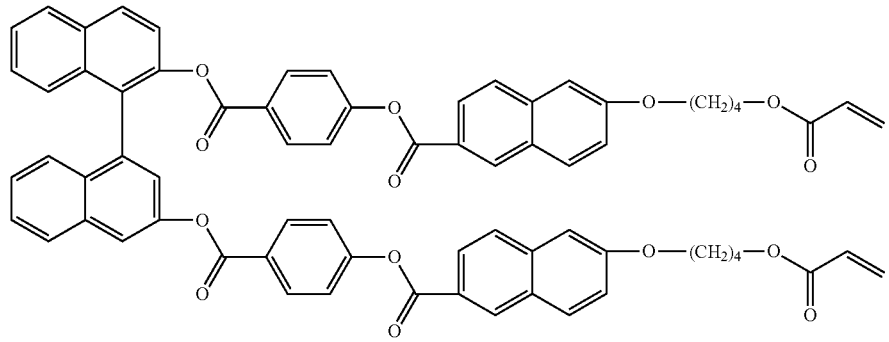
(3-2-G-1)
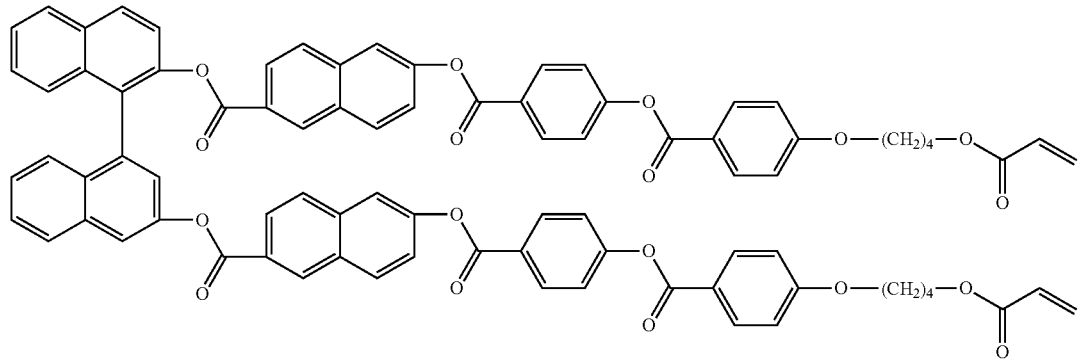
Formula 41
(3-2-H-1) (3-2-I-1)
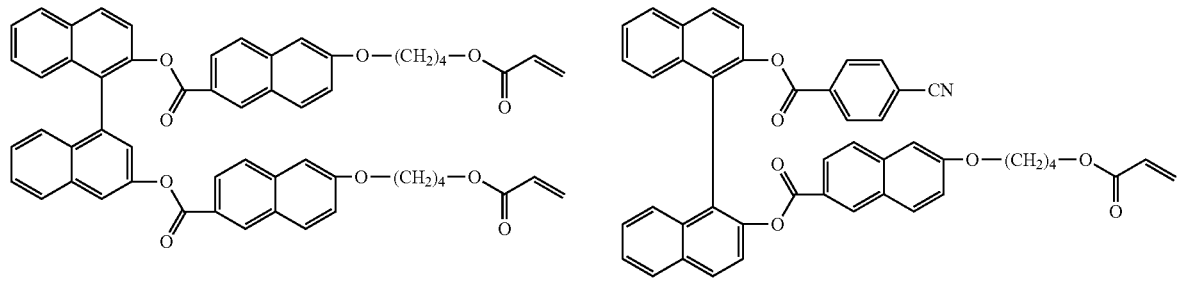
Formula 42
(4-1-A-1)
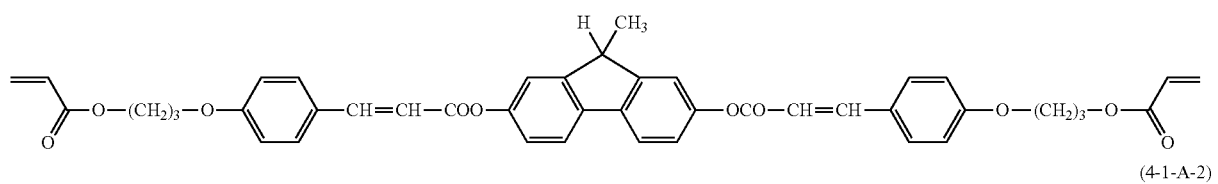
(4-1-A-2)
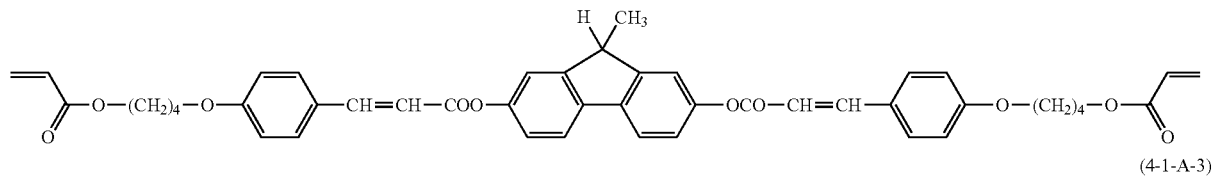
(4-1-A-3)
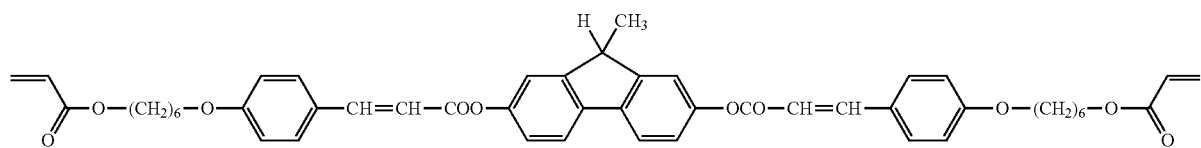

(4-1-A-4)
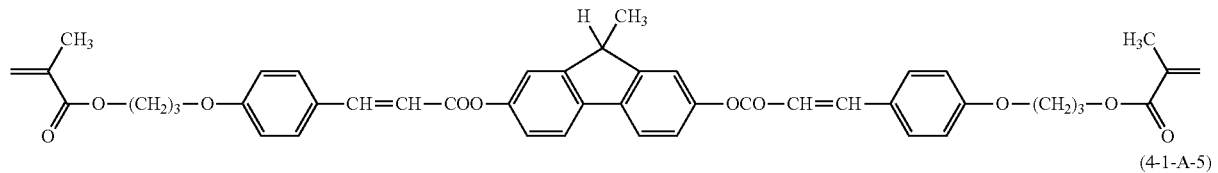
(4-1-A-5)
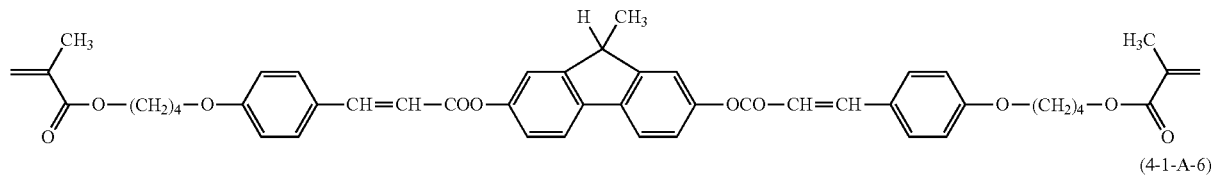
(4-1-A-6)
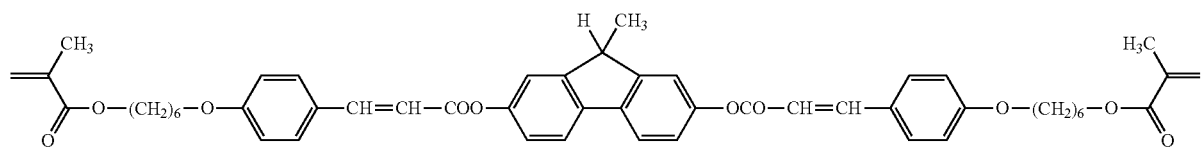
Formula 43
(4-1-B-1)
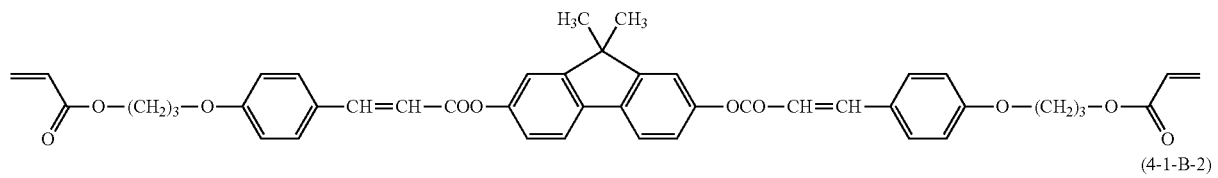
(4-1-B-2)
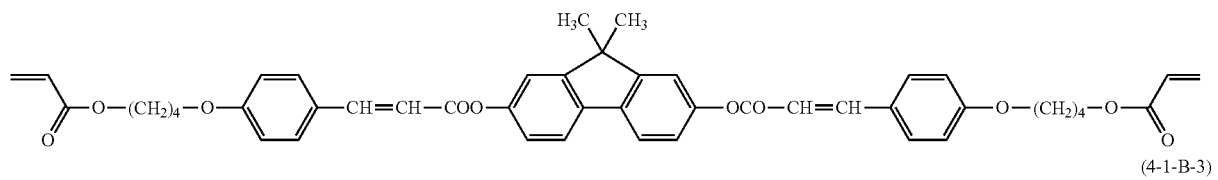
(4-1-B-3)
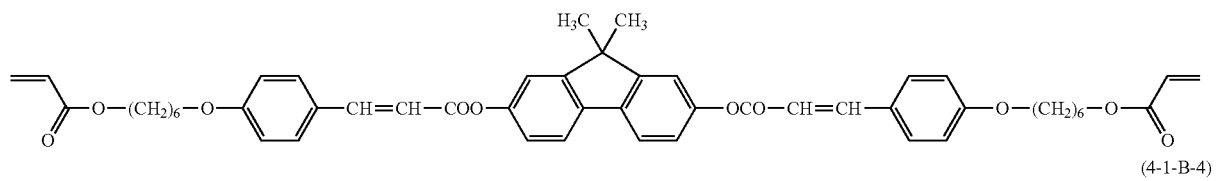
(4-1-B-4)
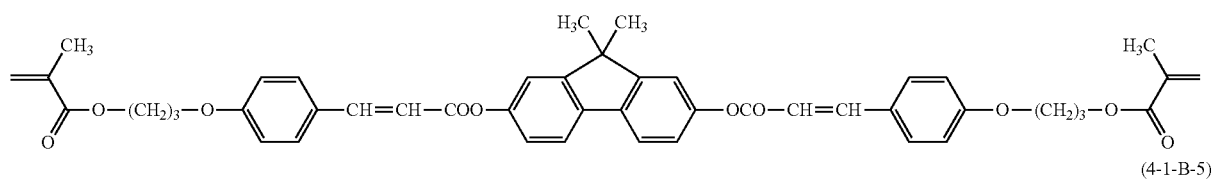
(4-1-B-5)
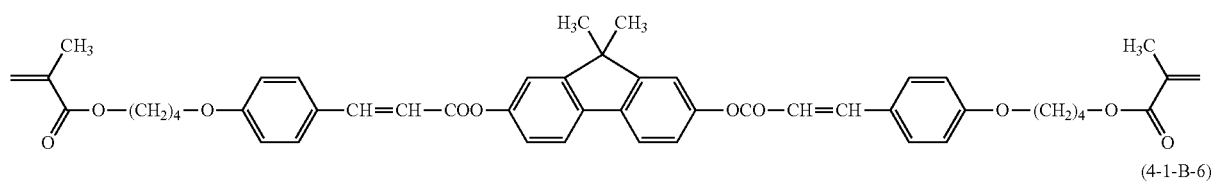
(4-1-B-6)
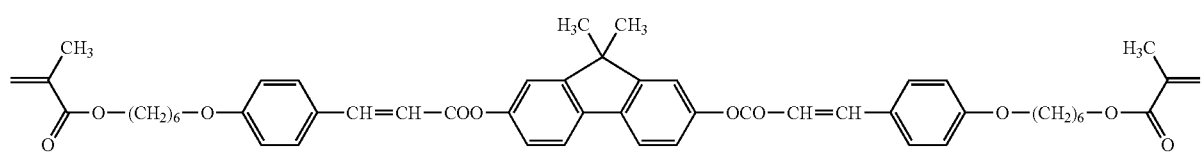

Formula 44
(4-1-C-1)
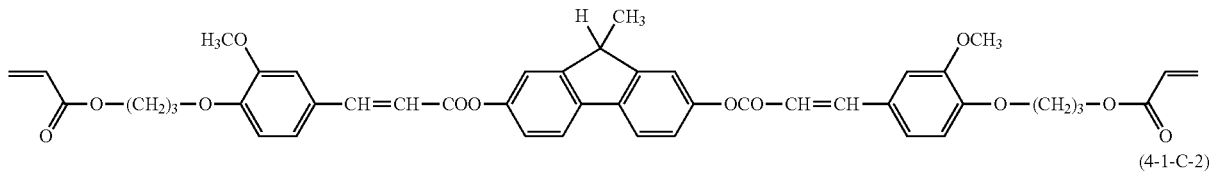
(4-1-C-2)
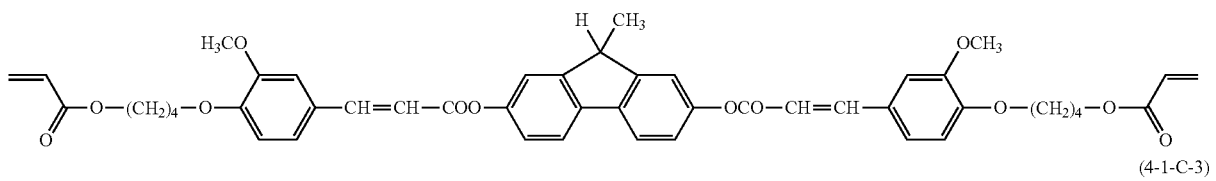
(4-1-C-3)
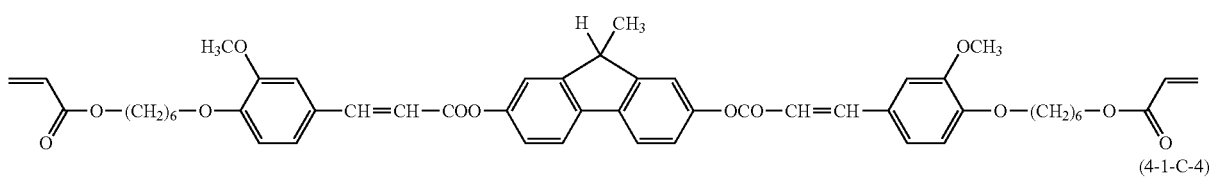
(4-1-C-4)
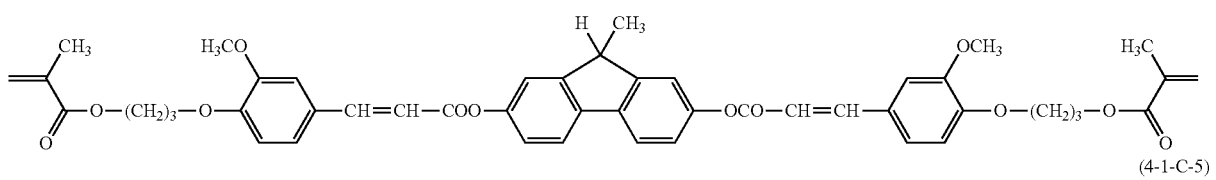
(4-1-C-5)
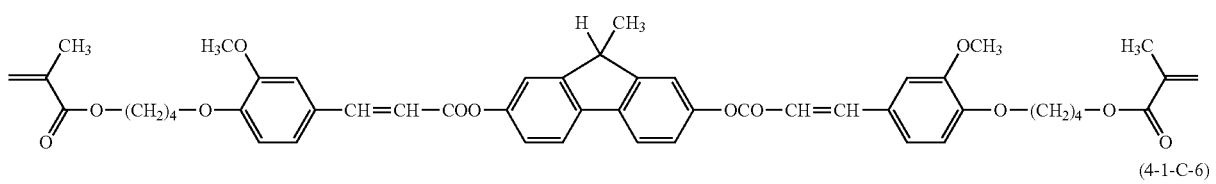
(4-1-C-6)
Formula 45
(4-1-D-1)
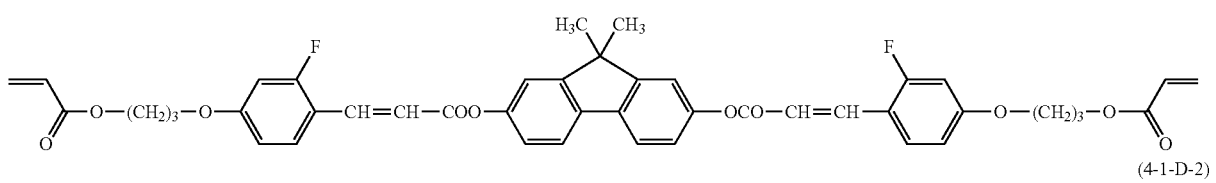
(4-1-D-2)
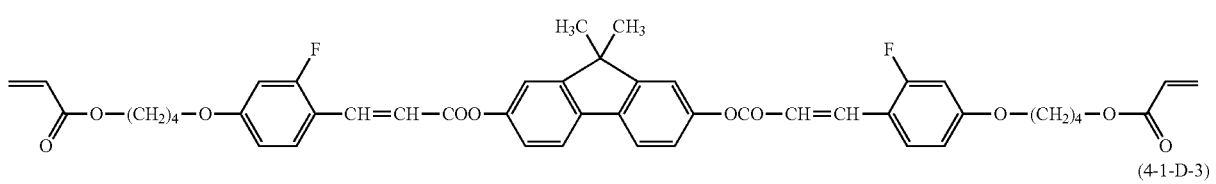
(4-1-D-3)
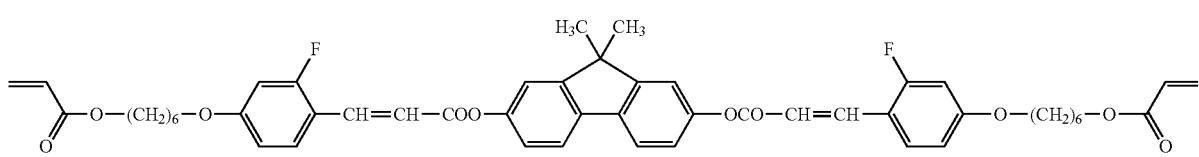

-continued
(4-1-D-4)
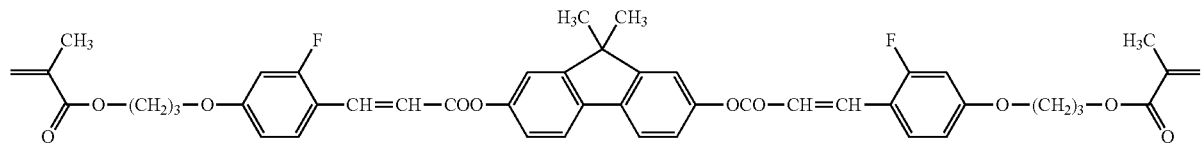
(4-1-D-5)
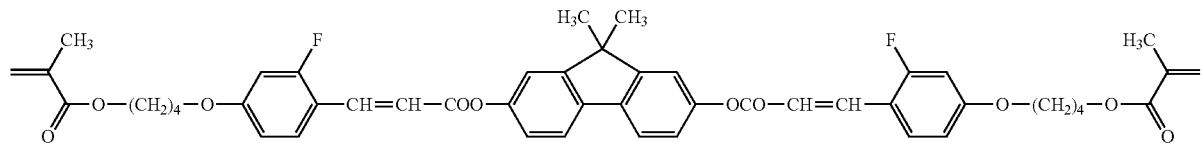
(4-1-D-6)
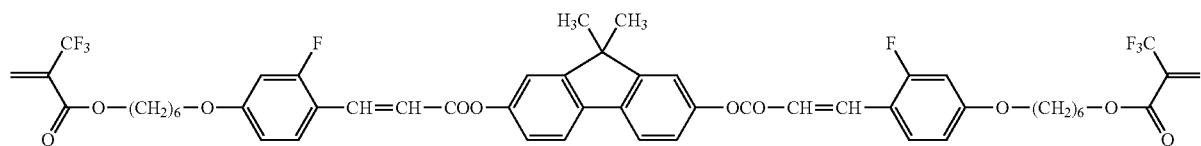
Formula 46
(4-1-E-1)
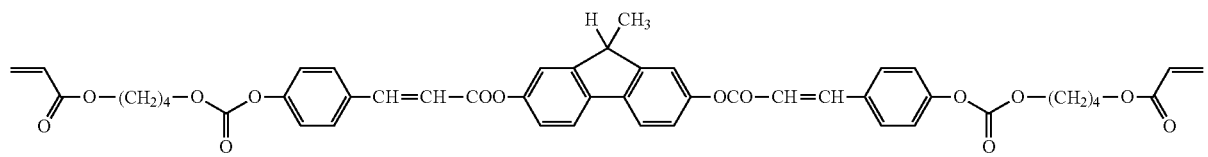
(4-1-E-2)
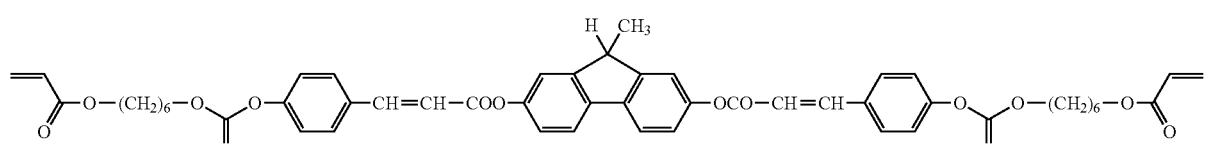
(4-1-F-1)
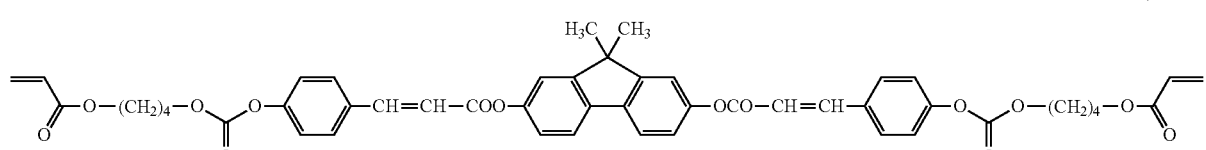
(4-1-F-2)
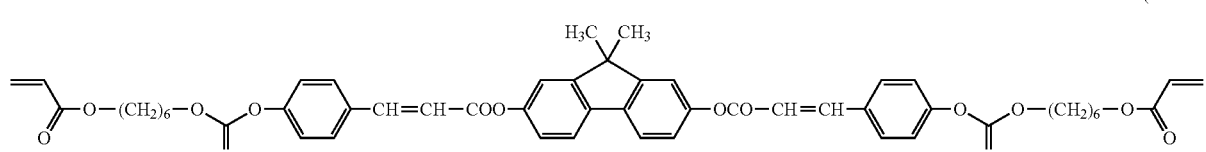
In formulas (4-1-A-1) to (4-1-F-2), a trans isomer is preferred, and both of —CH=CH— further preferably take a trans form.

Formula 47
(4-2-A-1)
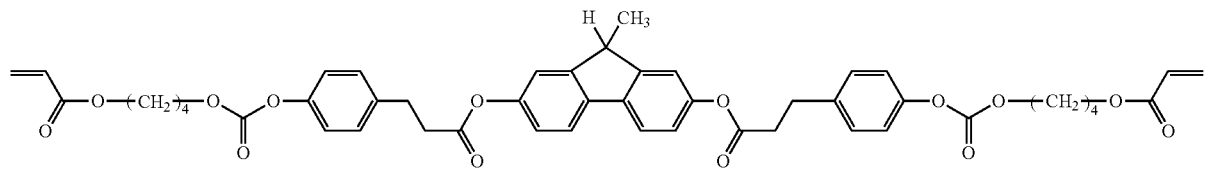
(4-2-A-2)
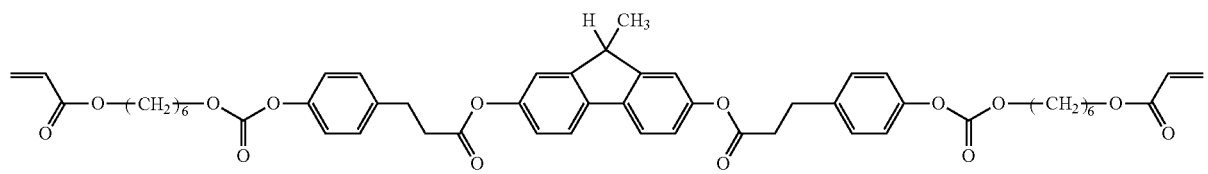
(4-2-B-1)
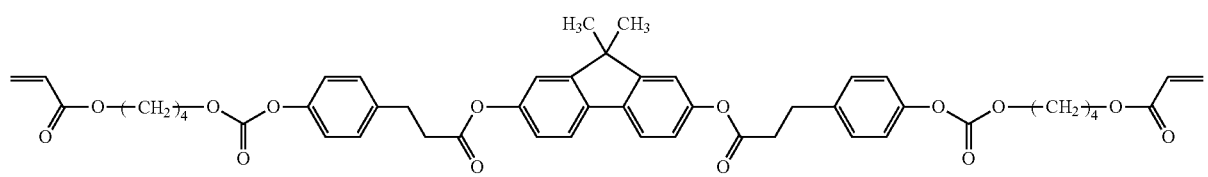
(4-2-B-2)
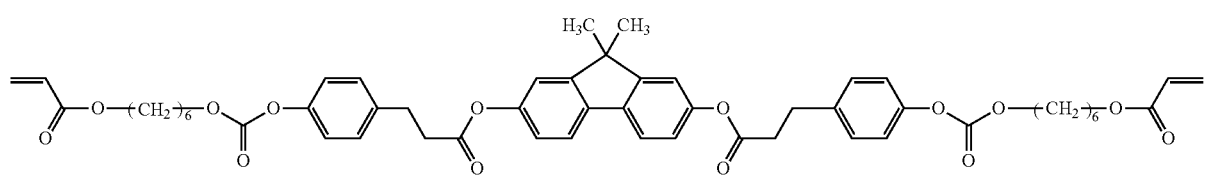
Formula 48
(4-2-C-1)
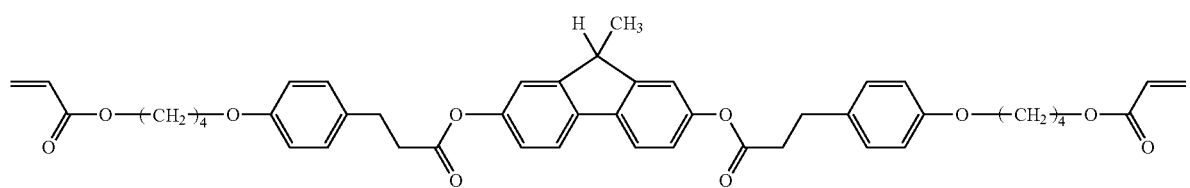
(4-2-C-2)
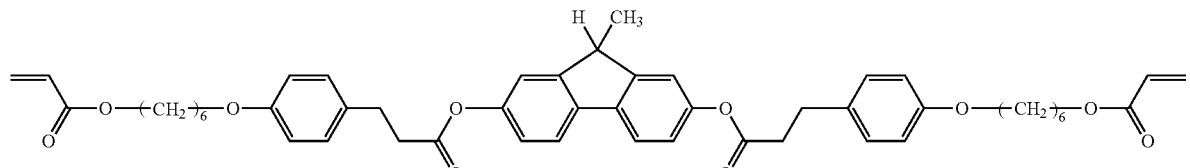
(4-2-D-1)
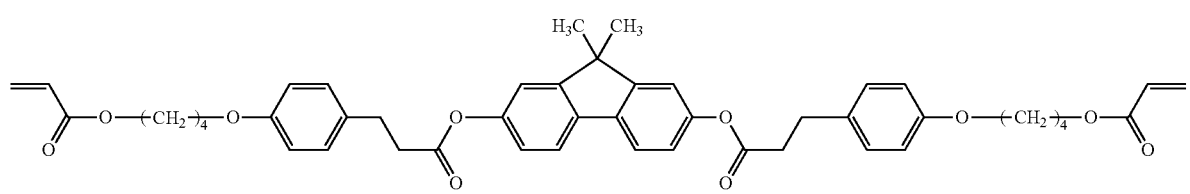

-continued
(4-2-D-2)
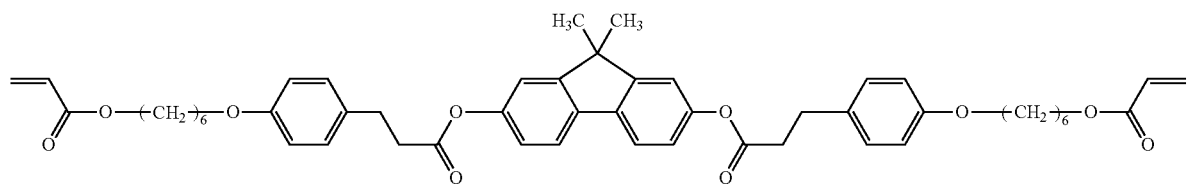
Formula 49
(5-A-1) (5-A-2)
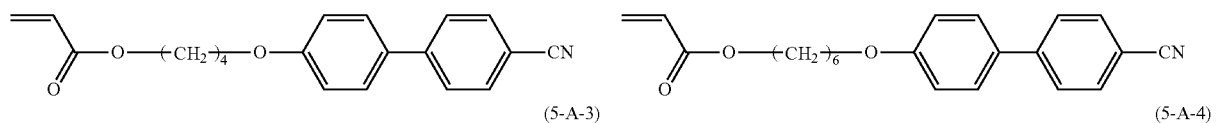
(5-A-3) (5-A-4)
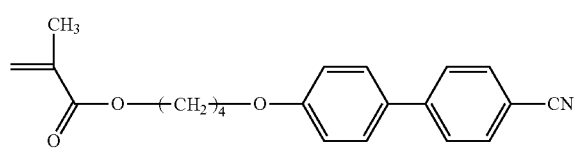 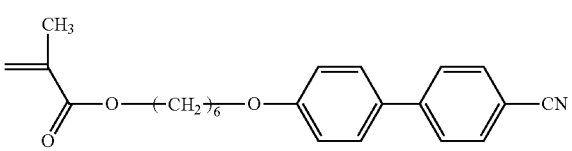
Formula 50
(5-B-1) (5-B-2)
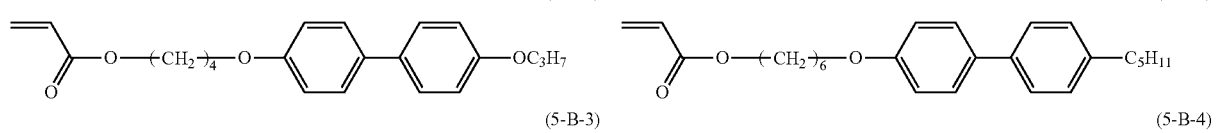
(5-B-3) (5-B-4)
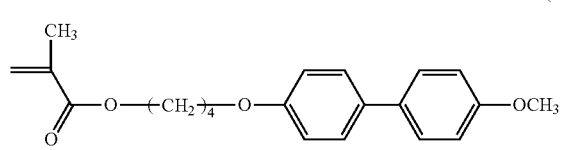 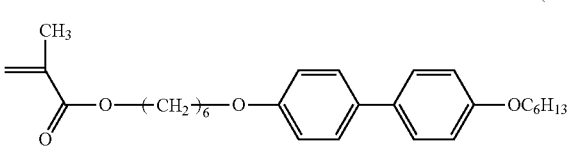
Formula 51
(5-C-1) (5-C-2)
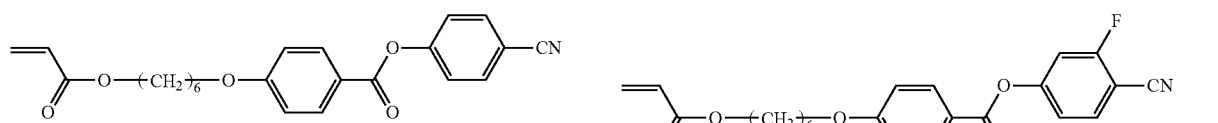
(5-C-3) (5-C-4)
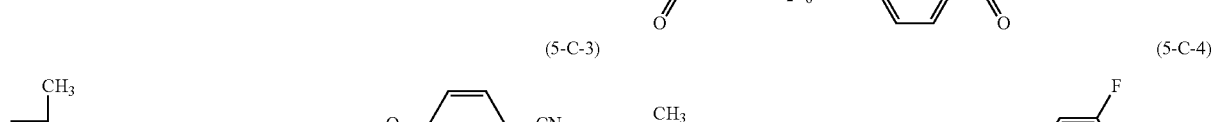
(5-C-5) (5-C-6)
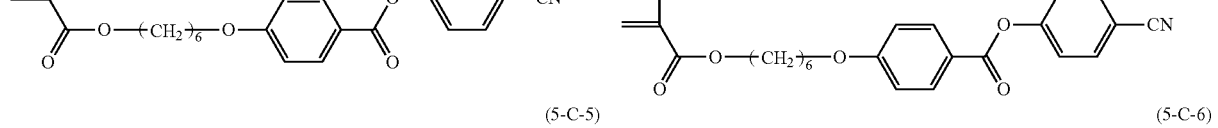
(5-C-7) (5-C-8)
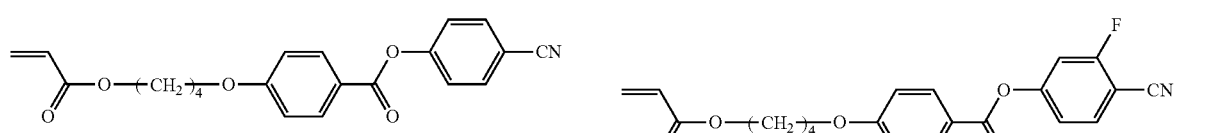

-continued
Formula 52
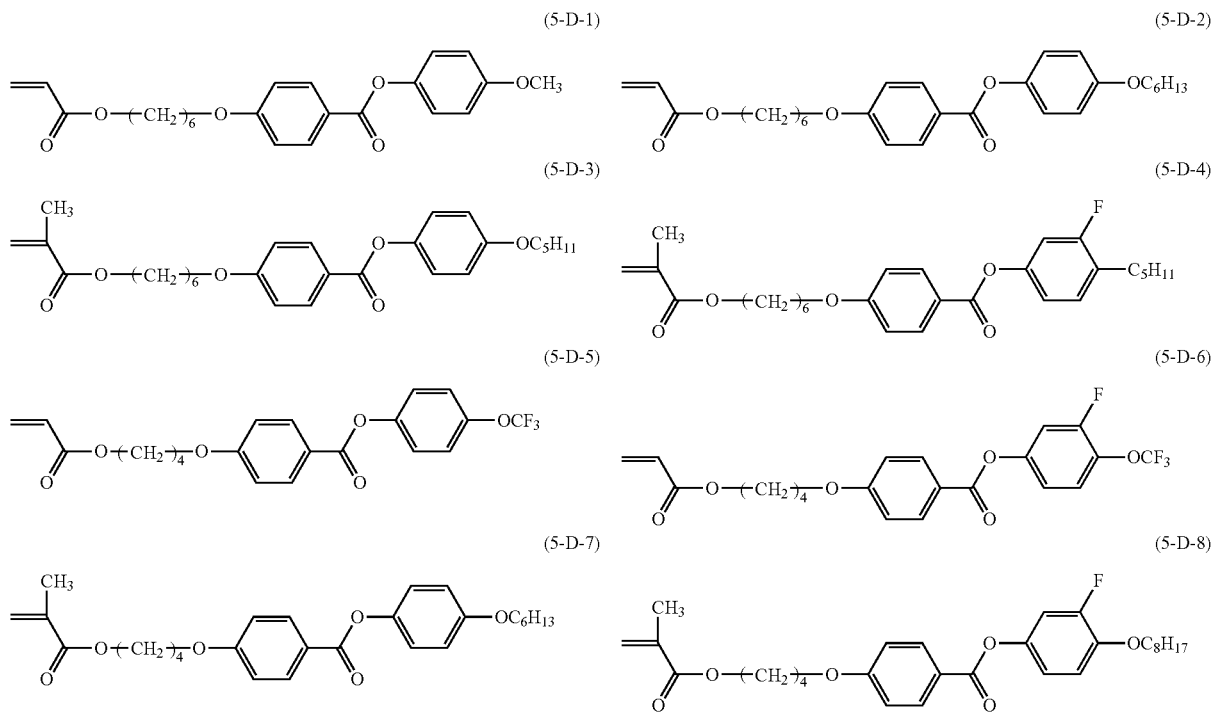
Formula 53
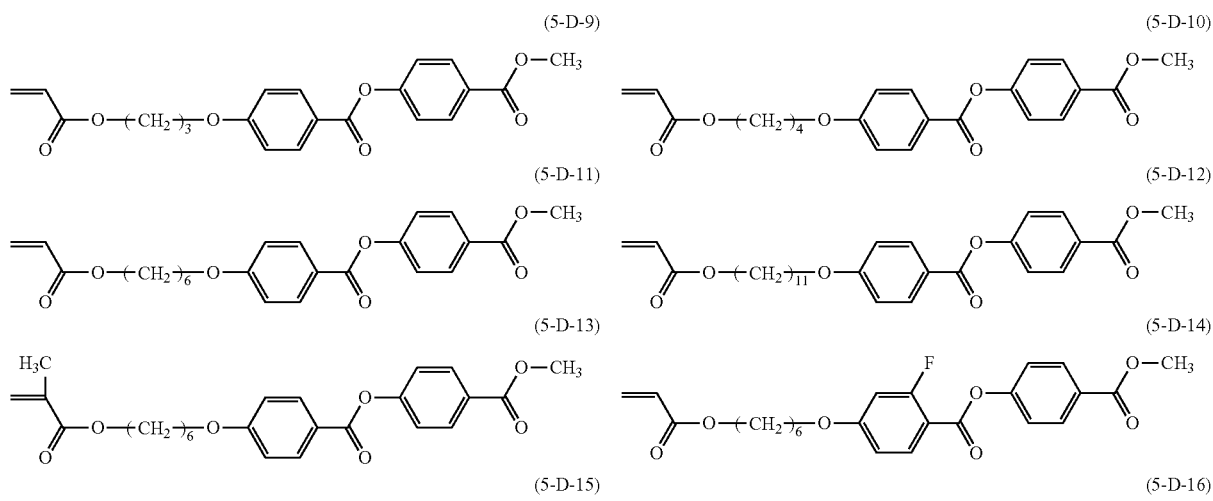
Formula 54
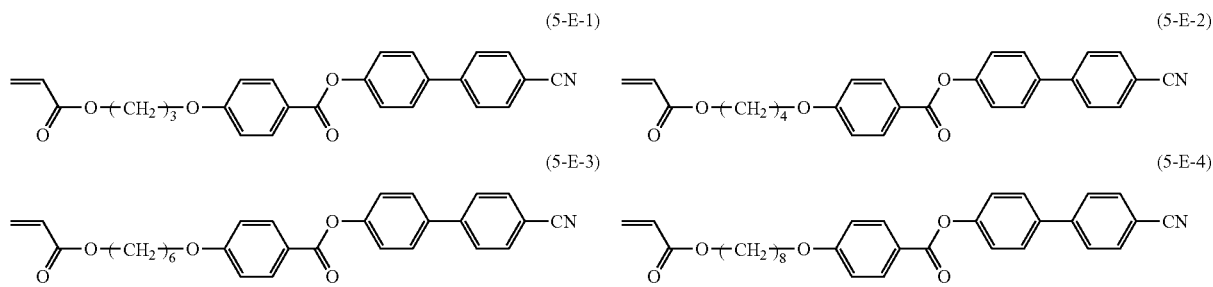

-continued
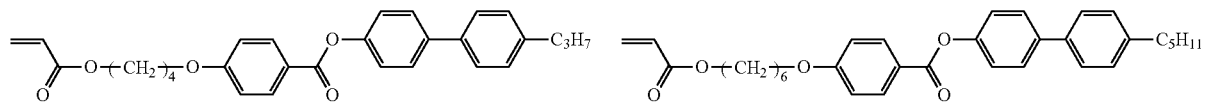
(5-F-1)
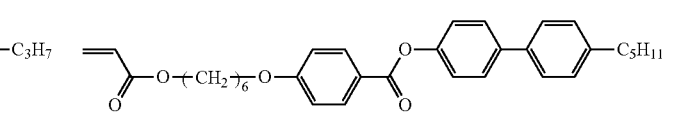
(5-F-2)
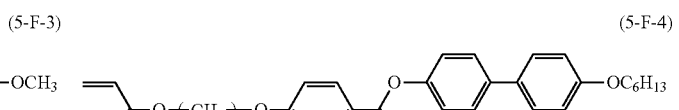
(5-F-3)
(5-F-4)
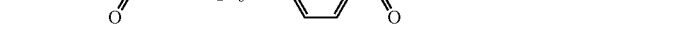
Formula 55
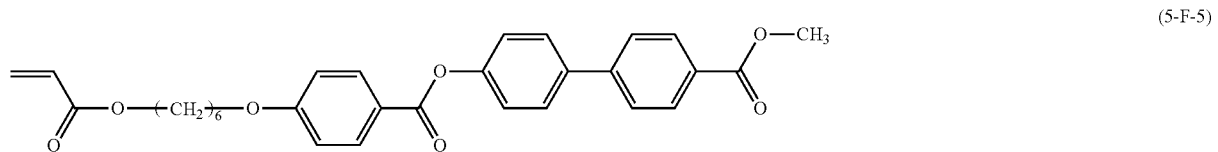
(5-F-5)
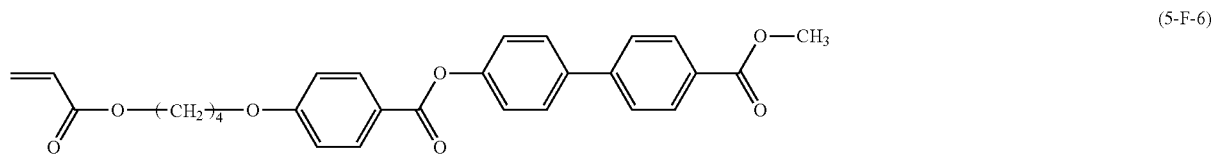
(5-F-6)
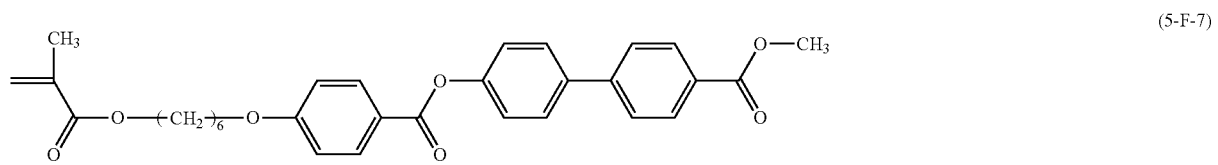
(5-F-7)
Formula 56
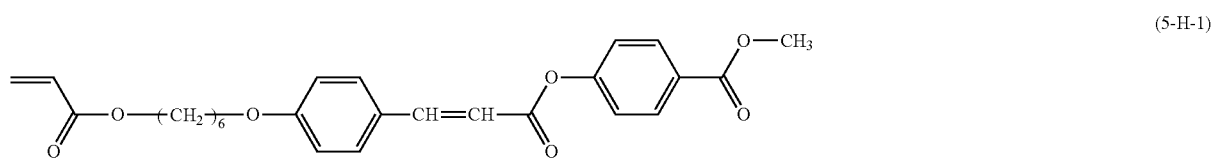
(5-H-1)
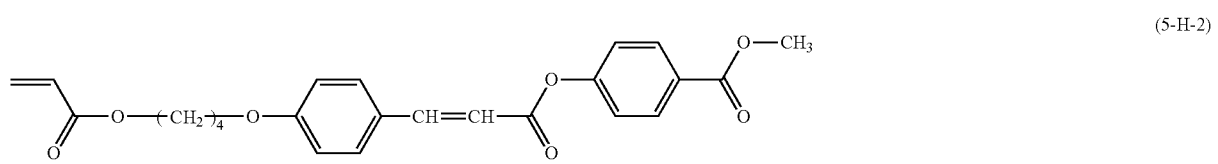
(5-H-2)
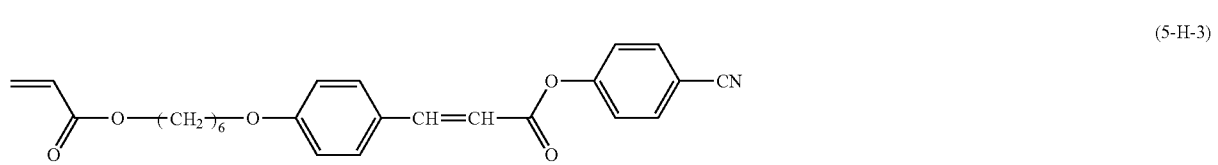
(5-H-3)
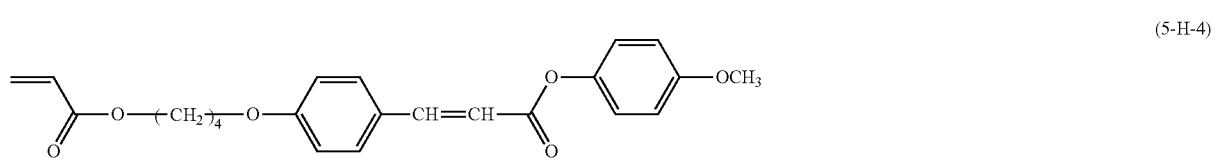
(5-H-4)
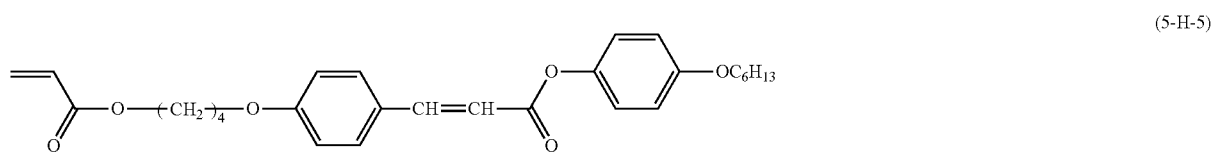
(5-H-5)

-continued
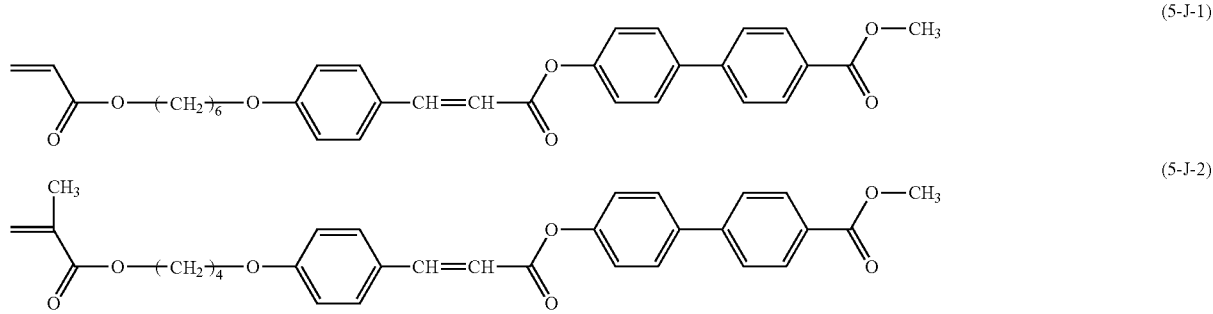
Formula 57
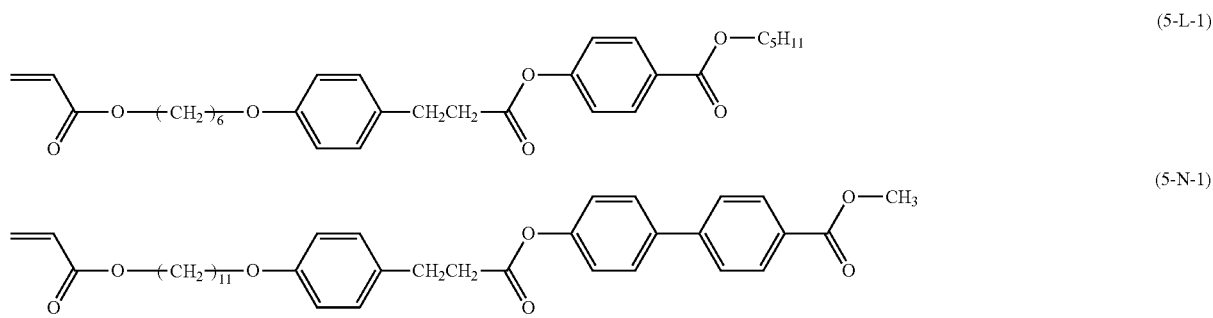
Formula 58
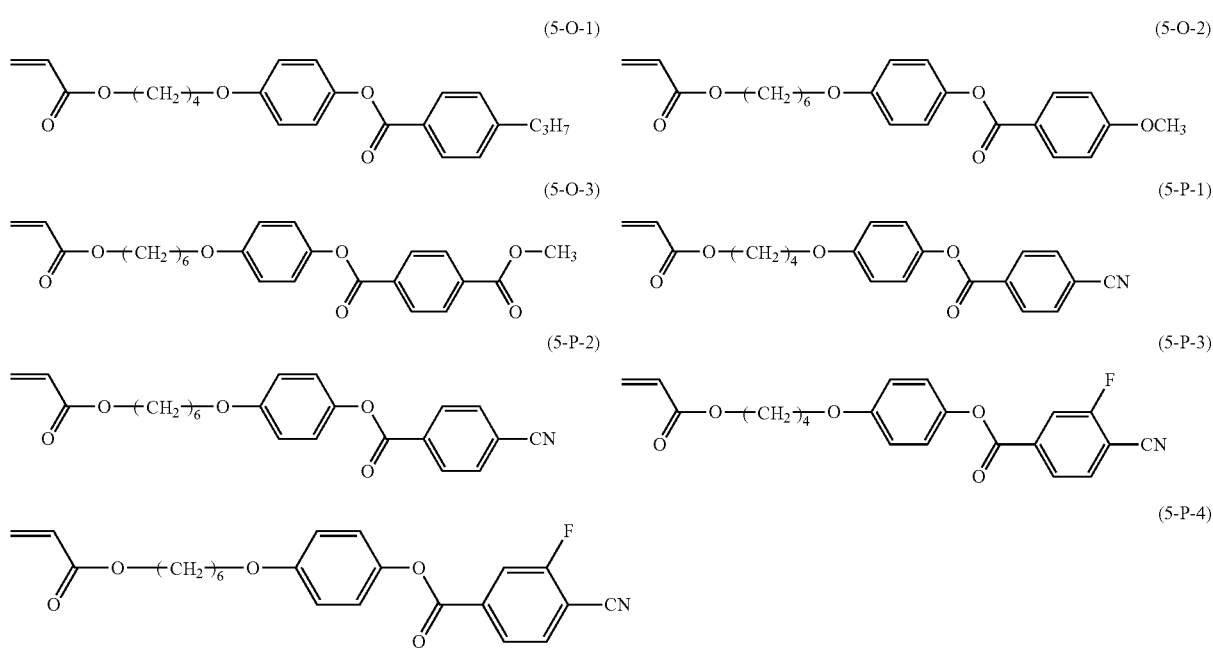
Formula 59
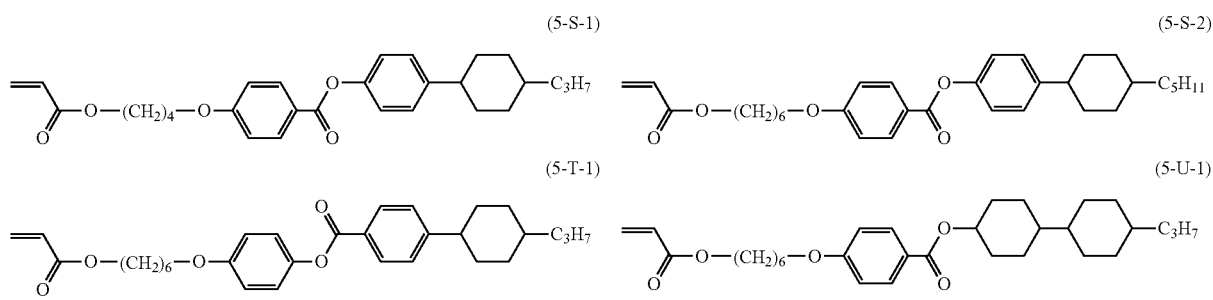

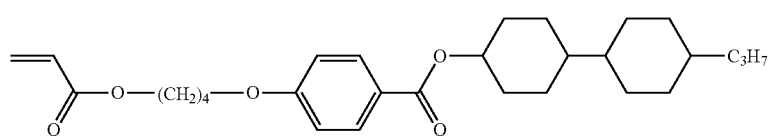

(5-U-2)

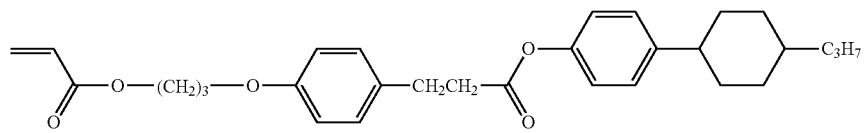

(5-V-1)

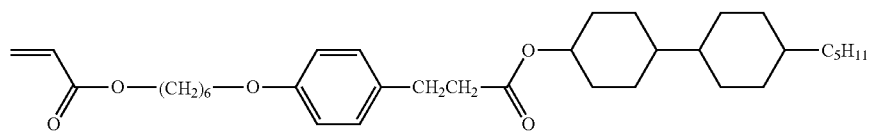

(5-W-1)

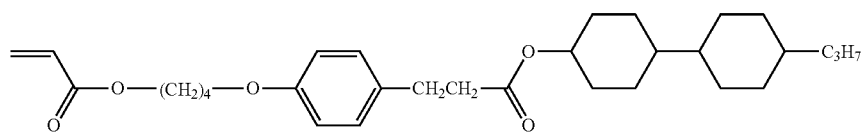

(5-W-2)

In formula (5-H-1) to formula (5-H-5), formula (5-J-1) and formula (5-J-2), a trans isomer is further preferred.

Next, specific examples of any other polymerizable compound, the additive and the organic solvent are described. The compounds may include a commercial item. Examples of any other polymerizable compound include a compound having one polymerizable group, a compound having two polymerizable groups, a compound having three or more polymerizable groups, a non-liquid crystalline polymerizable compound having a functional group including a hydroxyl group and having acryloyl or methacryloyl in one compound, a polymerizable compound having carboxyl and a polymerizable compound having a phosphate group. One or two or more compounds selected from the groups can be used.

Specific examples of the compound having one polymerizable group but having no functional group including the hydroxyl group include styrene, nucleus-substituted styrene, acrylonitrile, vinyl chloride, vinylidene chloride, vinyl pyridine, N-vinyl pyrrolidone, vinylsulfonic acid, fatty acid vinyl ester (vinyl acetate), α,β-ethylenic unsaturated carboxylic acid (acrylic acid, methacrylic acid, maleic acid, fumaric acid and itaconic acid), alkyl ester of (meth)acrylic acid (the number carbons of alkyl: 1 to 18), hydroxy alkyl ester of (meth) acrylic acid (the number of carbons of hydroxyalkyl: 1 to 18), aminoalkyl ester of (meth)acrylic acid (the number of carbons of aminoalkyl: 1 to 18), ether oxygen-containing alkyl ester of (meth)acrylic acid (the number of carbons of ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butyl benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentanyloxyethyl (meth)acrylate, isobornyloxyethyl (meth)acrylate, isobornyl (meth)acrylate, adamantyl(meth)acrylate, dimethyladamantyl (meth)acrylate, dicyclopentanyl (meth)acrylate, dicyclopentenyl (meth)acrylate, mono(meth)acrylate of polyalkylene glycol such as mono(meth)acrylate of polyethylene glycol capped with alkyl having 1 to 6 carbons at a terminal (repeating units (polymerization degree): 2 to 20), mono(meth)acrylate of polyethylene glycol capped with alkyl having 1 to 6 carbons at a terminal (repeating units (degree of polymerization): 2 to 20), mono(meth)acrylate of polypropylene glycol capped with alkyl having 1 to 6 carbons at a terminal (repeating units (degree of polymerization): 2 to 20) and a copolymer (degrees of polymerization: 2 to 20) of ethylene oxide and propylene oxide.

Specific examples of the compound having two polymerizable groups but having no functional group including the hydroxyl group include 1,4-butanedioldiacrylate, 1,6-hexanediol diacrylate, 1,9-nonanediol diacrylate, neopentylglycol diacrylate, dimethyloltricyclodecane diacrylate, triethyleneglycol diacrylate, dipropyleneglycol diacrylate, tripropyleneglycol diacrylate, tetraethyleneglycol diacrylate, bisphenol A EO-added diacrylate, bisphenol A glycidyl diacrylate (Viscoat V#700), polyethylene glycol diacrylate and a methacrylate compound of the compound thereof. The compounds are suitable for further improving film-formation capability of a polymer.

Specific examples of the compound having three or more polymerizable groups but having no functional group including the hydroxyl group include trimethylolpropane tri(meth) acrylate, trimethylol EO-added tri(meth)acrylate, tris(meth) acryloyloxyethyl phosphate, tris(meth)(acryloyloxyethyl) isocyanurate, alkyl-modified dipentaerythritol tri(meth) acrylate, EO-modified trimethylolpropane tri(meth)acrylate, PO-modified trimethylolpropane tri(meth)acrylate, pentaerythritol tetra(meth)acrylate, alkyl-modified dipentaerythritol tetra(meth)acrylate, ditrimethylolpropane tetra(meth) acrylate, dipentaerythritol hexa(meth)acrylate, alkyl-modified dipentaerythritol penta(meth)acrylate, Viscoat V#802 (the number of functional groups=8) and Viscoat V#1000 (the number of functional groups=14 on average). "Viscoat" is a trade name of products from Osaka Organic Chemical Industry Ltd. A compound having 16 or more functional groups can be obtained by using Boltorn H20 (16 functional groups), Boltorn H30 (32 functional groups) and Boltorn H40 (64 functional groups) sold by Perstorp Specialty Chemicals AB as a raw material and acrylating the raw material.

The non-liquid crystalline polymerizable compound having the functional group including the hydroxyl group and having acryloyl or methacryloyl may include a commercial item. Preferred examples include butanediol monoacrylate, a reaction product between butyl glycidyl ether and (meth)acrylic acid (Denacol DA151 (registered trademark), made by Nagase & Co., Ltd.), 3-chloro-2-hydroxypropyl methacrylate, glycerol methacrylate (Blemmer (registered trademark) GLM, made by NOF Corporation), glycerol acrylate, glycerol dimethacrylate (Blemmer GMR series, made by NOF Corporation), glycerol triacrylate (EX-314, made by Nagase ChemteX Corporation), 2-hydroxyethyl acrylate (BHEA, made by Nippon Shokubai Co., Ltd.), 2-hydroxyethyl methacrylate (HEMA, made by Nippon Shokubai Co., Ltd.), 2-hydroxypropyl acrylate (HPA, made by Nippon Shokubai Co., Ltd.), 2-hydroxypropyl methacrylate (HPMA, made by Nippon Shokubai Co., Ltd.), caprolactone-modified 2-hydroxyethylacrylate, caprolactone-modified 2-hydroxyethyl methacrylate, phenoxyhydroxypropyl acrylate (M-600A, made by Kyoeisha Chemical Co., Ltd.), 2-hydroxy-3-acryloyloxypropyl methacrylate (G-201P, made by Kyoeisha Chemical Co., Ltd.), Kayarad (registered trademark) R167, made by Nippon Kayaku Co., Ltd., triglycerol diacrylate (Epoxy Ester 80MFA, made by Kyoeisha Chemical Co., Ltd.), pentaerythritol tri(meth)acrylate, dipentaerythritolmonohydroxy penta(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloyloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyeth-1-yloxy)benzoic acid, 4-(3-acryloyloxy-n-prop-1-yloxy)benzoic acid, 4-(2-methacryloyloxyeth-1-yloxy)benzoic acid, 4-(4-acryloyloxy-n-but-1-yloxy)benzoic acid, 4-(6-acryloyloxy-n-hex-1-yloxy)benzoic acid, 4-(6-acryloyloxy-n-hex-1-yloxy)-2-methylbenzoic acid, 4-(6-methacryloyloxy-n-hex-1-yloxy)benzoic acid, 4-(10-acryloyloxy-n-dec-1-yloxy)benzoic acid, 2-acryloyloxyethyl acid phosphate and 2-methacryloyloxy-ethyl acid phosphate.

Specific examples of monomethacrylate of polyethylene glycol having a degree of polymerization from 2 to 20, as exemplified by formula (T-1) described below, include Blemmer PE-90 (n=2), PE-200 (n=4.5) and PE-350 (n=8), as made by NOF Corporation. The number of repeating units (degree of polymerization) of a polyethylene glycol chain herein is further preferably 2 to 10, in which n represents the mean number of constitutional units.

Formula 60

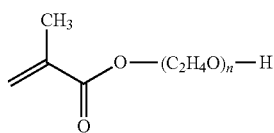

(T-1)

Specific examples of monoacrylate of polyethylene glycol having a degree of polymerization from 2 to 20 include, as exemplified by formula (T-2) described below, Blemmer AE-90 (n=2), AE-200 (n=4.5) and AE-400 (n=10), as made by NOF Corporation. The number of repeating units (degree of polymerization) of a polyethylene glycol chain herein is further preferably 2 to 10.

Formula 61

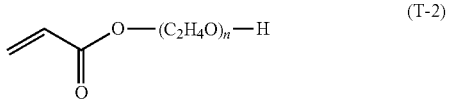

(T-2)

Specific examples of monomethacrylate of polypropylene glycol having a degree of polymerization from 2 to 20 include, as exemplified by formula (T-3) described below, Blemmer PP-1000 (n=4 to 6), PP-500 (n=9) and PP-800 (n=13), as made by NOF Corporation. The number of repeating units (degree of polymerization) of a polyethylene glycol chain is further preferably 3 to 13.

Formula 62

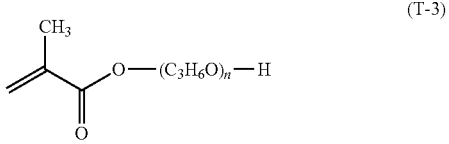

(T-3)

Specific examples of monoacrylate of polypropylene glycol having a degree of polymerization from 2 to 20 include, as exemplified by formula (T-4) described below, Blemmer AP-150 (n=3), AP-400 (n=6), AP-550 (n=9) and AP-800 (n=13), as made by NOF Corporation. The number of repeating units (degree of polymerization) of a polyethylene glycol chain is further preferably 3 to 13.

Formula 63

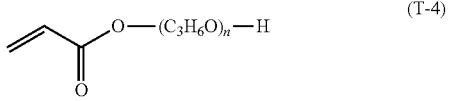

(T-4)

Specific examples of poly(ethylene glycol-propylene glycol) monomethacrylate include, as exemplified by formula (T-5) described below, Blemmer 50PEP-300, made by NOF Corporation. Ethylene or propylene that means R herein is randomly copolymerized. The mean number (m) of constitutional units of ethyleneoxy and propyleneoxy is 2.5 and 3.5, respectively. Further, m described below also represents the mean number of constitutional units of each alkylene.

Formula 64

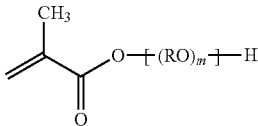

(T-5)

R: $C_2H_4$ or $C_3H_6$

Specific examples of polyethylene glycol-polypropylene glycol monomethacrylate include, as exemplified by formula (T-6) described below, Blemmer 70PEP-350 B (m=5, n=2), made by NOF Corporation.

Formula 65

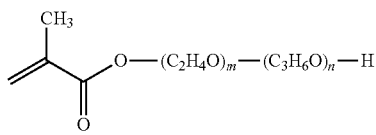
(T-6)

Specific examples of polyethylene glycol-polypropylene glycol monoacrylate include Blemmer AEP series.

Specific examples of poly(ethylene glycol-tetramethylene glycol) monomethacrylate include, as exemplified by formula (T-7) described below, Blemmer 55PET-400, 30PET-800 and 55PET-800, as made by NOF Corporation. The number of repeating units of a poly(ethylene glycol-tetramethylene glycol) chain herein is further preferably 2 to 10. In the formula, ethylene or butylene that means R is randomly copolymerized. The mean number (m) of constitutional units of ethyleneoxy and butyleneoxy is 5 and 2 in 55PET-400, 6 and 10 in 30PET-800, and 10 and 5 in 55PET-800, respectively.

Formula 66

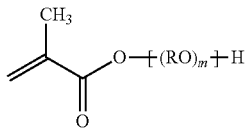
(T-7)

R: $C_2H_4$ or $C_4H_8$

Specific examples of poly(ethylene glycol-tetramethylene glycol) monoacrylate include Blemmer AET series, made by NOF Corporation.

Specific examples of poly (propylene glycol-tetramethylene glycol) monomethacrylate include, as exemplified by formula (T-8) described below, Blemmer 30PPT-800, 50PPT-800 and 70PPT-800, as made by NOF Corporation. The number of repeating units of a poly(propylene glycol-tetramethylene glycol) chain herein is further preferably 3 to 10. In the formula, propyleneoxy or butyleneoxy that means R is randomly copolymerized. The mean number (m) of constitutional units of propylene and butylene is 4 and 8 in 30PPT-800, 7 and 6 in 50PPT-800 and 10 and 3 in 70PPT-800, respectively.

Formula 67

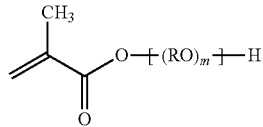
(T-8)

R: $C_3H_6$ or $C_4H_8$

Specific examples of poly (propylene glycol-tetramethylene glycol) monoacrylate include Blemmer APT series, made by NOF Corporation.

Specific examples of propylene glycol-polybutylene glycol mono((meth)acrylate) include, as exemplified by formula (T-9) described below, Blemmer 10PPB-500B (n=6), and as exemplified by formula (T-10) described below, 10APB-500B (n=6), as made by NOF Corporation. The number of repeating units of a propylene glycol-polybutylene glycol chain herein is further preferably 6.

Formula 68

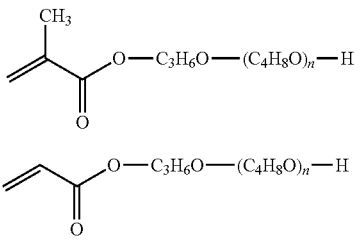

Specific preferred examples of the polymerizable compound having carboxyl are described below, and may include a commercial item.

Specific preferred examples include 2-methacryloyloxyethyl succinate (Light Ester HO-MS (N), made by Kyoeisha Chemical Co., Ltd.), 2-methacryloyloxyethyl hexahydrophthalate (Light Ester HO-HH(N), made by Kyoeisha Chemical Co., Ltd.), 2-acryloyloxyethyl succinate (Light Ester HOA-MS(N), made by Kyoeisha Chemical Co., Ltd.), 2-acryloyloxyethyl hexahydrophthalate (Light Acrylate HOA-HH(N), made by Kyoeisha Chemical Co., Ltd.), 2-acryloyloxyethyl phthalate (Light Acrylate HOA-MPL(N), made by Kyoeisha Chemical Co., Ltd.), 2-acryloyloxyethyl-2-hydroxyethyl phthalate (Light Acrylate HOA-MPE(N), made by Kyoeisha Chemical Co., Ltd.), 4-(2-acryloyloxyeth-1-yloxy)benzoic acid (ST01630, made by Synthon Chemicals GmbH & Co. KG), 4-(3-acryloyloxy-n-prop-1-yloxy)benzoic acid (ST02453, made by Synthon Chemicals GmbH & Co. KG), 4-(2-methacryloyloxyeth-1-yloxy)benzoic acid (ST01889, made by Synthon Chemicals GmbH & Co. KG), 4-(4-acryloyloxy-n-but-1-yloxy)benzoic acid (ST01680, made by Synthon Chemicals GmbH & Co. KG), 4-(6-acryloyloxy-n-hex-1-yloxy)benzoic acid (ST00902, made by Synthon Chemicals GmbH & Co. KG), 4-(6-acryloyloxy-n-hex-1-yloxy)-2-methylbenzoic acid (ST03606, made by Synthon Chemicals GmbH & Co. KG), 4-(6-methacryloyloxy-n-hex-1-yloxy)benzoic acid (ST01618, made by Synthon Chemicals GmbH & Co. KG) and 4-(10-acryloyloxy-n-dec-1-yloxy)benzoic acid (ST03604, made by Synthon Chemicals GmbH & Co. KG).

Specific preferred examples of the polymerizable compound having the phosphate group are described below, and may include a commercial item. Specific examples include 2-acryloyloxyethyl acid phosphate (Light Acrylate P-1A(N), made by Kyoeisha Chemical Co., Ltd.), 2-methacryloyloxyethyl acid phosphate (Light Ester P-1M, made by Kyoeisha Chemical Co., Ltd.), Light Ester P-2M, made by Kyoeisha Chemical Co., Ltd. and KAYAMER (registered trademark) PM-2, made by Nippon Kayaku Co., Ltd.

Specific examples of the surfactant include a cationic surfactant, an anionic surfactant and a nonionic surfactant.

Specific examples of the ionic surfactant include a titanate compound, imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, amines lauryl sulfate, alkyl-substituted aromatic sulfonate, alkyl phosphate, an aliphatic or aromatic sulfonic acid-formalin condensate, laurylamidopropyl betaine, laurylaminoacetic acid betaine, polyethylene glycol fatty acid ester, polyoxyethylene alkylamine, perfluoroalkyl sulfonate and perfluoroalkyl carboxylate.

Specific examples of kinds of nonionic surfactants include a vinyl-based, silicone-based, fluorine-based or hydrocarbon-based surfactant.

Specific examples of the vinyl-based nonionic surfactant include polyalkyl acrylate, polyalkyl methacrylate, polyalkyl vinyl ether, polybutadiene, polyolefin and polyvinyl ether.

Specific examples of the silicone-based nonionic surfactant include polydimethylsiloxane, polyphenylsiloxane, specially modified siloxane, fluorine-modified siloxane and surface-treated siloxane.

Specific examples of the fluorine-based nonionic surfactant include a fluorine polymer.

Specific examples of the hydrocarbon-based nonionic surfactant include polyethylene, polypropylene, polyisobutylene, paraffin, liquid paraffin, chlorinated polypropylene, chlorinated paraffin and chlorinated liquid paraffin.

Specific examples include surfactants described in paragraphs 0196 to 0199 in JP 2011-246365 A, surfactants described in paragraph 0019 in JP 2009-242563 A, TEGO Flow 300, TEGO Flow 370 and TEGO Flow ZFS460 (all, made by Evonik Degussa GmbH) surfactants described in paragraphs 0014 to 0016 in JP 2009-242563 A and surfactants described in a paragraph 0014 in JP 2009-242564 A, FTERGENT FTX-680 series (FTX-681, FTX-682), FTX-610FM, FTX-601AD, FTX-602A, FTX-650A (all, made by NEOS COMPANY LIMITED).

The surfactants may be used alone or in combination of two or more surfactants.

Above all, as a kind of the surfactants, the vinyl-based surfactant such as polyalkyl acrylate (acrylic polymer), polyalkyl methacrylate or the like being the nonionic surfactant is preferred due to a trend of a smaller influence on the twist alignment from a viewpoint of a lower degree of segregation on a surface of the coating film (without excessive localization) in comparison with the silicone-based or fluorine-based nonionic surfactant.

Specific examples of the surfactant containing such an acryl-based polymer or acryl (co) polymer as a main component include Polyflow series (No. 7, No. 50E, No. 50EHF, No. 54N, No. 75, No. 77, No. 85, No. 85HF, No. 90, No. 90D-50, No. 95 and No. 99C), TEGO Flow series (300, 370, or ZFS 460) and BYK series (350, 352, 354, 355, 356, 358N, 361N, 381, 392, 394, 3441 and 3440).

Addition of the surfactants as described above minimizes an influence on the twist alignment to allow suppression of tilt alignment on the air interface side. Moreover, in order to optimize applicability onto the substrate, a surfactant classified as a (substrate) wetting agent may be simultaneously used within the range in which the twist alignment is not influenced. The wetting agent is effective in decreasing surface tension of a polymerizable liquid crystal solution and improving applicability onto a coating substrate. Specific examples of such a wetting agent include Polyflow series (KL-100, KL-700, LE-604, LE-605 and LE-606), TEGO Twin series (4000) and TEGO Wet series (KL245, 250, 260, 265, 270, 280, 500, 505 and 510). In addition, as an auxiliary agent of the wetting agent, a surfactant containing as a main component a fluoride-modified polymer or a fluorine-modified acrylic polymer may be applied. Specific examples of such an agent include 3000 series (3277, 3700 and 3770), made by AFCONA Additives Co., Ltd.

Moreover, in order to cause integration with the polymerizable liquid crystal compound, the surfactant may have a polymerizable group. Specific examples of the polymerizable group to be introduced into the surfactant include an ultraviolet light reaction-type functional group and a thermally polymerizable functional group. From a viewpoint of reactivity with the polymerizable liquid crystal compound, the ultraviolet light reaction-type functional group is preferred.

Polyflow described above is a name of products sold by Kyoeisha Chemical Co., Ltd. BYK is a name of products sold by BYK-Chemie Japan K.K. TEGO is a name of products sold by Evonik Industries AG.

In order to optimize a rate of polymerization of the polymerizable liquid crystal composition, a publicly known photoradical polymerization initiator may be added. Specific examples of the photoradical polymerization initiator include 2-hydroxy-2-methyl-1-phenylpropane-1-one (Darocur 1173), 1-hydroxycyclohexyl phenyl ketone, 2,2-dimethoxy-1,2-diphenylethane-1-one (Irgacure 651), 1-hydroxy-cyclohexyl-phenyl-ketone (Irgacure 184), Irgacure 127, Irgacure 500 (mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocur 4265, Darocur MBF, Darocur TPO, Irgacure 784 and Irgacure 754. Both of Darocur and Irgacure described above are names of products sold by BASF Japan, Ltd.

As a photoradical polymerization initiator, a photopolymerization initiator having oxime ester may be used. Examples of the photopolymerization initiator having oxime ester are described below. The photopolymerization initiator may include a commercial item. Specific examples include compounds No. 1 to No. 108 described in paragraphs 0032 to 0046 in JP 2011-132215 A, compounds described in JP 2004-534797 A, compounds described in WO 2009/147031 A, compounds described in JP 2000-80068 A, compounds having oxime ester moieties described in JP 2006-251374 A, compounds having oxime ester moieties described in JP 2009-286976A and compounds having oxime ester moieties described in JP 2009-29929 A.

Specific examples of preferred compounds of the photoradical polymerization initiator include NCI-930 or N-1919 (all, made by ADEKA Corporation), Irgacure 907, Irgacure OXE01 or Irgacure OXE02 (all, made by BASF Japan Ltd.), and Irgacure 369 or Irgacure 379. In particular, from a viewpoint of less influence on the twist alignment, Irgacure 907, NCI-930 or Irgacure OXE01 is preferably used.

A publicly known sensitizer (isopropylthioxanthone, diethylthioxanthone, ethyl-4-dimethylaminobenzoate (Darocur EDB), 2-ethylhexyl-4-dimethylaminobenzoate (Darocur EHA) or the like) and 4,4-bis(diethylamino)benzophenone may be added to the initiators.

As the photoradical polymerization initiator, photoradical polymerization initiators described below can also be used. Specific examples include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a 2,4-diethylxanthone-methyl p-dimethylaminobenzoate mixture and a benzophenone-methyltriethanolamine mixture.

Mechanical characteristics of the polymer can also be controlled by adding one kind or two or more kinds of chain transfer agents to the polymerizable liquid crystal composition. A length of a polymer chain or a length of two crosslinked polymer chains in a polymer film can be controlled by using the chain transfer agent. The lengths can also be simultaneously controlled. When an amount of the chain transfer agent is increased, the length of the polymer chain decreases. Specific preferred examples of the chain transfer agents include a thiol compound and a styrene dimer. Specific examples of monofunctional thiol include dodecanethiol and 2-ethylhexyl 3-mercaptopropionate. Specific examples of polyfunctional thiol include trimethylolpropanetris(3-mercaptopropionate), pentaerythritoltetrakis(3-mercaptopropionate), 1,4-bis(3-mercaptobutyryloxy) butane (Karenz MT BD1), pentaerythritoltetrakis(3-mercaptobutylate) (Karenz MT PE1) and 1,3,5-tris(3-mercaptobutyloxyethyl)-1,3,5-triazine-2,4,6(1H, 3H, 5H)-trione (Karenz MT NR1). "Karenz" is a trade name of products from Showa Denko K.K. Specific examples of a thiol compound other than the compounds described above include thiol compounds described in paragraphs 0042 to 0043 in WO 2013/080855 A and compounds described in $11^{th}$ line on p. 23 to $27^{th}$ line on p. 24 in WO 2008/077261 A. Specific examples of the styrene dimer include α-methylstyrene dimer (2,4-diphenyl-4-methyl-1-pentene) and 1,1-diphenylethylene. Moreover, Quinoexter QE-2014 can also be utilized. "Quinoexter" is a trade name of products from Kawasaki Kasei Chemicals Ltd.

A polymerization preventive agent can be added to the polymerizable liquid crystal composition in order to prevent polymerization start during storage. A publicly known polymerization preventive agent can be used, and preferred examples include 2,5-di(t-butyl) hydroxytoluene (BHT), hydroquinone, p-methoxyphenol, Methyl Blue, diphenylpicryl hydrazide (DPPH), benzothiazine, 4-nitrosodimethylaniline (NIDI) and o-hydroxybenzophenone.

A polymerization inhibitor can also be added in order to improve storage stability of the polymerizable liquid crystal composition. When a radical is generated within the composition or the solution of the composition, the polymerization reaction of the polymerizable compound is accelerated. The polymerization inhibitor is preferably added in order to prevent such a reaction. As the polymerization inhibitor, a phenolic antioxidant, a sulfur-based antioxidant and a phosphate-based antioxidant can be utilized.

In order to further improve weather resistance of the polymerizable liquid crystal composition, an ultraviolet light absorber, a light stabilizer (radical scavenger), an antioxidant and so forth may be added. Specific examples of the ultraviolet light absorber include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, Hostavin PR-25, Hostavin B-CAP, Hostavin VSU, ADK STAB LA-32, ADK STAB LA-34, ADK STAB LA-36, ADK STAB LA-31, ADK STAB 1413 and ADK STAB LA-51. "Tinuvin" is a trade name of products from BASF Japan Ltd. "Hostavin" is a trade name of products from Clariant (Japan) K.K. Moreover, "ADK STAB" is a trade name of products from ADEKA Corporation.

Specific examples of the light stabilizer include Tinuvin 111 FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050 and 5060, Tinuvin 5151, Chimassorb 119 FL, Chimassorb 944 FL, Chimassorb 944 LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346 and Good-Rite UV-3034, made by Goodrich Corporation. "Chimassorb" is a trade name of products from BASF Japan Ltd.

Specific examples of the antioxidant include ADK STAB AO-20, AO-30, AO-40, AO-50, AO-60 and AO-80, as made by ADEKA Corporation, Sumilizer (registered trademark) BHT, Sumilizer BBM-S and Sumilizer GA-80 as sold by Sumitomo Chemical Co., Ltd., and Irganox 1010, Irganox 1035, Irganox 1076, Irganox 1098, Irganox 1135, Irganox 1330, Irganox 1425, Irganox 1520, Irganox 1726, Irganox 245, Irganox 259, Irganox 3114, Irganox 3790, Irganox 5057 and Irganox 565 as sold by BASF Japan Ltd. Commercial items thereof may also be used.

In order to control the adhesion with the substrate, the silane coupling agent may be further added to the polymerizable liquid crystal composition. Specific examples include vinyltrialkoxysilane, 3-isocyanatepropyltriethoxysilane, N-(2-aminoethyl) 3-aminopropyltrialkoxysilane, N-(1,3-dimethylbutylidene)-3-(trialkoxysilyl)-1-propanamine, 3-glycidoxypropyltrialkoxysilane, 3-chlorotrialkoxysilane, 3-acryloxyprophyltrimethoxysilane and 3-methacryloxypropyltrialkoxysilane. Specific example in the compound is dialkoxy methylsilane in which one of alkoxies (three) is replaced to methyl.

The polymerizable liquid crystal composition may be occasionally directly applied onto the substrate. However, in order to facilitate application, the polymerizable liquid crystal composition is diluted using a solvent, or each component of the polymerizable liquid crystal composition is dissolved into the solvent, and the solution of the polymerizable liquid crystal composition including the polymerizable liquid crystal composition and the solvent is prepared, and the solution is applied. The solvent can be used alone or in combination of two or more kinds. Specific examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (methyl acetate, ethyl acetate, propyl acetate, isopropyl acetate, butyl acetate, 3-methoxybutyl acetate, isobutyl acetate, pentyl acetate and isopentyl acetate), cyclohexyl acetate, ethyl trifluoroacetate, alkyl propionate (methyl propionate, methyl 3-methoxypropionate, ethyl propionate, propyl propionate and butyl propionate), alkyl butyrate (methyl butyrate, ethyl butylate, butyl butyrate, isobutyl butyrate and propyl butyrate), dialkyl malonate (diethyl malonate), alkyl glycolate (methyl glycolate and ethyl glycolate), alkyl lactate (methyl lactate, ethyl lactate, isopropyl lactate, n-propyl lactate, butyl lactate and ethylhexyl lactate), alkyl pyruvate (ethyl pyruvate), monoacetin, γ-butyrolactone and γ-valerolactone.

Preferred examples of the amide solvent include N-methyl-2-pyrrolidone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, 4-hydroxy-4-methyl-2-pentanone (diacetone alcohol), n-hexanol, n-heptanol, n-octanol, 1-dodecanol, ethylhexanol, 3,5,5-trimethylhexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methyl cyclohexanol.

Preferred examples of the ether solvent include ethylene glycol dimethyl ether, diethylene glycol dimethyl ether, diethylene glycol methyl ethyl ether, bis(2-propyl)ether, 1,3-dioxolane, 1,4-dioxane and tetrahydrofuran (THF).

Preferred examples of the glycol monoalkyl ether solvent include ethylene glycol monoalkyl ether (ethylene glycol monomethyl ether and ethylene glycol monobutyl ether), diethylene glycol monoalkyl ether (diethylene glycol monoethyl ether), triethylene glycol monoalkyl ether, propylene glycol monoalkyl ether (propylene glycol monomethyl ether and propylene glycol monobutyl ether), dipropylene glycol monoalkyl ether (dipropylene glycol monomethyl ether), ethylene glycol monoalkyl ether acetate (ethylene glycol monobutyl ether acetate), diethylene glycol monoalkyl ether acetate (diethylene glycol monoethyl ether acetate), triethylene glycol monoalkyl ether acetate, propylene glycol monoalkyl ether acetate (propylene glycol monoethyl ether acetate, propylene glycol monoethyl ether acetate and propylene glycol monobutyl ether acetate), dipropylene glycol monoalkyl ether acetate (dipropylene glycol monomethyl ether acetate) and diethylene glycol methyl ethyl ether.

Preferred examples of the aromatic hydrocarbon solvent include benzene, toluene, anisole, xylene, mesitylene, ethylbenzene, diethylbenzene, i-propylbenzene, n-propylbenzene, t-butylbenzene, s-butylbenzene, n-butylbenzene, a terpene derivative (p-cymene, 1,4-cineole, 1,8-cineole, D-limonene, D-limonene oxide, p-menthane, α-pinene, β-pinene, γ-terpinene and terpinolene) and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, 2-heptanone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

From a viewpoint of solubility of the polymerizable liquid crystal compound, use of the amide solvent, the aromatic hydrocarbon or the ketone solvent is preferred, and when a boiling point of the solvent is taken into consideration, simultaneous use of the ester solvent, the alcohol solvent, the ether solvent and the glycol monoalkyl ether solvent is also preferred. Selection of the solvent is not particularly restricted, but when a photo-alignment film is applied as the alignment film, the solvent is required to cause no erosion, or drying temperature is required to be decreased for reducing solvent damage. Preferred examples of the solvent used in such a case include the aromatic hydrocarbon solvent, the ketone solvent, the ester solvent, the ether solvent, the alcohol solvent, the acetate solvent and the glycol monoalkyl ether solvent.

A ratio of the solvent in the solution of the polymerizable liquid crystal composition is ordinarily in the range of approximately 50 to approximately 95% based on the total weight of the solution. A lower limit of the range is set to a numerical value in consideration of the solubility of the polymerizable liquid crystal compound and optimum viscosity upon application of the solution. Then, an upper limit thereof is set to a numerical value in consideration of an economic viewpoint such as solvent cost, and time and an amount of heat upon evaporating the solvent. A preferred ratio thereof is in the range of approximately 60 to approximately 90%, and further preferably, in the range of approximately 70 to approximately 85%.

In the description below, the polymer (optically anisotropic substance) obtained by polymerizing the polymerizable liquid crystal composition may be occasionally referred to as a phase difference film. The phase difference film can be obtained in a manner described below. First, the solution of the polymerizable liquid crystal composition is applied onto the substrate subjected to alignment treatment, and the resulting applied material is dried to form the coating film. The coating film is irradiated with light to polymerize the polymerizable liquid crystal composition and to immobilize nematic alignment formed by the composition in the coating film in the liquid crystal state.

Upon application of the polymerizable liquid crystal composition or the solution thereof, specific examples of an application method for obtaining uniform thickness include a spin coating method, a micro gravure coating method, a gravure coating method, a wire bar coating method, a dip coating method, a spray coating method, a meniscus coating method or a die coating method.

A support substrate applicable in the invention is not limited only to a glass substrate, and a film substrate can be also used which is formed of polyimide, polyamideimide, polyamide, polyetherimide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose or a partially saponified product thereof, an epoxy resin, a phenolic resin, a cycloolefin resin or the like. The two kinds or more of resins thereof may be mixed and used.

In the optically anisotropic substance of the invention, at least the alignment film, the positive uniaxial phase difference film and the negative uniaxial phase difference film are formed on the substrate in the above order. The optically anisotropic substance may have any other layer, as long as the advantageous effects of the invention are not adversely affected.

A material of the alignment film or a method for forming the film is not particularly restricted, and a publicly known material or method can be applied. For example, the optically anisotropic substance can be formed by a method described in JP 2006-276543 A. The alignment film can be ordinarily formed through a step for applying a liquid crystal aligning agent onto the substrate to heat and calcinated the resulting material, and when necessary, through a rubbing treatment step or a photo-alignment treatment step. When the rubbing method is applied, as the alignment film, an alignment film of a polyimide-based material or a polyvinyl alcohol-based material is used. When the photo-alignment treatment method is applied, as the alignment film, a photo-alignment film containing as a main component a (meth)acrylate-based polymer, a cycloolefin-based polymer, a siloxane-based polymer, polyimide or the like is used.

The positive uniaxial phase difference film and the negative uniaxial phase difference film are respectively formed of polymerizable liquid crystal composition (A) and polymerizable liquid crystal composition (B). A method for forming the films is not particularly restricted, and a publicly known method can be applied. The positive uniaxial phase difference film is formed on the substrate on which the alignment film is formed, and then the negative uniaxial phase difference film is formed thereon.

The positive uniaxial phase difference film or the negative uniaxial phase difference film can be formed through, for example, a step for applying the polymerizable liquid crystal composition or the solution thereof onto the substrate, and when necessary, a step for removing the solvent, and when necessary, a step for applying heat treatment to the coating film, and a step for polymerizing the polymerizable liquid crystal composition.

Upon application of the solution of the polymerizable liquid crystal composition, the solvent is removed after the application to allow formation of the polymerizable liquid crystal layer, namely, a polymerizable liquid crystal composition layer having uniform thickness on the support substrate. Conditions for solvent removal are not particularly limited. Drying only needs to be performed until the solvent is substantially removed and flowability of the coating film of the polymerizable liquid crystal composition is lost. The solvent can be removed by applying air drying at room temperature, drying on a hot plate, drying in a drying furnace, blowing of warm air or hot air or the like. Depending on a kind and a composition ratio of the compounds used for the polymerizable liquid crystal composition, the nematic alignment of the polymerizable liquid crystal composition in the coating film is completed in a process of drying of the coating film in several cases. Therefore, the coating film through a drying step can be provided for a polymerization step without passing through a heat treatment step to be described later.

A preferred range of temperature and time in the step for applying heat treatment to the coating film, a wavelength of light used for irradiation with light and an amount of light to be irradiated from a light source in the step for polymerizing the polymerizable liquid crystal composition or the like is different depending on the kind and the composition ratio of the compounds used for the polymerizable liquid crystal composition, presence or absence of addition of the photopolymerization initiator, an amount of addition thereof, or the like. Therefore, conditions of the temperature and the time of heat treatment of the coating film, the wavelength of light used for irradiation with light, and the amount of light to be irradiated from the light source described below represent only an approximate range.

The heat treatment step for the coating film is preferably applied on conditions under which the solvent is removed and uniform alignment properties of the polymerizable liquid crystal are obtained. The step may be applied at temperature equal to or higher than a transition temperature of liquid crystal phases of the polymerizable liquid crystal composition. One example of a heat treatment method includes a method of warming the coating film to temperature at which the polymerizable liquid crystal composition exhibits a nematic liquid crystal phase to allow formation of the nematic alignment in the polymerizable liquid crystal composition in the coating film. The nematic alignment may be formed by changing the temperatures of the coating film within the temperature range in which the polymerizable liquid crystal composition exhibits the nematic liquid crystal phase. The above method includes a method of warming the coating film to a high temperature region in the temperature range described above to almost complete the nematic alignment in the coating film, and subsequently to form further ordered alignment by decreasing the temperature.

Even when any one of the heat treatment methods described above is employed, the heat treatment temperature is in the range of approximately room temperature (25° C.) to approximately 150° C. A preferred temperature range is approximately room temperature (25° C.) to approximately 130° C., a further preferred range is approximately room temperature (25° C.) to approximately 110° C., and a still further preferred range is approximately room temperature (25° C.) to approximately 100° C. Heat treatment time is in the range of approximately 5 seconds to approximately 2 hours. A preferred range of the time is approximately 10 seconds to approximately 40 minutes, and a further preferred range is approximately 20 seconds to approximately 20 minutes. In order to increase the temperature of the layer including the polymerizable liquid crystal composition to a predetermined temperature, the heat treatment time is preferably adjusted to approximately 5 seconds or more. In order to avoid a decrease in productivity, the heat treatment time is preferably adjusted within approximately 2 hours. As described above, the polymerizable liquid crystal layer in which the alignment of the polymerizable liquid crystal compound is formed is obtained.

In the step for polymerizing the polymerizable liquid crystal composition, the polymerizable liquid crystal compound in the polymerizable liquid crystal layer is polymerized. A nematic alignment state of the polymerizable liquid crystal compound as formed in the polymerizable liquid crystal layer is immobilized by polymerizing the polymerizable liquid crystal compound by irradiation with light.

The wavelength of light used for irradiation with light is not particularly limited, and is preferably agreed with an absorption maximal wavelength of the photopolymerization initiator as much as possible. Electron beams, ultraviolet light, visible light, infrared light (heat rays) or the like can be used. The ultraviolet light or the visible light is ordinarily sufficiently used. A range of the wavelength is ordinarily approximately 150 to approximately 500 nanometers. A preferred range is approximately 220 to approximately 450 nanometers, and a further preferred range is approximately 220 to approximately 400 nanometers.

Specific examples of the light sources include a low-pressure mercury lamp (a germicidal lamp, a fluorescent chemical lamp or a black light), a high-pressure discharge lamp (a high-pressure mercury lamp or a metal halide lamp) and a short arc discharge lamp (an ultra-high pressure mercury lamp, a xenon lamp or a mercury-xenon lamp). Preferred examples of the light sources include a metal halide lamp, a xenon lamp, an ultra-high pressure mercury lamp and a high-pressure mercury lamp. A wavelength region of the light source for irradiation may be selected by installing a filter or the like between the light source and the polymerizable liquid crystal layer to pass light only in a specific wavelength region through the layer.

An amount of light to be irradiated from the light source is approximately 2 to approximately 5,000 mJ/cm$^2$ at arriving at a coating film plane. A preferred range of the amount of light is approximately 10 to approximately 4,500 mJ/cm$^2$, and a further preferred range is approximately 100 to approximately 4,000 mJ/cm$^2$. Temperature conditions during irradiation with light are preferably set up in a manner similar to the conditions of the heat treatment temperature described above. Time of irradiation with light is calculated from lamp irradiance, and therefore from a viewpoint of productive efficiency, the irradiation with light is preferably carried out with as high as possible irradiance.

Moreover, an atmosphere of a polymerization environment may include any of a nitrogen atmosphere, an inert gas atmosphere and an air atmosphere, but a nitrogen atmosphere or an inert gas atmosphere is preferred from a viewpoint of improving curability.

The optically anisotropic substance of the invention has a feature in which the negative uniaxial phase difference film is formed, and then provided for an additional thermosetting treatment step (postcure). Heat resistance and resistance to sputtering of the optically anisotropic substance can be improved by the additional thermosetting treatment. Moreover, the optically anisotropic substance can be further toughened by the additional thermosetting treatment, and therefore mechanical strength and chemical resistance can be presumably improved.

The positive uniaxial phase difference film is formed (preferably by photocuring), and subsequently the negative uniaxial phase difference film is formed by photocuring, and then the additional thermosetting treatment is applied.

In the invention, temperature conditions of the additional thermosetting treatment are selected based on a glass transition temperature after the negative uniaxial phase difference film is photocured. The glass transition temperature of the invention is measured by a rigid body pendulum method. Measurement conditions are as described below.

The negative uniaxial phase difference film (film thickness after the film is cured: approximately 3 µm) is coated onto a rubbing-treated polyimide film (support substrate: glass), and the resulting coat is dried and photocured (see Examples for a detailed preparation method).

As an apparatus for measuring the glass transition temperature, Rigid-body Pendulum Type Physical Properties Testing Instrument RPT-3000W, made by A&D Co., Ltd, is used to determine the glass transition temperature (softening point) of the negative uniaxial phase difference film from a maximum value of a change of a logarithmic decrement when the film is heated to 300° C. at a heating rate of 10° C./min using a rod type cylinder edge.

The glass transition temperature after the negative uniaxial phase difference film is photocured can be increased by increasing irradiance or an integrated quantity of light during photocuring. On the other hand, the glass transition temperature can be decreased by decreasing the irradiance or the integrated amount of light during photocuring. Specific examples of an alternative method for increasing the glass transition temperature include a method for changing an initiator to an initiator having oxime ester and a method for increasing a content of compound (1).

When the glass transition temperature obtained herein is approximately 85° C. or higher and approximately 115° C. or lower, additional thermosetting treatment temperature is set to approximately 220° C. or higher and approximately 250° C. or lower. When the glass transition temperature is higher than approximately 115° C., the additional thermosetting temperature is set to approximately 200° C. or higher and approximately 250° C. or lower. The additional thermosetting temperature refers to a temperature of the atmosphere upon heat treatment.

When the glass transition temperature is approximately 85° C. or higher and lower than approximately 120° C., the additional thermosetting treatment temperature is preferably set to approximately 220° C. or higher and approximately 250° C. or lower, and when the glass transition temperature is approximately 120° C. or higher, the additional thermosetting temperature is preferably set to approximately 200° C. or higher and approximately 250° C. or lower.

In the invention, when the glass transition temperature described above is lower than approximately 85° C., no sufficient heat resistance and no sufficient resistance to sputtering tend to be obtained. Accordingly, the glass transition temperature is preferably adjusted to approximately 85° C. or higher by optimizing photocuring conditions by a method for increasing the irradiance or the integrated amount of light or the like. Further, curing time is also preferably lengthened as much as possible by changing an initiator to be applied to a type having oxime ester, or increasing the thermosetting temperature near approximately 250° C.

Additional heating time is ordinarily applied in the range of approximately 10 minutes to approximately 60 minutes, and preferably, in the range of approximately 15 minutes to approximately 45 minutes. If the conditions are set to such thermosetting temperature conditions, the negative uniaxial phase difference film can be formed into the film having sufficient strength, and therefore the resistance to sputtering, the mechanical strength and the chemical resistance can also be increased, and the film can also be provided with resistance to a thermal load during formation of an electrode of ITO or the like in a process for manufacturing a liquid crystal display.

When the negative uniaxial phase difference film is used for the liquid crystal display, uniformity of the twist alignment in a thickness direction is preferably controlled. The uniformity herein refers to development of planar arrangement in the twist alignment to arrange the liquid crystal molecules such that the helical axis of the liquid crystal becomes perpendicular to the substrate plane. In such alignment, the tilt angle of the liquid crystal molecules on the air interface side is preferably horizontal to the substrate plane, and addition of the nonionic surfactant to the composition according to the invention facilitates the planar arrangement.

A method for controlling the uniformity of twist alignment other than the method described above includes a method for adjusting the kind or the composition ratio of the liquid crystal compounds used for the polymerizable liquid crystal composition. The uniformity of twist alignment may be occasionally influenced also by adding any other component to the polymerizable liquid crystal compound. The uniformity of twist alignment can also be controlled by conditions of drying the coating film after the composition is coated on the positive uniaxial phase difference film. Further, an irradiation atmosphere, temperature or the like during irradiation in a photopolymerization step after the film is subjected to the twist alignment influences the uniformity of twist alignment. More specifically, almost all conditions in a process for manufacturing the phase difference film may be considered to influence the uniformity of twist alignment in any way. Therefore, the uniformity of twist alignment can be controlled by optimizing the polymerizable liquid crystal composition, and simultaneously appropriately selecting the conditions in the process for manufacturing the phase difference film.

A ratio of using compound (1) and compound (2) to be used for formation of the positive uniaxial phase difference film is as described above. In order to obtain uniform horizontal alignment in the invention, preferred examples of compounds (1) include compound (1-1-A1) to compound (1-1-A4) and compound (1-1-C) to compound (1-1-D5). In addition, a plurality of compounds (1) may be combined and used. Preferred examples of compounds (2) include compound (2-C-1) to compound (2-C-6), compound (2-N-1) to compound (2-N-6) and compound (2-D-1). In addition, a plurality of compounds (2) may be combined and used. In the compounds described above, from a viewpoint of improving the heat resistance and the chemical resistance, a length of an alkylene chain (spacer) ($n^{11}$ or $n^{21}$) is preferably 3 to 6.

A ratio of using compound (1), compound (2) and compound (3) to be used for formation of the negative uniaxial phase difference film is as described above. In order to obtain uniform twist alignment in the invention, preferred examples of compounds (1) include compound (1-1-A1) to compound (1-1-A3), compound (1-1-B1) to compound (1-1-B3), compound (1-1-C1) to compound (1-1-C2), compound (1-1-D1) to compound (1-1-D2) and compound (1-1-D4). In addition, a plurality of compounds (1) may be combined and used. In the compounds described above, from the viewpoint of improving the heat resistance and the chemical resistance, a length of an alkylene chain (spacer) ($n^{11}$) is preferably 3 to 4.

Preferred examples of compounds (2) include compound (2-C-1) to compound (2-C-2), compound (2-C-4) to compound (2-C-5), compound (2-N-1) to compound (2-N-2) and compound (2-N-4) to compound (2-N-5). In addition, a plurality of compounds (2) may be combined and used. In the compounds described above, from the viewpoint of improving the heat resistance and the chemical resistance, a length of an alkylene chain (spacer) ($n^{21}$) is preferably 3 to 4.

Preferred examples of compounds (3) include compound (3-2-A-1) to compound (3-2-A-3), compound (3-2-E-1) to compound (3-2-E-2), compound (3-2-F-1) and compound (3-2-G-1), and further preferred examples include compound (3-2-A-1) to compound (3-2-A-2). In addition, a plurality of compounds (3) may be combined and used. In the compounds described above, from the viewpoint of improving the heat resistance and the chemical resistance, a length of an alkylene chain (spacer) ($n^{32}$) is preferably 3 to 4.

Compound (4) is not always required. However, when compound (4) is used for adjustment to increase Δn, compound (4-1-A-1) to compound (4-1-A-6) and compound (4-1-B-1) to compound (4-1-B-6) are preferred. When compound (4) is used for adjustment to decrease Δn, compound (4-2-C-1) to compound (4-2-D-2) are preferred. In addition, a plurality of compounds (4) may be combined and used.

Compound (5) is not always required, but may be occasionally used for adjusting the melting point or the like. Use of compound (5-A) to compound (5-B), compound (5-E) to compound (5-F), compound (5-I) to compound (5-J), compound (5-M) to compound (5-N) or compound (5-Q) to compound (5-R) each having biphenyl structure allows reduction of a decrease in Δn to obtain uniformly aligned twist alignment. A case of significantly adjusting the melting point only needs use of compound (5-C) to compound (5-D), compound (5-G) to compound (5-H), compound (5-K) to compound (5-L) or compound (5-O) to compound (5-P). A case of controlling Δn at a low level only needs use of compound (5-S) to compound (5-W) having a cyclohexyl ring.

In compound (5), $n^{51}$ is preferably 3 to 6, $X^{51}$ is preferably hydrogen, $W^{51}$ is preferably hydrogen or fluorine, and $R^{51}$ is preferably straight-chain alkyl having 1 to 10 carbons, straight-chain alkoxy having 1 to 10 carbons or straight-chain alkyl ester having 1 to 10 carbons. In addition, a plurality of compounds represented by compound (5) may be combined and used.

Polymerizable liquid crystal composition (A) and polymerizable liquid crystal composition (B) according to the invention may contain a liquid crystal compound having no polymerizable group in the range in which the advantageous effects of the invention are not adversely affected. Specific examples of such a non-polymerizable liquid crystal compound is described in LiqCryst (LCI Publisher GmbH, Hamburg, Germany) being a database of the liquid crystal compounds, or the like. Specific examples of the liquid crystal compound having no polymerizable group are described in JP 2011-148762 A, pp. 66 to 69. The polymerizable liquid crystal composition of the invention has good compatibility with other liquid crystal compounds. Such a polymerizable liquid crystal composition may further contain an additive such as a dichroic dye and a fluorescent dye. Composite materials with the liquid crystal compound having no polymerizable group can be obtained by polymerizing the above polymerizable liquid crystal composition.

To polymerizable liquid crystal composition (B) of the invention, an optically active compound other than compound (3) may be added in the range in which the advantageous effects of the invention are not adversely affected. Specific examples of the optically active compounds are described in paragraph 0161 to paragraph 0170 in JP 2011-148762 A.

The negative uniaxial phase difference film (optically anisotropic substance) having helical structure (twist structure) is obtained by applying polymerizable liquid crystal composition (B) onto the substrate on which the alignment film and the positive uniaxial phase difference film are stacked and polymerizing the composition. The helical structure is immobilized by polymerizing polymerizable liquid crystal composition (B). Characteristics of the optically anisotropic substance having twist alignment to be obtained depend on a helical pitch of the thus obtained helical structure. A length of the helical pitch can be adjusted by a kind, chirality and an amount of addition of the optically active compound. The number of the optically active compounds to be added may be one, but a plurality of the optically active compounds may be used for the purpose of offsetting temperature dependence of the helical pitch. In addition, the polymerizable liquid crystal composition may contain any other polymerizable compound in addition to the optically active compound.

Selective reflection of visible light being the characteristics of the optically anisotropic substance having twist alignment as described above refers to action of the helical structure on incident light to reflect circularly polarized light or elliptically polarized light. Selective reflection characteristics can be expressed by an equation: $\lambda = n \cdot \text{Pitch}$ (in which λ is a center wavelength of the selective reflection, n is an average refractive index and Pitch means a helical pitch), and therefore the center wavelength (λ) and a wavelength width (Δλ) can be appropriately adjusted by changing values of n or Pitch. An improvement in color purity only needs a decrease in the wavelength width (Δλ), and a case upon desiring reflection in a broad band only needs an increase in the wavelength width (Δλ). Further, the selective reflection is also significantly susceptible to a thickness of the polymer. In order to keep the color purity, care should be paid so as to avoid an excessive decrease in the thickness. In order to maintain the uniform twist alignment, care should be paid so as to avoid an excessive increase in the thickness. A preferred thickness will be described later.

When the helical pitch is shortened in comparison with the pitch of visible light, the negative C plate described in W. H. de Jeu, Physical Properties of Liquid Crystalline Materials (Gordon and Breach, New York (1980)) can be prepared. In order to shorten the helical pitch, an object can be achieved by using an optically active compound having large helical twisting power (HTP), increasing an amount of addition thereof and so forth. Specifically, the negative C plate can be prepared by adjusting λ to approximately 350 nanometers or less, and preferably, approximately 200 nanometers or less.

When the helical pitch is lengthened in comparison with the pitch of visible light, the optically anisotropic substance having twist alignment can be used for the selective reflection film in which a reflection wavelength region is set to near-infrared (wavelength: approximately 800 nm to approximately 2,500 nm) as described in JP 2004-333671 A or JP 2001-51937 A. Lengthening of the helical pitch only needs use of an optically active compound having small helical twisting power or reduction of an amount of addition of the optically active compound.

If the optically active compound described above can induce the helical structure and can be suitably mixed with the polymerizable liquid crystal composition serving as a base, any of the optically active compounds may be used. Moreover, the heat resistance and the chemical resistance can be improved by having the polymerizable group.

With regard to a thickness (film thickness) of the negative uniaxial phase difference film, a suitable thickness is different depending on a phase difference according to a target device or birefringence (value of optical anisotropy) of the optically anisotropic substance having twist alignment according thereto. Therefore, a thickness range is different for each purpose, but as a target, a preferred range is approximately 0.05 to approximately 100 micrometers. A further preferred range is approximately 0.1 to approximately 50 micrometers, a still further preferred range is approximately 0.5 to approximately 20 micrometers, and a particularly preferred range is approximately 1 to approximately 10 micrometers. A preferred haze value of the negative uniaxial phase difference film is approximately 1.5% or less, and a preferred transmittance is approximately 80% or more. A further preferred haze value is approximately 1.0% or less, and a further preferred transmittance is approximately 95% or more. The transmittance preferably meets the conditions in a visible light region.

On the other hand, a thickness of the positive uniaxial phase difference film is preferably approximately 0.05 to approximately 10 micrometers, and further preferably, approximately 0.1 to approximately 10 micrometers. A preferred haze value of the positive uniaxial phase difference film is approximately 1.5% or less, and a preferred transmittance is approximately 80% or more. A further preferred haze value is approximately 1.0% or less, and a further preferred transmittance is approximately 95% or more.

The optically anisotropic substance of the invention is effective as an optical compensation device applied to the liquid crystal display (particularly, active matrix and passive matrix liquid crystal displays). Specific examples of modes of the liquid crystal displays suitable for using the optically anisotropic substance having twist alignment in the form of the optical compensation device include an in-plane switching (IPS) mode, an optically compensated birefringence (OCB) mode, a reflective optically compensated birefringence (R-OCB) mode, a hybrid aligned pneumatic (HAN) mode, a mode using a n cell display, a twisted nematic (TN) mode, a super-twisted nematic (STN) mode, an electrically controlled birefringence (ECB) mode, a deformation of aligned phase (DAP) mode, a color super homeotropic (CSH) mode, a vertically aligned nematic/vertically aligned cholesteric (VAN/VAC) mode, a vertical alignment (VA) mode, and a vertical alignment (VA) mode including a multidomain vertical alignment (MVA) mode, a patterned vertical alignment (PVA) mode and a polymer-sustained alignment (PSA) mode. The optically anisotropic substance is preferably used in the liquid crystal display in which an alignment mode in the liquid crystal layer includes the vertically aligned mode. The optically anisotropic substance can be particularly preferably used in the form of the optical compensation device suitable for the liquid crystal display having the VA mode, the MVA mode, the PVA mode, the PSA mode or the like.

The method for manufacturing the liquid crystal display according to the invention is not particularly restricted, and a publicly known method can be applied. For example, on the optically anisotropic substance of the invention, a transparent electrode such as ITO is formed by a vacuum film formation method such as sputtering, and after the electrode is formed, the alignment film having the vertically aligned mode is formed, the films are pasted onto counter substrates with providing a gap, a liquid crystal having a negative dielectric anisotropy is injected into the gap, and thus the liquid crystal display having the vertically aligned mode can be obtained.

The optically anisotropic substance of the invention becomes stronger by the additional thermosetting treatment, and therefore the optically anisotropic substance as an optical compensation layer can be arranged in a liquid crystal cell, and thus an adhesive that has been used so far for pasting a stretched type optical compensation film and the liquid crystal cell becomes unnecessary. As a result, a decrease in contrast due to interface reflection of the adhesive can be prevented, and therefore the optically anisotropic substance is useful for achieving high contrast (achieving high definition) of the liquid crystal display having the vertically aligned mode.

In addition, optimum values of parameters such as the helical pitch in the twist alignment and the thickness thereof required for the optically anisotropic substance having twist alignment strongly depend on a kind and an optical parameter of the liquid crystal display to be compensated and an optical parameter thereof, and therefore are different depending on a type of the device.

The optically anisotropic substance of the invention can be used also in the form of an optical device integrated with a polarizing plate or the like, and is arranged on an outside of the liquid crystal cell when the polarizing plate includes a stretched film as a constituent. When the polarizing plate includes an inorganic film as the constituent, the optically anisotropic substance may be arranged on any of the outside of the liquid crystal cell and an inside of the liquid crystal cell.

Moreover, the optically anisotropic substance in the form of the optical compensation device has no or little elution of an impurity into the liquid crystal filled into the cell, and therefore can be arranged inside the liquid crystal cell as described above. For example, if a method disclosed in JP 2004-240102 A is applied, a function of a color filter can be further improved by forming the phase difference film related to the invention on the color filter.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in detail by way of Examples below, but the invention is not limited to the Examples. Evaluation methods in Examples are presented below.

Polymerization Conditions

In air, 2 kW Deep UV Lamp (UXM-2204MD, made by USHIO INC.) and a short wavelength cut filter for a wavelength of 300 nanometers or less were used at room temperature, and irradiation with light having an intensity of 90 mW/cm$^2$ (365 nm) was made for 5 seconds or 39 seconds.

Evaluation of Phase Difference Film
(1) Preparation of a Glass Substrate with a Rubbing-Treated Alignment Film Onto a 0.7 mm-thick glass substrate (EAGLE XG, made by Corning Incorporated), polyamic acid for a low pretilt angle (horizontally aligned mode) (Lixon Aligner: PIA-5370, made by JNC Corporation) was spin-coated, a solvent was dried on a hot plate at 80° C. for 3 minutes, and then the resulting material was calcinated at 230° C. for 30 minutes. A thickness of the alignment film was approximately 0.10 micrometer. Then, rubbing treatment was applied using a rayon fabric.

(2) Confirmation of Uniformity of Alignment of a Phase Difference Film in which a Positive Uniaxial Phase Difference Film and a Negative Uniaxial Phase Difference Film were Stacked A substrate with a phase difference film after the film was photocured was interposed between two polarizing plates arranged in a crossed Nicol state, and presence or absence of light leakage (fine light transmission) through the cured film in a dark field state was observed. The light leakage is observed when a defect is produced in each alignment. When no light leakage was observed, the alignment was judged to be uniform.

Measurement Using an Ellipsometer: Confirmation of Phase Difference

An ellipsometer (product name: OPTIPRO) made by Shintech, Inc. was used, and a substrate with a cured film of a polymerizable liquid crystal compound was irradiated with light having a wavelength of 550 nanometers. Retardation was measured while an incidence angle of the light was decreased from 90 degrees relative to a substrate plane and an alignment form was confirmed. A direction of tilting irradiation was coincided with a direction of rubbing (major axis direction of liquid crystal molecules). In a phase difference film in which a positive uniaxial phase difference film and a negative uniaxial phase difference film were stacked on the substrate, retardation from a perpendicular direction became maximum. Retardation is expressed in terms of a product: $\Delta n \times d$, in which a symbol $\Delta n$ is birefringence anisotropy and symbol d is a thickness (film thickness) of a polymer film.

Measurement of Film Thickness

A layer of a cured film on a glass substrate with the cured film of a polymerizable liquid crystal compound was shaved off and a step was measured using a high-resolution surface profiler (Alpha-Step IQ, made by KLA-Tencor Corporation).

Measurement of a Glass Transition Temperature

The glass transition temperature was measured by a rigid body pendulum method. Measurement conditions were as follows: a negative uniaxial phase difference film (film thickness: approximately 3 μm) was coated, and the resulting material as dried and photocured on a polyimide film subjected to rubbing treatment (support substrate: glass). As a measuring apparatus, Rigid-body Pendulum Type Physical Properties Testing Instrument RPT-3000W, made by A&D Co., Ltd, was used to determine the glass transition temperature (softening point) of the negative uniaxial phase difference film from a maximum value of a change of a logarithmic decrement when the film was heated to 300° C. at a heating rate of 10° C./min using a rod type cylinder edge.

Compounds used in Examples and Comparative Examples are shown below.

Formula 69

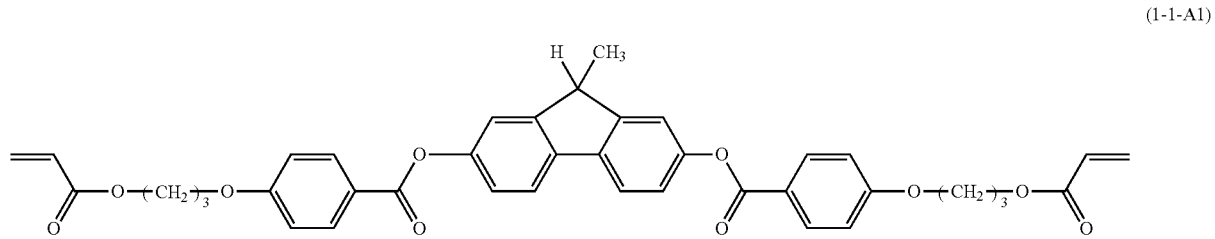

(1-1-A1)

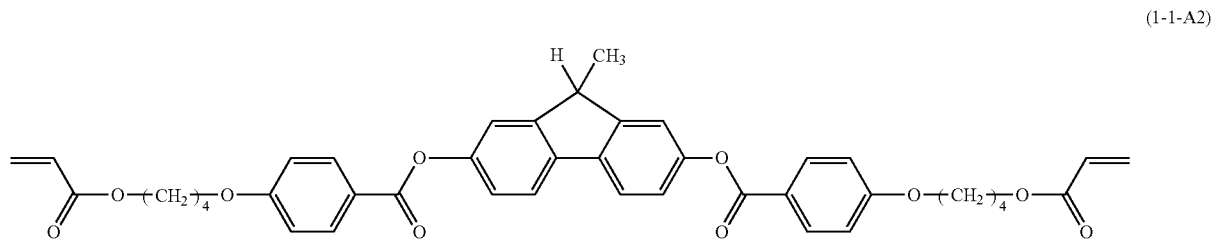

(1-1-A2)

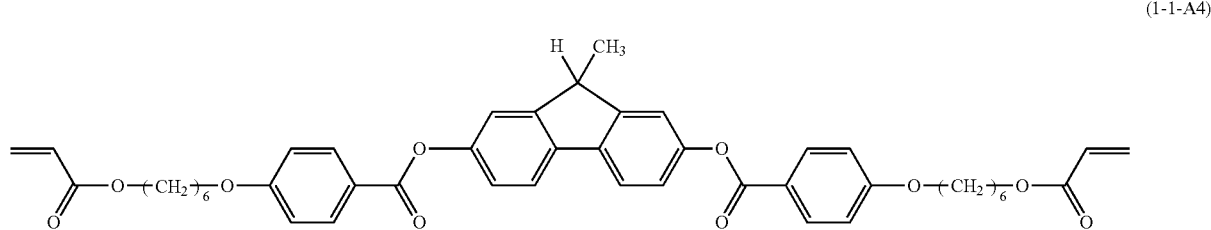

(1-1-A4)

-continued
(1-1-D3)
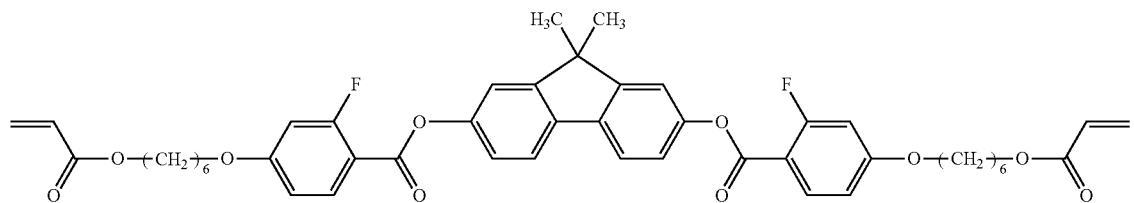
(2-C-1)
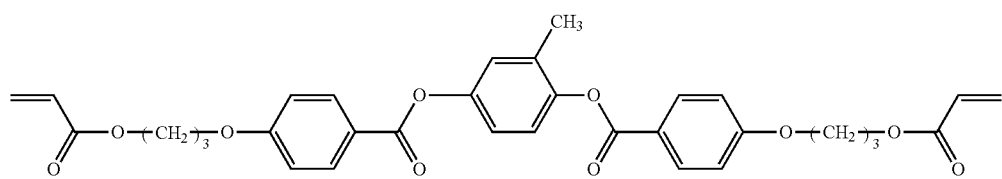
(2-C-2)
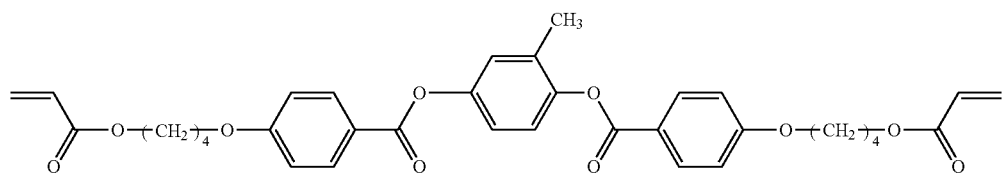
(2-C-3)
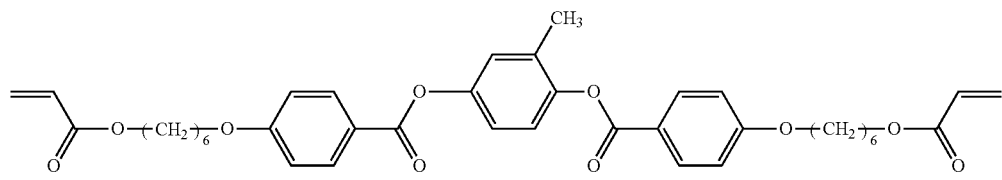
Formula 70
(3-2-A-1)
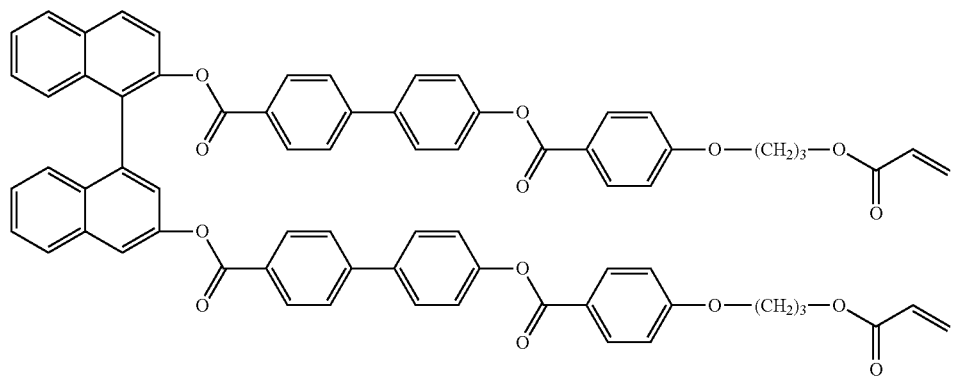
(3-2-A-2)
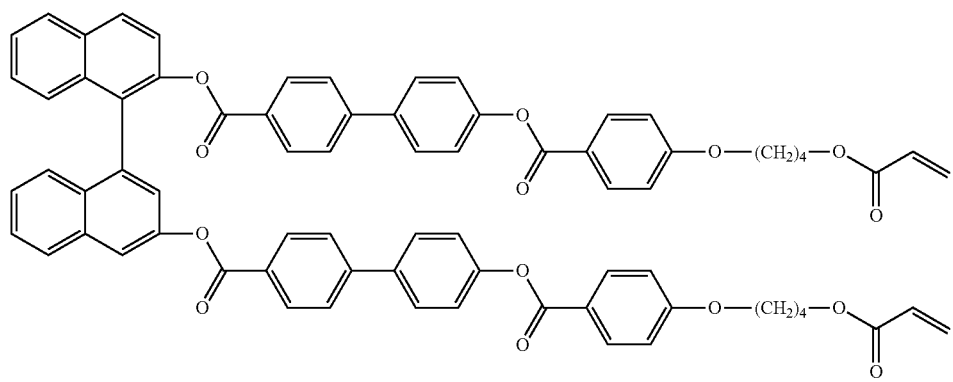

(3-2-A-3)

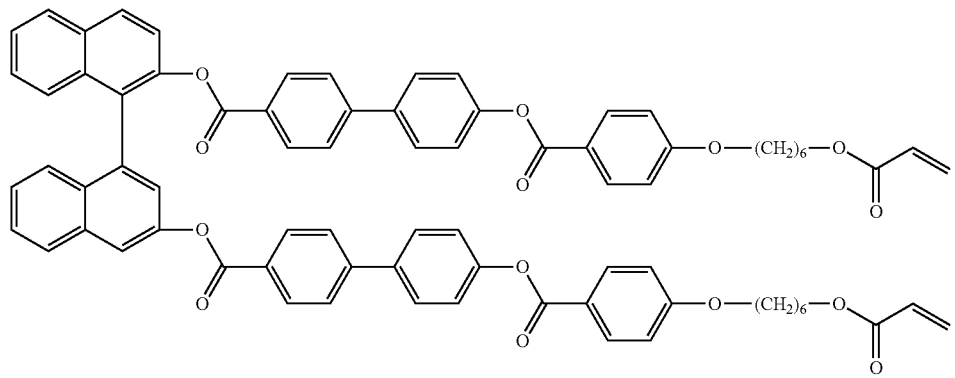

Compound (1-1-A1), compound (1-1-A2) and compound (1-1-A4) were prepared by a method described in JP 2003-238491 A.

Compound (1-1-D3) was prepared by a method described in JP 2006-307150 A.

Compounds (2-C-1) to (2-C-3) were prepared in accordance with a method described in Makromol. Chem., 190, 2255-2268 (1989).

Compounds (3-2-A-1) to (3-2-A-3) were prepared by a method in combination with methods described in JP 2005-263778 A, U.S. Pat. No. 5,886,242 B and GB 2298202 A. In addition, as chirality, a (R) isomer was used.

Preparation of Polymerizable Liquid Crystal Composition (A-1) for Forming a Positive Uniaxial Phase Difference Film At a weight ratio of 10:50:40 for compound (1-1-D3): compound (2-C-2): compound (2-C-3), the compounds were mixed. The composition was defined as MIX1. Based on the total weight of the MIX1, in terms of a weight ratio, 0.05 of polymerization initiator Irgacure 907, 0.001 of antioxidant Irganox 1076 and 0.001 of TEGOFLOW (registered trademark) 370 as a vinyl-based surfactant were added thereto. Cyclohexanone was added to the composition to adjust polymerizable liquid crystal composition (A-1) in which a concentration of MIX1 was 10% by weight.

Preparation of Polymerizable Liquid Crystal Composition (A-2) for Forming a Positive Uniaxial Phase Difference Film At a weight ratio of 10:45:45 for compound (1-1-A2): compound (2-C-2): compound (2-C-3), the compounds were mixed. The composition was prepared in a manner similar to the operations for preparing polymerizable liquid crystal composition (A-1) except that the composition was defined as MIX2 to adjust polymerizable liquid crystal composition (A-2) in which a concentration of MIX2 was 10% by weight.

Preparation of Polymerizable Liquid Crystal Composition (B-1-1) for Forming a Negative Uniaxial Phase Difference Film At a weight ratio of 45:45:10 for compound (1-1-A1): compound (1-1-A-2): compound (3-2-A-2), the compounds were mixed. The composition was defined as MIX3. Based on the total weight of the MIX3, in terms of a weight ratio, 0.05 of polymerization initiator Irgacure 907, 0.001 of antioxidant Irganox 1076 and 0.001 of TEGOFLOW (registered trademark) 370 as a vinyl-based surfactant were added thereto. Cyclohexanone was added to the composition to adjust polymerizable liquid crystal composition (B-1-1) in which a concentration of MIX3 was 35% by weight.

Preparation of Polymerizable Liquid Crystal Composition (B-1-2) for Forming a Negative Uniaxial Phase Difference Film Polymerizable liquid crystal composition (B-1-2) was prepared in a manner similar to the operations for preparing polymerizable liquid crystal composition (B-1-1) except that MIX3 was used, and in terms of a weight ratio, 0.05 of polymerization initiator NCI-930 (made by ADEKA Corporation) was used in place of polymerization initiator Irgacure 907.

Preparation of Polymerizable Liquid Crystal Composition (B-1-3) for Forming a Negative Uniaxial Phase Difference Film Polymerizable liquid crystal composition (B-1-3) was prepared in a manner similar to the operations for preparing polymerizable liquid crystal composition (B-1-1) except that MIX3 was used, and in terms of a weight ratio, an amount of addition of polymerization initiator Irgacure 907 was adjusted to 0.07.

Preparation of Polymerizable Liquid Crystal Composition (B-2-1) for Forming a Negative Uniaxial Phase Difference Film At a weight ratio of 45:45:10 for compound (1-1-A2): compound (2-C-2): compound (3-2-A-2), the compounds were mixed. The composition was defined as MIX4. Based on the total weight of the MIX4, in terms of a weight ratio, 0.05 of polymerization initiator Irgacure 907, 0.001 of antioxidant Irganox 1076 and 0.001 of TEGOFLOW (registered trademark) 370 as a vinyl-based surfactant were added thereto. Cyclohexanone was added to the composition to adjust polymerizable liquid crystal composition (B-2-1) in which a concentration of MIX4 was 35% by weight.

Preparation of Polymerizable Liquid Crystal Composition (B-2-2) for Forming a Negative Uniaxial Phase Difference Film Polymerizable liquid crystal composition (B-2-2) was prepared in a manner similar to the operations for preparing polymerizable liquid crystal composition (B-2-1) except that MIX4 was used, and in terms of a weight ratio, 0.05 of polymerization initiator NCI-930 (made by ADEKA Corporation) was used in place of polymerization initiator Irgacure 907.

Preparation of a Substrate with a Rubbing-Treated Alignment Film

A glass substrate with an alignment film was prepared by the method described in the section of the evaluation of the phase difference film as described above.

Figure 1:
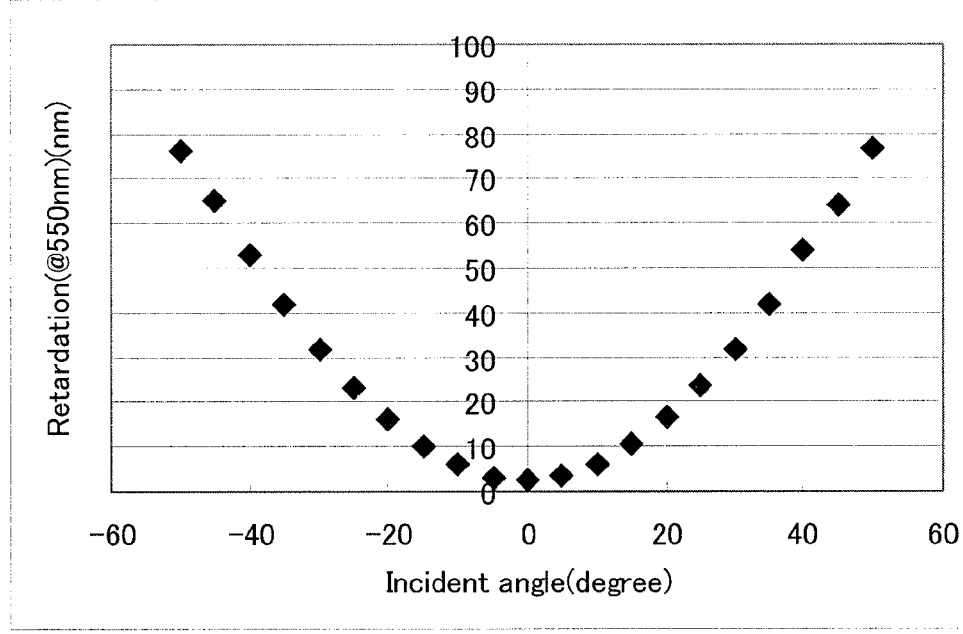
FIG. 1 shows results of measurement of retardation of a negative uniaxial phase difference film (negative C plate) obtained in Examples.

Measurement of a Glass Transition Temperature of a Negative Uniaxial Phase Difference Film Polymerizable liquid crystal composition (B-1-1) was applied onto a glass substrate with a rubbing-treated alignment film by spin coating. The substrate was heated at 80° C. for 3 minutes and cooled at room temperature for 3 minutes. A coating film from which a solvent was removed was irradiated with ultraviolet light for 5 seconds to cause polymerization in air and to obtain a cured film. When the resulting substrate with the cured film was interposed between two polarizing plates arranged in a crossed Nicol state and the substrate was placed into a dark field state, no light leakage was confirmed, and thus alignment was judged to be uniform. When retardation of the substrate with the cured film was measured, the results as shown in FIG. 1 were obtained. Retardation from a perpendicular direction was minimum, and therefore alignment was judged to be twist (negative uniaxial phase difference film, negative C plate). Moreover, film thickness was 3.2 micrometers. When a glass transition temperature of the resulting negative uniaxial phase difference film was measured, the glass transition temperature was 100° C.

In a manner similar to the operations described above, when a glass transition temperature of the negative uniaxial phase difference film obtained from polymerizable liquid crystal composition (B-1-2) was measured, the glass transition temperature was 160° C.

When a glass transition temperature of the negative uniaxial phase difference film obtained from polymerizable liquid crystal composition (B-1-3) was measured, the glass transition temperature was 120° C.

When a glass transition temperature of the negative uniaxial phase difference film obtained from polymerizable liquid crystal composition (B-2-1) was measured, the glass transition temperature was 95° C.

When a glass transition temperature of the negative uniaxial phase difference film obtained from polymerizable liquid crystal composition (B-2-2) was measured, the glass transition temperature was 120° C.

Example 1

Polymerizable liquid crystal composition (A-1) was applied onto a glass substrate with a rubbing-treated alignment film by spin coating. The substrate was heated at 80° C. for 3 minutes and cooled at room temperature for 3 minutes. A coating film from which a solvent was removed was polymerized with ultraviolet light in air to obtain a liquid crystal cured film (optically anisotropic substance). When the resulting substrate with the optically anisotropic substance was interposed between two polarizing plates arranged in a crossed Nicol state and the substrate was placed into a dark field state, no light leakage was confirmed, and thus alignment was judged to be uniform. When retardation of the substrate with the liquid crystal cured film was measured, the results as shown in FIG. 2 were obtained. Retardation from a perpendicular direction was maximum, and therefore alignment was judged to be horizontal (positive uniaxial phase difference film, positive A plate). Moreover, film thickness was 0.3 micrometers.

Next, polymerizable liquid crystal composition (B-1-1) was directly applied on the cured film of polymerizable liquid crystal composition (A-1) obtained as described above. Then, the resulting substrate was heated at 80° C. for 3 minutes and cooled at room temperature for 3 minutes. A coating film from which a solvent was removed was irradiated with ultraviolet light for 5 seconds to cause polymerization in air and to form an optically anisotropic substance in which a negative uniaxial phase difference film was stacked on the positive uniaxial phase difference film. When retardation of the substrate with the liquid crystal cured film was measured, the results as shown in FIG. 3 were obtained.

A glass transition temperature of a film obtained by photocuring polymerizable liquid crystal composition (B-1-1) was 100° C. as described above, and therefore additional treatment was applied at an additional thermosetting temperature of 220° C. for 30 minutes. On the thus obtained optically anisotropic substance, a transparent electrode layer formed of ITO having a thickness of 200 nm was formed on the optically anisotropic substance using a sputter device at an evaporation temperature of 100° C. under vacuum. Appearance of an optically anisotropic substance after ITO was sputtered remained transparent, was acceptable for intended applications.

Comparative Example 1

A transparent electrode formed of ITO was formed in a manner similar to the operations in Example 1 except that polymerizable liquid crystal composition (B-1-1) in Example 1 was photocured and an additional thermosetting temperature was adjusted to 200° C. Appearance of an optically anisotropic substance after ITO was sputtered was cloudy, and shrinkage of the cured film due to lack in thermosetting was observed.

Example 2

Polymerizable liquid crystal composition (B-1-1) in Example 1 was changed to polymerizable liquid crystal composition (B-1-3). A glass transition temperature of a film obtained by photocuring polymerizable liquid crystal composition (B-1-3) was 120° C. as described above, and therefore a transparent electrode formed of ITO was formed in a manner similar to the operations in Example 1 except that an additional thermosetting temperature was adjusted to 230° C. Appearance of an optically anisotropic substance after ITO was sputtered remained transparent, was acceptable for intended applications.

Example 3

Polymerizable liquid crystal composition (B-1-1) in Example 1 was changed to polymerizable liquid crystal composition (B-1-2). A glass transition temperature of a film obtained by photocuring polymerizable liquid crystal composition (B-1-2) was 160° C. as described above, and therefore a transparent electrode formed of ITO was formed in a manner similar to the operations in Example 1 except that an additional thermosetting temperature after photocuring was adjusted to 200° C. Appearance of an optically anisotropic substance after ITO was sputtered remained transparent, was acceptable for intended applications.

Example 4

Polymerizable liquid crystal composition (B-1-1) in Example 1 was changed to polymerizable liquid crystal composition (B-2-1). A glass transition temperature of a film obtained by photocuring polymerizable liquid crystal composition (B-2-1) was 95° C. as described above, and therefore a transparent electrode formed of ITO was formed in a manner similar to the operations in Example 1 except that an additional thermosetting temperature after photocuring was adjusted to 230° C. Appearance of an optically anisotropic substance after ITO was sputtered remained transparent, was acceptable for intended applications.

Comparative Example 2

A transparent electrode formed of ITO was formed in a manner similar to the operations in Example 1 except that polymerizable liquid crystal composition (B-2-1) in Example 4 was photocured and an additional thermosetting temperature was adjusted to 200° C. Appearance of an optically anisotropic substance after ITO was sputtered was cloudy, and shrinkage of a cured film due to lack in thermosetting was observed.

Example 5

When exposure time upon photocuring polymerizable liquid crystal composition (B-2-1) was changed from 5 seconds to 39 seconds, and a glass transition temperature was measured, the glass transition temperature was 155° C. Consequently, a transparent electrode formed of ITO was formed in a manner similar to the operations in Example 1 except that polymerizable liquid crystal composition (B-1-1) in Example 1 was changed to polymerizable liquid crystal composition (B-2-1), the exposure time was adjusted to 39 seconds, and an additional thermosetting temperature after photocuring was adjusted to 200° C. Appearance of an optically anisotropic substance after ITO was sputtered remained transparent, was acceptable for intended applications.

Example 6

A transparent electrode formed of ITO was formed in a manner similar to the operations in Example 1 except that polymerizable liquid crystal composition (A-1) in Example 1 was changed to polymerizable liquid crystal composition (A-2). Appearance of an optically anisotropic substance after ITO was sputtered remained transparent, was acceptable for intended applications.

Example 7

Polymerizable liquid crystal composition (A-1) in Example 1 was changed to polymerizable liquid crystal composition (A-2), and polymerizable liquid crystal composition (B-1-1) was changed to polymerizable liquid crystal composition (B-1-2). A glass transition temperature of a film obtained by photocuring polymerizable liquid crystal composition (B-1-2) was 160° C. as described above, and therefore a transparent electrode formed of ITO was formed in a manner similar to the operations in Example 1 except that an additional thermosetting temperature after photocuring was adjusted to 200° C. Appearance of an optically anisotropic substance after ITO was sputtered remained transparent, was acceptable for intended applications.

Example 8

Polymerizable liquid crystal composition (A-1) in Example 1 was changed to polymerizable liquid crystal composition (A-2), and polymerizable liquid crystal composition (B-1-1) was changed to polymerizable liquid crystal composition (B-2-1). A glass transition temperature of a film obtained by photocuring polymerizable liquid crystal composition (B-2-1) was 95° C. as described above, and therefore a transparent electrode formed of ITO was formed in a manner similar to the operations in Example 1 except that an additional thermosetting temperature after photocuring was adjusted to 230° C. Appearance of an optically anisotropic substance after ITO was sputtered remained transparent, was acceptable for intended applications.

Example 9

Polymerizable liquid crystal composition (A-1) in Example 1 was changed to polymerizable liquid crystal composition (A-2), and polymerizable liquid crystal composition (B-1-1) was changed to polymerizable liquid crystal composition (B-2-2). A glass transition temperature of a film obtained by photocuring polymerizable liquid crystal composition (B-2-2) was 120° C. as described above, and therefore a transparent electrode formed of ITO was formed in a manner similar to the operations in Example 1 except that an additional thermosetting temperature after photocuring was adjusted to 200° C. Appearance of an optically anisotropic substance after ITO was sputtered remained transparent, was acceptable for intended applications.

From the results described above, the heat resistance of the negative uniaxial phase difference film and the resistance to ITO sputtering on the film are found to be improved by adjusting the additional thermosetting treatment temperature to 220° C. or higher when the glass transition temperature of the negative uniaxial phase difference film after the negative uniaxial phase difference film to be formed on the positive uniaxial phase difference film was photocured was 115° C. or lower. Moreover, the heat resistance of the negative uniaxial phase difference film and the resistance to ITO on the film found to be improved by adjusting the additional thermosetting treatment temperature to 200° C. or higher when the glass transition temperature was higher than 115° C. Moreover, the glass transition temperature is found to be also controllable depending on an exposure amount or a kind of the initiator. When such an optically anisotropic substance is used, the alignment film having a vertically aligned mode is formed after ITO electrodes are formed, the films are pasted onto counter substrates with providing a gap, and the liquid crystal having the negative dielectric anisotropy is injected into the gap, and thus a liquid crystal display having the vertically aligned mode can be obtained.

In addition, when the optically anisotropic substance of the invention is used for the liquid crystal display having the vertically aligned mode, the optically anisotropic substance only needs to be positioned on a lower side of the electrodes on an inner side of two opposed transparent substrates, but the substance is not particularly limited to the position.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

When a polymerizable liquid crystal composition according to the invention is used, an optically anisotropic substance having excellent heat resistance and excellent resistance to ITO sputtering can be obtained. The optically anisotropic substance is useful for a liquid crystal display having a vertically aligned mode.

What is claimed is:
1. An optically anisotropic substance in which an alignment film, a positive uniaxial phase difference film and a negative uniaxial phase difference film are formed on a substrate in the above order, wherein
the positive uniaxial phase difference film is formed of polymerizable liquid crystal composition (A) containing one kind or two or more kinds of achiral polymerizable liquid crystal compounds having two or more polymerizable groups,
the negative uniaxial phase difference film is formed of polymerizable liquid crystal composition (B) containing one kind or two or more kinds of achiral polymerizable liquid crystal compounds having two or more polymerizable groups, and one kind or two or more kinds of optically active compounds having a polymerizable binaphthol moiety, and
the optically anisotropic substance is formed according to an additional thermosetting treatment step after the negative uniaxial phase difference film is formed by photocuring, and
when a glass transition temperature after the negative uniaxial phase difference film is photocured is 85° C. or higher and 115° C. or lower, an additional thermosetting treatment temperature is adjusted to 220° C. or higher and 250° C. or lower, and when the glass transition temperature is higher than 115° C., the additional thermosetting treatment temperature is adjusted to 200° C. or higher and 250° C. or lower.

2. The optically anisotropic substance according to claim 1, wherein polymerizable liquid crystal composition (A) contains one kind or two or more kinds of compounds selected from the group of achiral polymerizable liquid crystal compounds represented by formula (1) and formula (2):

Formula 1

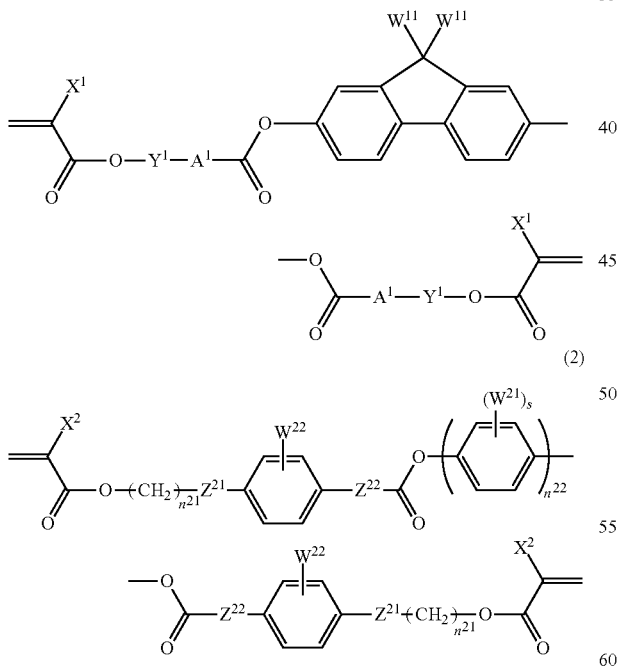

wherein, in formula (1),
$X^1$ is independently hydrogen, methyl, fluorine or trifluoromethyl;
$W^{11}$ is independently hydrogen, fluorine, chlorine, methyl or ethyl, and at least one of hydrogen in the methyl and the ethyl may be replaced by halogen;
$A^1$ is independently 1,4-cyclohexylene, 1,4-phenylene, or 1,4-phenylene in which at least one of hydrogen is replaced by halogen, nitro, cyano, alkyl having 1 to 7 carbons or alkoxy having 1 to 7 carbons; and
$Y^1$ is independently a single bond or alkylene having 1 to 20 carbons, at least one of —$CH_2$— may be replaced by —O—, —S—, —COO—, —OCO— or —OCOO—, excluding a case where —O— is adjacent, at least one of —$CH_2CH_2$— may be replaced by —CH=CH— or —C≡C—, and in the groups, at least one of hydrogen may be replaced by fluorine or chlorine; and
in formula (2),
$X^2$ is independently hydrogen, methyl, fluorine or trifluoromethyl;
$W^{21}$ is independently halogen, nitro, cyano, phenyl, benzyl, alkyl having 1 to 7 carbons, alkoxy having 1 to 7 carbons, alkoxycarbonyl (—$COOR^a$; $R^a$ is straight-chain alkyl having 1 to 7 carbons) or alkylcarbonyl (—$COR^b$; $R^b$ is straight-chain alkyl having 1 to 16 carbons), and in the alkyl and the alkoxy, at least one of hydrogen may be replaced by fluorine;
$W^{22}$ is independently hydrogen, halogen, nitro, cyano, alkyl having 1 to 7 carbons or alkoxy having 1 to 7 carbons, and in the alkyl and the alkoxy, at least one of hydrogen may be replaced by fluorine;
s is an integer from 0 to 4;
$n^{21}$ is independently an integer from 2 to 12;
$n^{22}$ is an integer from 1 to 3;
$Z^{21}$ is independently a single bond, —O—, —CO—, —CH=CH—, —COO—, —OCO—, —OCO—CH=CH—COO— or —OCOO—; and
$Z^{22}$ is independently a single bond, —$CH_2CH_2$— or —CH=CH—.

3. The optically anisotropic substance according to claim 2, wherein polymerizable liquid crystal composition (B) contains one kind or two or more kinds of compounds selected from the group of achiral polymerizable liquid crystal compounds represented by formula (1) and formula (2), and one kind or two or more kinds of optically active compounds having a polymerizable binaphthol moiety as represented by formula (3):

Formula 2

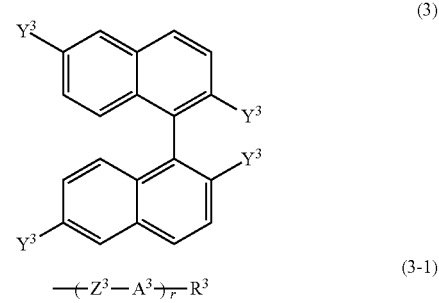

wherein, in formula (3),
$Y^3$ is independently hydrogen, halogen or a group represented by formula (3-1), however, at least two in $Y^3$ are a group represented by formula (3-1); and
in formula (3-1),
$R^3$ is independently halogen, cyano, alkenyl having 2 to 20 carbons or alkyl having 1 to 20 carbons, at least one of —$CH_2$— in the group may be replaced by —O—, excluding a case where —O— is adjacent, at least one of hydrogen in the group may be replaced by halogen, and in one or two of $Y^3$, one of hydrogen in $R^3$ is replaced by acryloyloxy, methacryloyloxy or trifluoromethylacryloyloxy;

$A^3$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen;

$Z^3$ is independently a single bond, —O—, —COO—, —OCO—, —OCF$_2$— or —(CH$_2$)$_p$—, and one of —CH$_2$— of —(CH$_2$)$_p$— may be replaced by —O—;

p is independently an integer from 1 to 20; and r is independently an integer from 1 to 3.

4. The optically anisotropic substance according to claim 3, wherein polymerizable liquid crystal compound (1) contained in polymerizable liquid crystal composition (A) or polymerizable liquid crystal composition (B) includes at least one compound selected from the group of compounds represented by formula (1-1), and optically active compound (3) contained in polymerizable liquid crystal composition (B) includes at least one compound selected from the group of compounds represented by formula (3-2):

dronaphthalene-2,6-diyl, 1,2,3,4-tetrahydronaphthalene-2,6-diyl, or 1,4-phenylene in which at least one of hydrogen is replaced by halogen;

$Z^3$ is independently a single bond, —O—, —COO—, —OCO—, —OCF$_2$— or —(CH$_2$)$_p$—, and one of —CH$_2$— of —(CH$_2$)$_p$— may be replaced by —O—;

p is independently an integer from 1 to 20; and r is independently an integer from 1 to 3.

5. The optically anisotropic substance according to claim 4, wherein, in formula (1-1), $X^1$ is independently hydrogen or methyl; and $W^{12}$ is independently hydrogen, halogen, alkyl having 1 to 7 carbons or alkoxy having 1 to 7 carbons; and in formula (2), $X^2$ is independently hydrogen or methyl;

$W^{21}$ is independently halogen, phenyl, benzyl, alkyl having 1 to 7 carbons, alkoxy having 1 to 7 carbons, alkoxycarbonyl (—COOR$^a$; R$^a$ is straight-chain alkyl having 1 to 7 carbons) or alkylcarbonyl (—COR$^b$; R$^b$ is straight-chain alkyl having 1 to 16 carbons), and in the alkyl and the alkoxy, at least one of hydrogen may be replaced by fluorine; and in formula (3-2), Formula 3

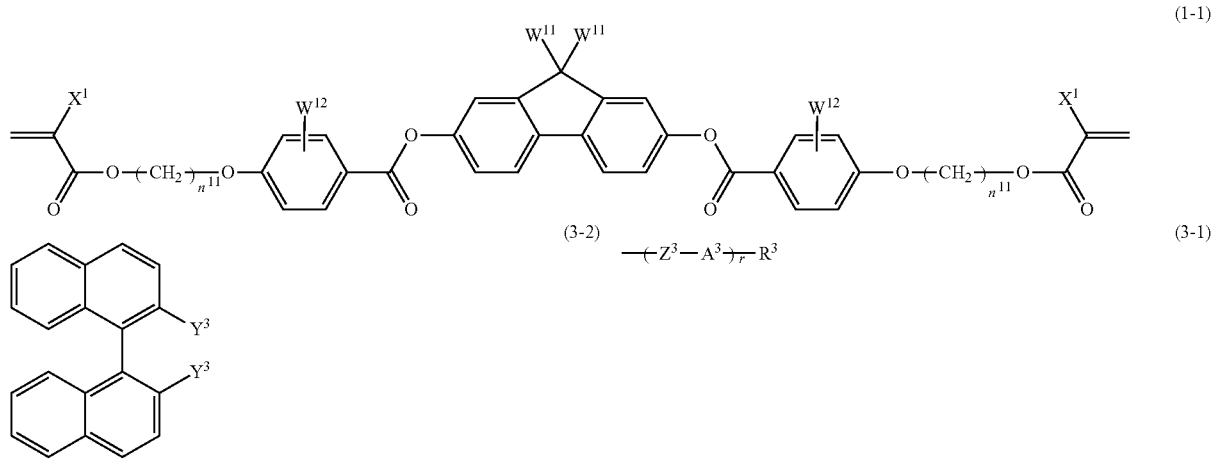

wherein, in formula (1-1), $X^1$ is independently hydrogen, methyl, fluorine or trifluoromethyl;

$W^{11}$ is independently hydrogen or methyl;

$W^{12}$ is independently hydrogen, halogen, nitro, cyano, alkyl having 1 to 7 carbons or alkoxy having 1 to 7 carbons; and $n^{11}$ is independently an integer from 2 to 12; and in formula (3-2), $Y^3$ is independently a group represented by formula (3-1); and in formula (3-1), $R^3$ is independently alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and in one or two of $Y^3$, one of hydrogen in $R^3$ is replaced by acryloyloxy, methacryloyloxy or trifluoromethylacryloyloxy;

$A^3$ is independently 1,4-cyclohexylene, 1,4-phenylene, 4,4'-biphenylene, naphthalene-2,6-diyl, decahy- $Y^3$ is independently a group represented by formula (3-1); and in formula (3-1), $R^3$ is independently alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and in one or two of $Y^3$, one of hydrogen in $R^3$ is replaced by acryloyloxy, methacryloyloxy or trifluoromethylacryloyloxy; and $Z^3$ is independently a single bond, —O—, —COO—, —OCO— or —(CH$_2$)$_p$—, and one of —CH$_2$— of —(CH$_2$)$_p$— may be replaced by —O—.

6. The optically anisotropic substance according to claim 1, wherein polymerizable liquid crystal composition (A) and/or polymerizable liquid crystal composition (B) further contain at least one compound selected from the group of compounds represented by formula (4-1) and formula (4-2):

Formula 4

(4-1)
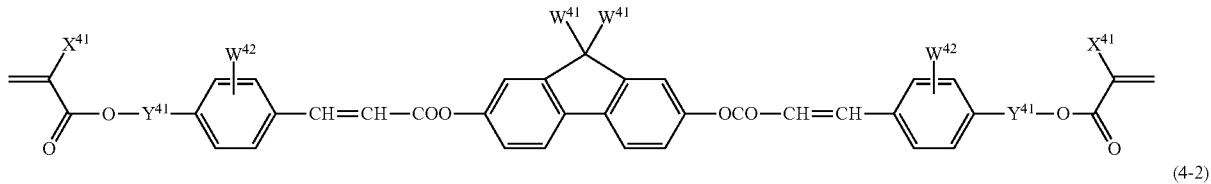

(4-2)
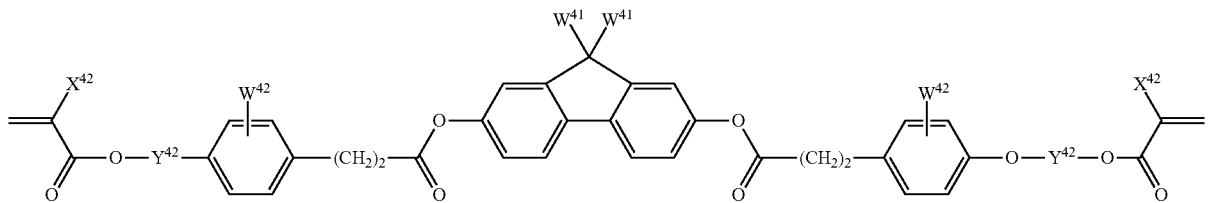

wherein, in formula (4-1), $X^{41}$ is independently hydrogen, methyl or trifluoromethyl;

$Y^{41}$ is independently alkylene having 1 to 20 carbons, at least one of —$CH_2$— may be replaced by —O—, —S—, —COO—, —OCO— or —OCOO—, at least one of —$CH_2CH_2$— may be replaced by —CH=CH— or —C≡C—, and in the groups, at least one of hydrogen may be replaced by fluorine or chlorine;

$W^{41}$ is independently hydrogen, fluorine, chlorine, methyl or ethyl, and at least one of hydrogen in the methyl and the ethyl may be replaced by halogen;

$W^{42}$ is independently hydrogen, halogen, nitro, cyano, alkyl having 1 to 7 carbons or alkoxy having 1 to 7 carbons; and in formula (4-2), $W^{41}$ and $W^{42}$ are defined in a manner identical with the definitions described above;

$Y^{42}$ is defined in a manner identical with the definitions of $Y^{41}$; and $X^{42}$ is defined in a manner identical with the definitions of $X^{41}$.

7. A liquid crystal display, including a vertically aligned mode in a liquid crystal layer, wherein the liquid crystal layer comprises the optically anisotropic substance according to claim 1.

8. The liquid crystal display according to claim 7, wherein the vertically aligned mode in the liquid crystal layer includes a VA mode, a multidomain vertical alignment (MVA) mode, a patterned VA (PVA) mode or a PSA mode.

* * * * *